(12) United States Patent
Chakraborty et al.

(10) Patent No.: US 11,890,957 B2
(45) Date of Patent: Feb. 6, 2024

(54) SYSTEM AND METHOD FOR A BATTERY ON WHEELS (BOW) FOR CHARGING MOBILE BATTERY-OPERATED UNITS

(71) Applicant: UNIVERSITY OF FLORIDA RESEARCH FOUNDATION, INCORPORATED, Gainesville, FL (US)

(72) Inventors: Prabuddha Chakraborty, Gainesville, FL (US); Swarup Bhunia, Gainesville, FL (US); Christopher M. Vega, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 436 days.

(21) Appl. No.: 17/306,553

(22) Filed: May 3, 2021

(65) Prior Publication Data

US 2021/0347275 A1 Nov. 11, 2021

Related U.S. Application Data

(60) Provisional application No. 63/020,872, filed on May 6, 2020.

(51) Int. Cl.
*B60L 53/35* (2019.01)
*B60L 53/67* (2019.01)
(Continued)

(52) U.S. Cl.
CPC .............. *B60L 53/35* (2019.02); *B60L 53/53* (2019.02); *B60L 53/57* (2019.02); *B60L 53/665* (2019.02);
(Continued)

(58) Field of Classification Search
CPC .......... B60L 53/35; B60L 53/53; B60L 53/57; B60L 53/665; B60L 53/67; B60L 58/12;
(Continued)

(56) References Cited

U.S. PATENT DOCUMENTS 10,872,361 B2 * 12/2020 Khoo ...................... B60L 53/67
10,879,741 B2 * 12/2020 Soryal ..................... H02J 50/30
(Continued)

FOREIGN PATENT DOCUMENTS

WO WO-2016022646 A1 * 2/2016 ........... B64C 39/024

OTHER PUBLICATIONS

E.-F. Ibrahim, K. Driss and A. Rachid, "Framework for Optimizing the Charging Time of Electric Vehicles in Public Supply Station Deployed in Smart Cities," 2018 IEEE 5th International Congress on Information Science and Technology (CiSt), Marrakech, Morocco, 2018, pp. 537-541 (Year: 2018).*

*Primary Examiner* — M Baye Diao
(74) *Attorney, Agent, or Firm* — ALSTON & BIRD LLP

(57) ABSTRACT

Apparatus, systems, and methods described herein relate generally to autonomous mobile units carrying a modular configurable battery system that may attach and power mobile units in transportation systems. A method can include determining charge levels, current positions, and transport speeds for an electric vehicle (EV), identifying one or more EVs in need of charging, and mobilizing a Mobile Charging Station (MoCS) to deliver one or more external batteries. A processor, with a memory including computer program code, can be configured to receive current charge level data for mobile battery-powered entities, identify one or more EVs to be charged and the proximity of both MoCS and physical battery stations, and send charging instructions to the EVs. A routing and charge transaction scheduling algorithm can be used to optimize the route of one or more
(Continued)

battery-powered entities and to schedule charge transactions between the EV and MoCS and/or the battery station.

22 Claims, 25 Drawing Sheets

(51) Int. Cl.
| | |
|---|---|
| *B60L 53/66* | (2019.01) |
| *B60L 53/57* | (2019.01) |
| *B60L 53/53* | (2019.01) |
| *B60W 60/00* | (2020.01) |
| *G01C 21/34* | (2006.01) |
| *G06Q 10/0631* | (2023.01) |
| *G06Q 50/30* | (2012.01) |
| *G06Q 50/06* | (2012.01) |
| *G06Q 20/12* | (2012.01) |
| *G06Q 20/14* | (2012.01) |
| *B60L 58/12* | (2019.01) |

(52) U.S. Cl.
CPC ............... *B60L 53/67* (2019.02); *B60L 58/12* (2019.02); *B60W 60/0025* (2020.02); *G01C 21/3438* (2013.01); *G06Q 10/06315* (2013.01); *G06Q 20/127* (2013.01); *G06Q 20/145* (2013.01); *G06Q 50/06* (2013.01); *G06Q 50/30* (2013.01)

(58) Field of Classification Search
CPC ...... B60L 2240/62; B60L 53/14; B60L 53/66; B60L 53/68; B60W 60/0025; G01C 21/3438; G06Q 10/06315; G06Q 20/127; G06Q 20/145; G06Q 50/06; G06Q 50/30; Y02T 10/72; Y02T 90/14; Y02T 10/70; Y02T 10/7072; Y02T 90/12; Y02T 90/16; G07F 15/005
USPC ........................................................ 320/109
See application file for complete search history.

(56) References Cited

U.S. PATENT DOCUMENTS

| | | | | |
|---|---|---|---|---|
| 11,091,053 | B2* | 8/2021 | Ma | B60L 53/11 |
| 11,376,979 | B2* | 7/2022 | Chakraborty | B60L 53/36 |
| 11,420,530 | B2* | 8/2022 | Akhavan-Tafti | B60L 53/62 |
| 2021/0025728 | A1* | 1/2021 | Thum | G01C 21/3664 |
| 2021/0110446 | A1* | 4/2021 | Khoo | G06Q 50/30 |

* cited by examiner

SYSTEM AND METHOD FOR A BATTERY ON WHEELS (BOW) FOR CHARGING MOBILE BATTERY-OPERATED UNITS

CROSS-REFERENCE TO RELATED APPLICATIONS

This application claims priority to, and the benefit of, U.S. Provisional Patent Application Ser. No. 63/020,872, entitled "System And Method For Battery On Wheels (BoW) For Charging Battery-Operated Units" and filed May 6, 2020, the entire disclosures of which are hereby incorporated herein by reference in their entireties for all purposes as if reproduced in their entirety herein.

BACKGROUND

As transportation solutions are further developed that rely at least in part on mobile battery power, there remain many barriers to large-scale implementation of at least partially battery-powered entities. This application presents various solutions to some of the barriers, in response to a long-felt need in the industry.

SUMMARY

Apparatus, systems, and methods described herein relate generally to the use of an external battery pack on demand while a battery-operated entity is in motion. For example, according to a first embodiment wherein the battery-operated entity is an electric vehicle (EV), a Battery on Wheels (BoW) unit may be attached at the back of the EV using a magnetic or electromagnetic latch and used to power the EV as well as recharge the EV's internal battery. In some embodiments, the BoW unit may be delivered via a Mobile Charging Station (MoCS). In some embodiments, the BoW unit may be delivered using a BoW station. In some embodiments, these the MoCS may pick up discharged BoW units from one EV and recharge them for use with another EV while in motion. In some embodiments, discharged BoW may be dropped off by one EV and recharged at BoW stations for use with another EV. In some embodiments, BoW units are modular battery systems that can connect with other BoW to provide higher batter capacity, voltage, and/or charging speed.

According to a second embodiment, a method that comprises receiving current charge level data from one or more mobile battery-powered entities of the plurality of mobile battery-powered entities to be charged, deploying a MoCS to the mobile battery-powered entity, receiving a discharged external battery unit from the mobile battery-powered entity, and optionally transferring a charged external battery unit to the mobile battery-powered entity.

According to a third embodiment, a method that comprises receiving current charge level data from one or more mobile battery-powered entities of the plurality of mobile battery-powered entities to be charged, routing the mobile battery-powered entity to a nearby battery station, transferring a charged external battery unit to the mobile battery-powered entity, and optionally receiving one or more discharged external battery units from the mobile battery-powered entity.

According to a fourth embodiment, a method that comprises receiving current charge level data from one or more mobile battery-powered entities of the plurality of mobile battery-powered entities to be charged, routing the mobile battery-powered entity to a nearby battery station, receiving a discharged external battery unit from the mobile battery-powered entity, and optionally transferring a charged external battery unit to the mobile battery-powered entity.

According to a fifth example, a method can be provided that comprises determining that a mobile battery-powered entity is within a pre-determined proximity of another mobile battery-powered entity, determining a charge level and a transport speed of the mobile battery-powered entity, determining the charge level and the transport speed of the other mobile battery-powered entity, in an instance in which the charge level of the mobile battery-powered entity is below a pre-determined (e.g., configurable) charge level and less than the charge level of the other mobile battery-powered entity, causing the mobile battery-powered entity to receive an electric charge from the other mobile battery-powered entity, and in an instance in which the charge level of the other mobile battery-powered entity is below the pre-determined (e.g., configurable) charge level and less than the charge level of the other mobile battery-powered entity, causing the other mobile battery-powered entity to receive the electric charge from the mobile battery-powered entity.

According to a sixth embodiment, an apparatus can be provided that comprises at least one processor and at least one memory including computer program code, the at least one memory and the computer program code configured to, with the processor, cause the apparatus to at least receive current charge level data for a plurality of mobile battery-powered entities, determine, based at least in part on the current charge level data, one or more mobile battery-powered entities of the plurality of mobile battery-powered entities to be charged, determine, based at least in part on the current charge level data, one or more other mobile battery-powered entities of the plurality of mobile battery-powered entities to be caused to charge the one or more mobile battery-powered entities; and cause, while the one or more mobile battery-powered entities and are being transported within a pre-determined proximity of the one or more other mobile battery-powered entities, the one or more other mobile battery-powered entities to charge the one or more mobile battery-powered entities.

According to a seventh embodiment, a method can be provided that comprises receiving current charge level data for a plurality of mobile battery-powered entities, determining, based at least in part on the current charge level data, one or more mobile battery-powered entities of the plurality of mobile battery-powered entities to be charged, determining, based at least in part on the current charge level data, one or more other mobile battery-powered entities of the plurality of mobile battery-powered entities to be caused to charge the one or more mobile battery-powered entities, and causing, while the one or more mobile battery-powered entities and are being transported within a pre-determined proximity of the one or more other mobile battery-powered entities, the one or more other mobile battery-powered entities to charge the one or more mobile battery-powered entities.

According to an eighth embodiment, a method can be provided that comprises wirelessly transmitting, from a mobile battery-powered entity while the mobile battery-powered entity is being transported through a predefined area, a current charge level to a computing device, receiving an indication from the computing device as to whether the mobile battery-powered entity is to charge another mobile battery-powered entity, to be charged by the other mobile battery-powered entity, or neither charge nor be charged by the other mobile battery-powered entity, and in an instance in which the indication received indicates that the mobile battery-powered entity is either to charge or be charged by the other mobile battery-powered entity: determining a geospatial location and a transport speed of the mobile battery-powered entity, receiving the geospatial location and the transport speed of the other mobile battery-powered entity, causing the mobile battery-powered entity to speed lock with the other mobile battery-powered entity based at least in part on the geospatial location and the transport speed of the mobile battery-powered entity and the other mobile battery-powered entity, in an instance in which the indication received indicates that the mobile battery-powered entity is to charge the other mobile battery-powered entity, causing the mobile battery-powered entity to transmit a charge to the other mobile battery-powered entity, and in an instance in which the indication received indicates that the mobile battery-powered entity is to be charged by the other mobile battery-powered entity, causing the mobile battery-powered entity to receive the charge from the other mobile battery-powered entity.

According to a ninth embodiment, a method can be provided that comprises determining a charge level, a current position, and a transport speed for a mobile battery-powered entity in a transportation network; determining the charge level, the current position, and the transport speed for another mobile battery-powered entity in the mobile charging network; and, in an instance in which the charge level of the mobile battery-powered entity is below a pre-determined charge level and less than the charge level of the other mobile battery-powered entity, causing the mobile battery-powered entity to receive an electric charge from the other mobile battery-powered entity while the mobile battery-powered entity and the other mobile battery-powered entity continue traveling through the transportation network. In some embodiments, the method can further comprise determining that the mobile battery-powered entity is within a pre-determined proximity of the other mobile battery-powered entity. In some embodiments, the method can further comprise, in an instance in which the charge level of the mobile battery-powered entity is below a pre-determined charge level and less than the charge level of the other mobile battery-powered entity, transmitting route instructions and transport speed instructions to the other mobile battery-powered entity; determining whether the other mobile battery-powered entity has complied with the route instructions and the transport speed instructions; and if the other mobile battery-powered entity has complied with the route instructions and the transport speed instructions, transmitting charge transfer instructions to the other mobile battery-powered entity. In some embodiments, the method can further comprise causing the other mobile battery-powered entity to transfer an electric charge to the mobile battery-powered entity according to the charge transfer instructions. In some embodiments, the charge transfer instructions can comprise one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity. In some embodiments, the method can further comprise, in an instance in which the charge level of the other mobile battery-powered entity is below the pre-determined charge level and less than the charge level of the other mobile battery-powered entity, causing the other mobile battery-powered entity to receive the electric charge from the mobile battery-powered entity. In some embodiments, the method can further comprise, in an instance in which the charge levels of the mobile battery-powered entity and the other mobile battery-powered entity are both below the pre-determined charge level, causing deployment of at least one charging vehicle or at an MoCS. In some embodiments, the mobile battery-powered entity and the other mobile battery-powered entity are selected from among battery-powered terrestrial vehicles, battery-powered aerial vehicles, battery-powered aquatic vehicles, charge relay vehicles, and charge storage vehicles. In some embodiments, the method can further comprise updating a charge distribution map of the transportation network to include one or more of the charge level, current position, and transport speed for the mobile battery-powered entity and the other mobile battery-powered entity.

According to a tenth embodiment, a method can be provided that comprises receiving current position information and current charge level data for a plurality of mobile battery-powered entities; determining, based at least in part on the current position information and the current charge level data, one or more mobile battery-powered entities of the plurality of mobile battery-powered entities to be charged; and determining, based at least in part on the current charge level data, one or more other mobile battery-powered entities of the plurality of mobile battery-powered entities to transfer charge to the one or more mobile battery-powered entities. In some embodiments, the method can further comprise determining whether the one or more mobile battery-powered entities are within a pre-determined proximity of corresponding ones of the one or more other mobile battery-powered entities. In some embodiments, the method can further comprise, in an instance in which the one or more mobile battery-powered entities are within the pre-determined proximity of corresponding ones of the one or more other mobile battery-powered entities, transmitting route instructions and transport speed instructions to the one or more other mobile battery-powered entities; determining whether the one or more other mobile battery-powered entities have complied with the route instructions and the transport speed instructions; and if the one or more other mobile battery-powered entities have complied with the route instructions and the transport speed instructions, transmitting charge transfer instructions to the one or more other mobile battery-powered entities. In some embodiments, the method can further comprise causing the one or more other mobile battery-powered entities to transfer an electric charge to a corresponding one of the one or more mobile battery-powered entities according to the charge transfer instructions. In some embodiments, the charge transfer instructions comprise one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity. In some embodiments, the method can further comprise, in an instance in which the charge levels of the mobile battery-powered entity and the other mobile battery-powered entity are both below the pre-determined charge level, causing deployment of at least one charging vehicle or at an MoCS. In some embodiments, the plurality of mobile battery-powered entities are selected from among battery-powered terrestrial vehicles, battery-powered aerial vehicles, battery-powered aquatic vehicles, charge relay vehicles, and charge storage vehicles. In some embodiments, the method can further comprise updating a charge distribution map of the transportation network to include one or more of the charge level, current position, and transport speed for the mobile battery-powered entity and the other mobile battery-powered entity.

According to an eleventh embodiment, an apparatus is provided that comprises at least one processor and at least one memory including computer program code, the at least one memory and the computer program code configured to, with the processor, cause the apparatus to at least: receive current position information and current charge level data for a plurality of mobile battery-powered entities; determine, based at least in part on the current position information and the current charge level data, one or more mobile battery-powered entities of the plurality of mobile battery-powered entities to be charged; and determine, based at least in part on the current charge level data, one or more other mobile battery-powered entities of the plurality of mobile battery-powered entities to transfer charge to the one or more mobile battery-powered entities. In some embodiments, the at least one memory and the computer program code are configured to, with the processor, cause the apparatus to at least: determine whether the one or more mobile battery-powered entities are within a pre-determined proximity of corresponding ones of the one or more other mobile battery-powered entities; in an instance in which the one or more mobile battery-powered entities are within the pre-determined proximity of corresponding ones of the one or more other mobile battery-powered entities, transmit route instructions and transport speed instructions to the one or more other mobile battery-powered entities; determine whether the one or more other mobile battery-powered entities have complied with the route instructions and the transport speed instructions; and, if the one or more other mobile battery-powered entities have complied with the route instructions and the transport speed instructions, transmit charge transfer instructions to the one or more other mobile battery-powered entities. In some embodiments, the at least one memory and the computer program code are configured to, with the processor, cause the apparatus to at least: cause the one or more other mobile battery-powered entities to transfer an electric charge to a corresponding one of the one or more mobile battery-powered entities according to the charge transfer instructions, said charge transfer instructions comprising one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity.

According to a twelfth embodiment, a method is provided for distributing charge within a system of battery-powered vehicles. In some embodiments, the method can comprise receiving current position information, destination information, and current charge level data for a plurality of mobile battery-powered entities; and determining, based upon at least the current position information, the destination information, and the current charge level data, route instructions, speed instructions, and charge transfer instructions for each of the plurality of mobile battery-powered entities. In some embodiments, the method can further comprise generating, based upon at least the current position information, the destination information, and the current charge level data, for the plurality of mobile battery-powered entities, a charge distribution map of the system. In some embodiments, the method can further comprise identifying, based upon at least the optimal route and charge transfer instructions for each of the plurality of mobile battery-powered entities and the current charge level data for the plurality of mobile battery-powered entities, one or more charge deficient regions within the system of battery-powered vehicle; and, in an instance in which one or more charge deficient regions exist, identifying one or more charging vehicles or MoCSs to deploy within the system. In some embodiments, the method can further comprise transmitting the route instructions, speed instructions, and charge transfer instructions to one or more mobile battery-powered entities of the plurality of mobile battery-powered entities; determining whether the one or more mobile battery-powered entities have complied with the route instructions and the speed instructions; and in an instance in which the one or more mobile battery-powered entities have complied with the route instructions and the speed instructions, transmitting the charge transfer instructions to the one or more mobile battery-powered entities. In some embodiments, the method can further comprise causing the one or more mobile battery-powered entities to transfer an electric charge to a corresponding one or more other mobile battery-powered entities according to the charge transfer instructions. In some embodiments, the charge transfer instructions can comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity. In some embodiments, the plurality of mobile battery-powered entities can be selected from among battery-powered terrestrial vehicles, battery-powered aerial vehicles, battery-powered aquatic vehicles, charge relay vehicles, and charge storage vehicles. In some embodiments, the method can further comprise receiving, from the plurality of mobile battery-powered entities and the one or more charging vehicles or MoCSs, updated current position information, updated destination information, and updated current charge level data; and updating the charge distribution map of the system to include one or more of an updated charge level, an updated current position, and an updated speed for the plurality of mobile battery-powered entities and the one or more charge vehicles or MoCSs.

According to a thirteenth embodiment, an apparatus can be provided for charge distribution within a system of mobile battery-powered entities. In some embodiments, the apparatus can comprise at least one processor and at least one memory including computer program code. In some embodiments, the at least one memory and the computer program code can be configured to, with the processor, cause the apparatus to at least: receive current position information, destination information, and current charge level data for a plurality of mobile battery-powered entities and one or more MoCSs; generate, based upon at least the current position information, the destination information, and the current charge level data, for the plurality of mobile battery-powered entities and the one or more MoCSs, a charge distribution map; and determine, based upon at least the charge distribution map, route instructions, speed instructions, and charge transfer instructions for one or more mobile battery-powered entities of the plurality of mobile battery-powered entities. In some embodiments, the at least one memory and the computer program code are configured to, with the processor, cause the apparatus to at least: transmit the route instructions and speed instructions to the one or more mobile battery-powered entities; determine whether the one or more mobile battery-powered entities have complied with the route instructions and the speed instructions; and, in an instance in which the one or more mobile battery-powered entities have complied with the route instructions and the speed instructions, transmit the charge transfer instructions to the one or more mobile battery-powered entities. In some embodiments, the at least one memory and the computer program code are configured to, with the processor, cause the apparatus to at least: identify, based upon at least the charge distribution map, one or more charge deficient regions within the charge distribution map; and, in an instance in which one or more charge deficient regions exist, transmit deployment instructions to the one or more charging vehicles or MoCSs.

According to a fourteenth embodiment, a method can be carried out for charge distribution within a system of mobile battery-powered entities, the method comprising: monitoring, for a mobile battery-powered entity in a transportation network, a charge level and one or more of: a destination, a route, a current position, and a transport speed; in an instance in which the charge level of the mobile battery-powered entity is below a pre-determined charge level, causing one or more MoCSs to be deployed to a position nearby the current position of the mobile battery-powered entity; causing the one or more MoCSs to deploy at least one external battery unit to the current position of the mobile battery-powered entity while the battery-powered entity continues to travel through the transportation network, the deployed at least one external battery unit carrying a replenishing supply of charge; and initiating transfer of at least a portion of the replenishing supply of charge from the at least one external battery unit to the mobile battery-powered entity. In some embodiments, the method can further comprise: causing establishment of a charge transfer connection between the at least one external battery unit and the mobile battery-powered entity. In some embodiments, the method can further comprise: after a predetermined duration, causing cessation of transfer of at least the portion of the replenishing supply of charge from the at least one external battery unit to the mobile battery-powered entity. In some embodiments, the method can further comprise: causing the one or more MoCSs to, after the at least one external battery unit ceases transferring charge to the mobile battery-powered entity, collect the at least one external battery unit. In some embodiments, the method can further comprise: once the one or more MoCSs collects the at least one external battery unit, causing the one or more MoCSs to recharge the at least one external battery unit while the MoCSs continue to travel through the transportation network. In some embodiments, the method can further comprise: after at least one external battery unit ceases transferring charge to the mobile battery-powered entity, redirecting the mobile battery-powered entity to an external battery supply and recovery station; and causing the at least one external battery unit to be disconnected from the mobile battery-powered entity. In some embodiments, the mobile battery-powered entity is selected from among battery-powered terrestrial vehicles, battery-powered aerial vehicles, battery-powered aquatic vehicles, charge relay vehicles, and charge storage vehicles. In some embodiments, the method can further comprise: updating a charge distribution map of the transportation network to include one or more of an updated level, an updated position, and an updated transport speed for the mobile battery-powered entity.

According to a fifteenth embodiment, a method can be carried out for charge distribution within a transportation system. In some embodiments, the method can comprise: monitoring, for a mobile battery-powered entity in a transportation network, a charge level and one or more of: a destination, a route, a current position, and a transport speed; in an instance in which the charge level of the mobile battery-powered entity is below a pre-determined charge level, redirecting the mobile battery-powered entity to a first external battery supply and recovery station; and causing releasable coupling of at least one external battery from the external battery supply and recovery station to the mobile battery-powered entity such that, as the mobile battery-powered entity continues to travel through the transportation network, the at least one external battery transfers charge to the mobile battery-powered entity. In some embodiments, the method can further comprise: after a predetermined duration, causing cessation of the transfer of charge from the at least one external battery unit to the mobile battery-powered entity. In some embodiments, the method can further comprise: after the at least one external battery unit ceases transferring charge to the mobile battery-powered entity, redirecting the mobile battery-powered entity to a second external battery supply and recovery station; and causing the at least one external battery unit to be disconnected from the mobile battery-powered entity. In some embodiments, the method can further comprise: causing deployment of an MoCS to, after the at least one external battery unit ceases transferring charge to the mobile battery-powered entity, collect the at least one external battery unit. In some embodiments, the method can further comprise: once the MoCS collects the at least one external battery unit, causing the MoCS to recharge the at least one external battery unit while the MoCS continues to travel through the transportation network. In some embodiments, the mobile battery-powered entity is selected from among battery-powered terrestrial vehicles, battery-powered aerial vehicles, battery-powered aquatic vehicles, charge relay vehicles, and charge storage vehicles. In some embodiments, the method can further comprise: updating a charge distribution map of the transportation network to include one or more of an updated level, an updated position, and an updated transport speed for the mobile battery-powered entity.

According to a sixteenth embodiment, a system can be provided that comprises: one or more MoCSs comprising one or more external battery units; and one or more computing entities configured to: monitor or receive current position information, current destination information, current route information, current speed level information, and current charge level information for a plurality of mobile battery-powered entities and one or more MoCSs, and determine, based upon one or more of the current position information, the current destination information, the current route information, the current speed level information, or the current charge level information, route instructions and charge transfer instructions for one or more of the plurality of mobile battery-powered entities and at least one of the one or more MoCSs. In some embodiments, the one or more computing entities are further configured to: in an instance in which the current charge level of at least one mobile battery-powered entity of the plurality of mobile battery-powered entities is below a pre-determined charge level, cause an MoCS of the one or more MoCSs to be deployed to a position nearby a current position of the mobile battery-powered entity, cause the MoCS to deploy at least one external battery unit of the one or more external battery unit to the current position of the mobile battery-powered entity while the battery-powered entity continues to travel through the transportation network, the deployed at least one external battery unit carrying a replenishing supply of charge; and initiate transfer of at least a portion of the replenishing supply of charge from the at least one external battery unit to the mobile battery-powered entity. In some embodiments, the one or more computing entities are further configured to: cause establishment of a charge transfer connection between the at least one external battery unit and the mobile battery-powered entity. In some embodiments, the one or more computing entities are further configured to: after a predetermined duration, cause cessation of transfer of at least the portion of the replenishing supply of charge from the at least one external battery unit to the mobile battery-powered entity. In some embodiments, the one or more computing entities are further configured to: cause the MoCS to, after the at least one external battery unit ceases transferring charge to the mobile battery-powered entity, collect the at least one external battery unit. In some embodiments, the one or more computing entities are further configured to: once the MoCS collects the at least one external battery unit, cause the MoCS to recharge the at least one external battery unit while the MoCS continues to travel through the transportation network. In some embodiments, the one or more computing entities are further configured to: after the at least one external battery unit ceases transferring charge to the mobile battery-powered entity, redirect the mobile battery-powered entity to an external battery supply and recovery station; and cause the at least one external battery unit to be disconnected from the mobile battery-powered entity. In some embodiments, the mobile battery-powered entity is selected from among battery-powered terrestrial vehicles, battery-powered aerial vehicles, battery-powered aquatic vehicles, charge relay vehicles, and charge storage vehicles. In some embodiments, the one or more computing entities are further configured to: generate, based upon one or more of the current position information, the current destination information, the current route information, the current speed level information, and the current charge level information for the plurality of mobile battery-powered entities, a charge distribution map of the system. In some embodiments, the one or more computing entities are further configured to: update the charge distribution map of the transportation network to include one or more of an updated charge level, an updated position, and an updated transport speed for the mobile battery-powered entity. In some embodiments, the one or more computing entities are further configured to: transmit route instructions and transport speed instructions to the mobile battery-powered entity; and, in an instance in which the mobile battery-powered entity has complied with the route instructions and the transport speed instructions, transmit charge transfer instructions to the mobile battery-powered entity, thereby causing the MoCS to deploy the at least one external battery unit of the one or more external battery units to the current position of the mobile battery-powered entity while the battery-powered entity continues to travel through the transportation network.

According to a seventeenth embodiment, a system can be provided that comprises: one or more external battery supply and recovery stations configured to store, deploy, and receive external battery units; and one or more computing entities configured to: monitor, for a mobile battery-powered entity in a transportation network, a charge level and one or more of: a destination, a route, a current position, and a transport speed; in an instance in which the charge level of the mobile battery-powered entity is below a pre-determined charge level, redirect the mobile battery-powered entity to a first external battery supply and recovery station; and cause releasable coupling of at least one external battery from the external battery supply and recovery station to the mobile battery-powered entity such that, as the mobile battery-powered entity continues to travel through the transportation network, the at least one external battery transfers charge to the mobile battery-powered entity. In some embodiments, the one or more computing entities are further configured to: after a predetermined duration, cause cessation of the transfer of charge from the at least one external battery unit to the mobile battery-powered entity. In some embodiments, the one or more computing entities are further configured to: after the at least one external battery unit ceases transferring charge to the mobile battery-powered entity, redirect the mobile battery-powered entity to a second external battery supply and recovery station; and cause the at least one external battery unit to be disconnected from the mobile battery-powered entity. In some embodiments, the one or more computing entities are further configured to: cause deployment of an MoCS to, after the at least one external battery unit ceases transferring charge to the mobile battery-powered entity, collect the at least one external battery unit. In some embodiments, the one or more computing entities are further configured to: once the MoCS collects the at least one external battery unit, cause the MoCS to recharge the at least one external battery unit while the MoCS continues to travel through the transportation network. In some embodiments, the mobile battery-powered entity is selected from among battery-powered terrestrial vehicles, battery-powered aerial vehicles, battery-powered aquatic vehicles, charge relay vehicles, and charge storage vehicles. In some embodiments, the one or more computing entities are further configured to: update a charge distribution map of the transportation network to include one or more of an updated level, an updated position, and an updated transport speed for the mobile battery-powered entity.

According to an eighteenth embodiment, a method can be carried out that comprises: receiving, from a mobile battery-powered entity in a transportation system, a mobile charging request, the mobile charging request comprising at least a location of the mobile battery-powered entity; determining, based at least in part on the location of the mobile battery-powered entity, a location of each of a plurality of mobile charging stations, and a charge level of each of the plurality of mobile charging stations, a mobile charging station from among said plurality of mobile charging stations to be deployed for mobile charging of the mobile battery-powered entity; and causing deployment of the mobile charging station by sending a deployment request to the mobile charging station, the deployment request comprising at least the location of the mobile battery-powered entity. In some embodiments, the method can further comprise: receiving, originating from the mobile charging station, an indication regarding whether the mobile charging station has reached a location within a predetermined distance of a current position of the mobile battery-powered entity such that the mobile charging station can establish electrical communication with the mobile battery-powered entity or deploy an external battery unit to be supported by a portion of the mobile battery-powered entity; in an instance in which said indication is an affirmative indication, causing the mobile charging station to establish electrical communication with the mobile battery-powered entity or causing the mobile charging station to deploy at least one external battery unit to the current position of the mobile battery-powered entity while the battery-powered entity continues to travel through the transportation network, the deployed at least one external battery unit carrying a replenishing supply of charge; and causing transfer of at least a portion of the replenishing supply of electrical charge from the at least one external battery unit to the mobile battery-powered entity. In some embodiments, the mobile charging request further comprises charge network subscriber information associated with an operator of the mobile battery-powered entity. In some embodiments, the method can further comprise: causing transfer of a replenishing supply of electrical charge from the mobile charging station or at least one external battery unit deployed from the mobile charging station to the mobile battery-powered entity; tolling an amount of said replenishing supply of electrical charge transferred to the mobile battery-powered entity; and charging, based at least in part on said charge network subscriber information, said operator for said amount of said replenishing supply of electrical charge transferred to the mobile battery-powered entity. In some embodiments, the mobile charging request further comprises a destination of the mobile battery-powered entity. In some embodiments, the method further comprises: determining a deployment pathway of the mobile charging station deployed in the transportation network or receiving, originating from the mobile charging station, information regarding said deployment pathway; determining a destination and a desired route of the mobile battery-powered entity; and determining, based at least on the destination and the desired route of the mobile battery-powered entity and the deployment pathway of the mobile charging station, whether to modify the desired route of the mobile battery-powered entity. In some embodiments, the method further comprises: in an instance in which said determining whether to modify is determining to modify the desired route of the mobile battery-powered entity, determining a proposed alternative route for the mobile battery-powered entity based at least in part on said destination of the mobile battery-powered entity and the deployment pathway of the mobile charging station; transmitting the proposed alternative route to the mobile battery-powered entity with a request that the mobile battery-powered entity travel through said transportation network according to the proposed alternative route; and receiving, from the mobile battery-powered entity, an indication of whether the mobile battery-powered entity will commence traveling through said transportation network according to the proposed alternative route.

According to a nineteenth embodiment, an apparatus can be provided that comprises means, such as a processor and memory storing program instructions. In some embodiments, the memory and the program instructions can be configured, with the processor, to cause the apparatus at least to: receive, originating from a mobile battery-powered entity in a transportation system, a mobile charging request, the mobile charging request comprising at least a location of the mobile battery-powered entity; determine, based at least in part on the location of the mobile battery-powered entity, a location of each of a plurality of mobile charging stations, and a charge level of each of the plurality of mobile charging stations, a mobile charging station from among said plurality of mobile charging stations to be deployed for mobile charging of the mobile battery-powered entity; and cause deployment of the mobile charging station by sending a deployment request to the mobile charging station, the deployment request comprising at least the location of the mobile battery-powered entity. In some embodiments, the apparatus can further comprise means, such as the memory and the program instructions can be further configured, with the processor, to cause the apparatus at least to: receive, originating from the mobile charging station, an indication regarding whether the mobile charging station has reached a location within a predetermined distance of a current position of the mobile battery-powered entity such that the mobile charging station can establish electrical communication with the mobile battery-powered entity or deploy an external battery unit to be supported by a portion of the mobile battery-powered entity; in an instance in which said indication is an affirmative indication, cause the mobile charging station to establish electrical communication with the mobile battery-powered entity or cause the mobile charging station to deploy at least one external battery unit to the current position of the mobile battery-powered entity while the battery-powered entity continues to travel through the transportation network, the deployed at least one external battery unit carrying a replenishing supply of charge; and cause transfer of at least a portion of the replenishing supply of electrical charge from the at least one external battery unit to the mobile battery-powered entity. In some embodiments, the mobile charging request further comprises charge network subscriber information associated with an operator of the mobile battery-powered entity. In some embodiments, the apparatus can further comprise means, such as the memory and the program instructions can be further configured, with the processor, to cause the apparatus at least to: cause transfer of a replenishing supply of electrical charge from the mobile charging station or at least one external battery unit deployed from the mobile charging station to the mobile battery-powered entity; toll an amount of said replenishing supply of electrical charge transferred to the mobile battery-powered entity; and charge, based at least in part on said charge network subscriber information, said operator for said amount of said replenishing supply of electrical charge transferred to the mobile battery-powered entity. In some embodiments, the mobile charging request further comprises a destination of the mobile battery-powered entity. In some embodiments, the apparatus can further comprise means, such as the memory and the program instructions can be further configured, with the processor, to cause the apparatus at least to: determine a deployment pathway of the mobile charging station deployed in the transportation network or receiving, originating from the mobile charging station, information regarding said deployment pathway; determine a destination and a desired route of the mobile battery-powered entity; and determine, based at least on the destination and the desired route of the mobile battery-powered entity and the deployment pathway of the mobile charging station, whether to modify the desired route of the mobile battery-powered entity. In some embodiments, the apparatus can further comprise means, such as the memory and the program instructions can be further configured, with the processor, to cause the apparatus at least to: in an instance in which said determination about whether to modify the desired route of the mobile battery-powered entity is an affirmative determination, determine a proposed alternative route for the mobile battery-powered entity based at least in part on said destination of the mobile battery-powered entity and the deployment pathway of the mobile charging station; transmit the proposed alternative route to the mobile battery-powered entity with a request that the mobile battery-powered entity travel through said transportation network according to the proposed alternative route; and receive, from the mobile battery-powered entity, an indication of whether the mobile battery-powered entity will commence traveling through said transportation network according to the proposed alternative route.

According to a twentieth embodiment, a computer program product can be provided that comprises a non-transitory computer-readable medium storing program code, wherein the program code comprise instructions for causing a processor at least to: receive, originating from a mobile battery-powered entity in a transportation system, a mobile charging request, the mobile charging request comprising at least a location of the mobile battery-powered entity; determine, based at least in part on the location of the mobile battery-powered entity, a location of each of a plurality of mobile charging stations, and a charge level of each of the plurality of mobile charging stations, a mobile charging station from among said plurality of mobile charging stations to be deployed for mobile charging of the mobile battery-powered entity; and cause deployment of the mobile charging station by sending a deployment request to the mobile charging station, the deployment request comprising at least the location of the mobile battery-powered entity. In some embodiments, the program code further comprise instructions for causing a processor at least to: receive, originating from the mobile charging station, an indication regarding whether the mobile charging station has reached a location within a predetermined distance of a current position of the mobile battery-powered entity such that the mobile charging station can establish electrical communication with the mobile battery-powered entity or deploy an external battery unit to be supported by a portion of the mobile battery-powered entity; in an instance in which said indication is an affirmative indication, cause the mobile charging station to establish electrical communication with the mobile battery-powered entity or cause the mobile charging station to deploy at least one external battery unit to the current position of the mobile battery-powered entity while the battery-powered entity continues to travel through the transportation network, the deployed at least one external battery unit carrying a replenishing supply of charge; and cause transfer of at least a portion of the replenishing supply of electrical charge from the at least one external battery unit to the mobile battery-powered entity. In some embodiments, the mobile charging request further comprises charge network subscriber information associated with an operator of the mobile battery-powered entity. In some embodiments, the program code further comprise instructions for causing a processor at least to: cause transfer of a replenishing supply of electrical charge from the mobile charging station or at least one external battery unit deployed from the mobile charging station to the mobile battery-powered entity; toll an amount of said replenishing supply of electrical charge transferred to the mobile battery-powered entity; and charge, based at least in part on said charge network subscriber information, said operator for said amount of said replenishing supply of electrical charge transferred to the mobile battery-powered entity. In some embodiments, the mobile charging request further comprises a destination of the mobile battery-powered entity, and the program code further comprise instructions for causing a processor at least to: determine a deployment pathway of the mobile charging station deployed in the transportation network or receiving, originating from the mobile charging station, information regarding said deployment pathway; determine a destination and a desired route of the mobile battery-powered entity; and determine, based at least on the destination and the desired route of the mobile battery-powered entity and the deployment pathway of the mobile charging station, whether to modify the desired route of the mobile battery-powered entity. In some embodiments, the program code further comprise instructions for causing a processor at least to: in an instance in which said determination about whether to modify the desired route of the mobile battery-powered entity is an affirmative determination, determine a proposed alternative route for the mobile battery-powered entity based at least in part on said destination of the mobile battery-powered entity and the deployment pathway of the mobile charging station; transmit the proposed alternative route to the mobile battery-powered entity with a request that the mobile battery-powered entity travel through said transportation network according to the proposed alternative route; and receive, from the mobile battery-powered entity, an indication of whether the mobile battery-powered entity will commence traveling through said transportation network according to the proposed alternative route.

According to a twenty first embodiment, a method can be carried out that comprises: determining, at a mobile battery-powered entity, while the mobile battery-powered entity is traveling through a transportation network, a charge level of one or more batteries of the mobile battery-powered entity; transmitting, from the mobile battery-powered entity, to a communications entity of the transportation network, a mobile charging request, the mobile charging request comprising at least an initial location of the mobile battery-powered entity; receiving, from the communications entity or a mobile charging station, a deployment confirmation indicating that the mobile charging station has been deployed towards the initial location of the mobile battery-powered entity and a request for an updated location of the mobile battery-powered entity; and receiving, from the communications entity or the mobile charging station, a charging request comprising instructions for receiving electrical charge from the mobile charging station while continuing to travel through the transportation network or instructions for receiving at least one external battery unit from the mobile charging station. In some embodiments, the method can further comprise: receiving, originating from the mobile charging station, an indication that the mobile charging station has been deployed to within a predetermined distance of the updated location of the mobile battery-powered entity such that the mobile charging station can establish electrical communication with the mobile battery-powered entity or deploy the external battery unit to be supported by a portion of the mobile battery-powered entity; and transmitting, to the mobile charging station or the communication entity in the transportation network, a confirmation that the mobile battery-powered entity will adhere to said instructions for receiving the electrical charge from the mobile charging station or said instructions for receiving the at least one external battery unit. In some embodiments, said charging request may comprise the instructions for receiving electrical charge from the mobile charging station, the method further comprising: in an instance in which said instructions for receiving electrical charge from the mobile charging station comprises instructions to maintain a charge transfer speed that is different from a current speed of the mobile battery-powered entity, adjusting the current speed of the mobile battery-powered entity to be equivalent or substantially equivalent to the charge transfer speed; and receiving, originating from the mobile charging station, while the mobile charging station and the mobile battery-powered entity continue traveling through the transportation network, at least a portion of a replenishing supply of electrical charge stored at the mobile charging station. In some embodiments, the charging request further comprises a request for charge network subscriber information associated with an operator of the mobile battery-powered entity, and wherein the method further comprises: transmitting, to the mobile charging station or the communications entity, said charge network subscriber information, said charge network subscriber information comprising information operable for charging the operator of the mobile battery-powered entity for receiving at least a portion of a replenishing supply of electrical charge from the mobile charging station. In some embodiments, the charging request further comprises a request for the mobile battery-powered entity to provide a destination of the mobile battery-powered entity to the mobile charging station or the communications entity of the transportation network. In some embodiments, the method can further comprise: receiving, from the mobile charging station or the communication entity of the transportation network, a proposed alternative route for the mobile battery-powered entity; and transmitting, from the mobile battery-powered entity, to the mobile charging station or the communications entity of the transportation network, an indication that the mobile battery-powered entity will commence traveling through said transportation network according to the proposed alternative route.

According to a twenty second embodiment, an apparatus for managing mobile charging of a battery-powered entity can be provided, the apparatus comprising: means, such as a processor and a memory storing program instructions, wherein the memory and the program instructions are configured, with the processor, to cause the apparatus at least to: determine, while the mobile battery-powered entity is traveling through a transportation network, a charge level of one or more batteries of the mobile battery-powered entity; transmit, to a communications entity of the transportation network, a mobile charging request, the mobile charging request comprising at least an initial location of the mobile battery-powered entity; receive, from the communications entity or a mobile charging station, a deployment confirmation indicating that the mobile charging station has been deployed towards the initial location of the mobile battery-powered entity and a request for an updated location of the mobile battery-powered entity; and receive, from the communications entity or the mobile charging station, a charging request comprising instructions for receiving electrical charge from the mobile charging station while continuing to travel through the transportation network or instructions for receiving at least one external battery unit from the mobile charging station. In some embodiments, the at least one memory and the program instructions are further configured, with the at least one processor, to cause the apparatus at least to: receive, originating from the mobile charging station, an indication that the mobile charging station has been deployed to within a predetermined distance of the updated location of the mobile battery-powered entity such that the mobile charging station can establish electrical communication with the mobile battery-powered entity or deploy the external battery unit to be supported by a portion of the mobile battery-powered entity; and transmit, to the mobile charging station or the communication entity in the transportation network, a confirmation that the mobile battery-powered entity will adhere to said instructions for receiving the electrical charge from the mobile charging station or said instructions for receiving the at least one external battery unit. In some embodiments, said charging request comprises the instructions for receiving electrical charge from the mobile charging station, wherein the at least one memory and the program instructions are further configured, with the at least one processor, to cause the apparatus at least to: in an instance in which said instructions for receiving electrical charge from the mobile charging station comprises instructions to maintain a charge transfer speed that is different from a current speed of the mobile battery-powered entity, adjust the current speed of the mobile battery-powered entity to be equivalent or substantially equivalent to the charge transfer speed; and receive, originating from the mobile charging station, while the mobile charging station and the mobile battery-powered entity continue traveling through the transportation network, at least a portion of a replenishing supply of electrical charge stored at the mobile charging station. In some embodiments, the charging request further comprises a request for charge network subscriber information associated with an operator of the mobile battery-powered entity, wherein the at least one memory and the program instructions are further configured, with the at least one processor, to cause the apparatus at least to: transmit, to the mobile charging station or the communications entity, said charge network subscriber information, said charge network subscriber information comprising information operable for charging the operator of the mobile battery-powered entity for receiving at least a portion of a replenishing supply of electrical charge from the mobile charging station. In some embodiments, the charging request further comprises a request for the mobile battery-powered entity to provide a destination of the mobile battery-powered entity to the mobile charging station or the communications entity of the transportation network. In some embodiments, the at least one memory and the program instructions are further configured, with the at least one processor, to cause the apparatus at least to: receive, from the mobile charging station or the communication entity of the transportation network, a proposed alternative route for the mobile battery-powered entity; and transmit, to the mobile charging station or the communications entity of the transportation network, an indication that the mobile battery-powered entity will commence traveling through said transportation network according to the proposed alternative route.

According to a twenty third embodiment, a computer program product can be provided that comprises a non-transitory computer-readable medium storing program code, wherein the program code comprise instructions for causing a processor at least to: determine, at a mobile battery-powered entity, while the mobile battery-powered entity is traveling through a transportation network, a charge level of one or more batteries of the mobile battery-powered entity; transmit, from the mobile battery-powered entity, to a communications entity of the transportation network, a mobile charging request, the mobile charging request comprising at least an initial location of the mobile battery-powered entity; receive, from the communications entity or a mobile charging station, a deployment confirmation indicating that the mobile charging station has been deployed towards the initial location of the mobile battery-powered entity and a request for an updated location of the mobile battery-powered entity; and receive, from the communications entity or the mobile charging station, a charging request comprising instructions for receiving electrical charge from the mobile charging station while continuing to travel through the transportation network or instructions for receiving at least one external battery unit from the mobile charging station. In some embodiments, the program code further comprise instructions for causing the processor at least to: receive, originating from the mobile charging station, an indication that the mobile charging station has been deployed to within a predetermined distance of the updated location of the mobile battery-powered entity such that the mobile charging station can establish electrical communication with the mobile battery-powered entity or deploy the external battery unit to be supported by a portion of the mobile battery-powered entity; and transmit, to the mobile charging station or the communication entity in the transportation network, a confirmation that the mobile battery-powered entity will adhere to said instructions for receiving the electrical charge from the mobile charging station or said instructions for receiving the at least one external battery unit. In some embodiments, said charging request comprises the instructions for receiving electrical charge from the mobile charging station, wherein the program code further comprise instructions for causing the processor at least to: in an instance in which said instructions for receiving electrical charge from the mobile charging station comprises instructions to maintain a charge transfer speed that is different from a current speed of the mobile battery-powered entity, adjust the current speed of the mobile battery-powered entity to be equivalent or substantially equivalent to the charge transfer speed; and receive, originating from the mobile charging station, while the mobile charging station and the mobile battery-powered entity continue traveling through the transportation network, at least a portion of a replenishing supply of electrical charge stored at the mobile charging station. In some embodiments, the charging request further comprises a request for charge network subscriber information associated with an operator of the mobile battery-powered entity, wherein the program code further comprise instructions for causing the processor at least to: transmit, to the mobile charging station or the communications entity, said charge network subscriber information, said charge network subscriber information comprising information operable for charging the operator of the mobile battery-powered entity for receiving at least a portion of a replenishing supply of electrical charge from the mobile charging station. In some embodiments, the charging request further comprises a request for the mobile battery-powered entity to provide a destination of the mobile battery-powered entity to the mobile charging station or the communications entity of the transportation network. In some embodiments, the program code further comprise instructions for causing the processor at least to: receive, from the mobile charging station or the communication entity of the transportation network, a proposed alternative route for the mobile battery-powered entity; and transmitting, from the mobile battery-powered entity, to the mobile charging station or the communications entity of the transportation network, an indication that the mobile battery-powered entity will commence traveling through said transportation network according to the proposed alternative route.

BRIEF DESCRIPTION OF THE DRAWINGS

The accompanying drawings, which constitute a part of the description, illustrate embodiments of the present invention and, together with the description thereof, serve to explain the principles of the present invention.

DETAILED DESCRIPTION

Figure 1:
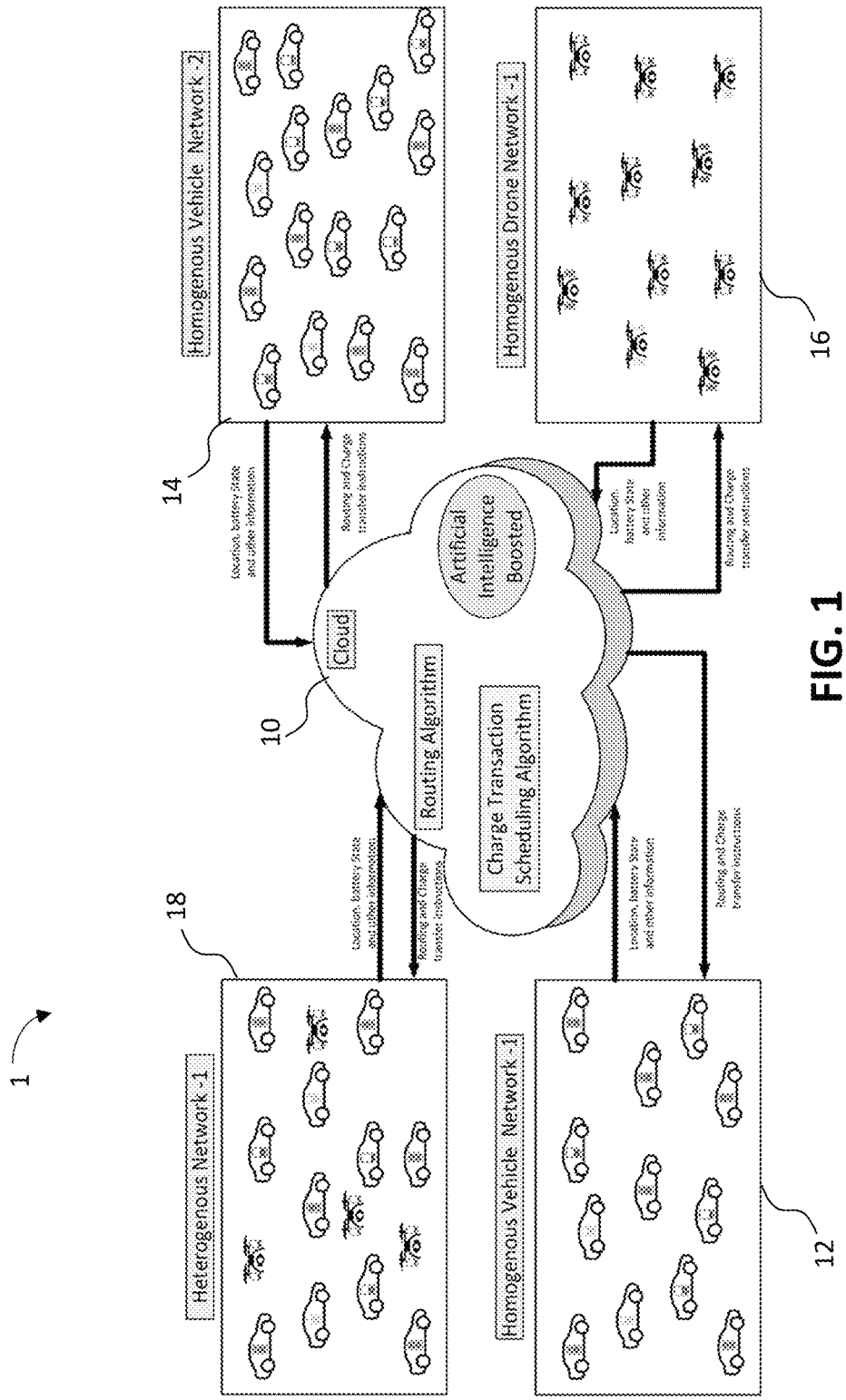
FIG. 1 provides an example of a system for charging a network of mobile battery-operated units on the go, according to some embodiments discussed herein.

One barrier to the adoption of electric vehicles (EV) into mainstream use is due to anxiety about limited driving range that may be caused by the limited battery life experienced by many EVs. For most, if not all EVs, periodic, often frequent, recharging of the vehicles, as well as long recharging times ranging anywhere from 20 minutes to 20 hours is often required. Inefficient charging cycles or complete discharge of a battery can reduce battery life, making it imprudent to travel the full range provided by the battery without any recharging in the middle. Even though major cities in developed countries have charging stations, the amount is still unable to support a large EV population. Charging stations in remote regions are few and far between. Most of the existing charging stations are Level-2 (220V) which typically require long waiting periods to charge a vehicle. Level-3 charging stations or DC fast charging (DCFC) (440V) stations are a faster alternative; however, they are limited and very expensive to build. Additionally, other types of mobile battery-operated units, such as drones, unmanned underwater vehicles (UUV), and electric boats also experience these problems but are currently unable to conveniently recharge. With these concerns in mind, research has been conducted into several potential solutions, including innovations in EV battery technologies, but concluded that the battery range and charging time remain critical barriers. Some solutions, such as charging via solar-powered roads, are not applicable, efficient, cost-effective, technologically possible and/or politically doable in all countries, regions, or geographies.

Current methods for charging a battery for a battery-powered entity (e.g., vehicle, drone, vessel, robotic system, etc.) typically require that the battery-powered vehicle be parked in a fixed location during charging, and the user of the battery-powered entity must typically initiate charging of the battery-powered entity manually. This typically requires a great deal of time for charging and reflects a large inconvenience to the user of the battery-powered entity. As a further example of current hurdles to large-scale implementation, there are currently a limited number of charging ports at fixed charging locations for battery-powered entities, meaning that use of the charging ports typically operates on a first come, first serve basis. In other words, a first battery-powered entities having a battery at 90% charge capacity might be connected by the user for any reason before a user of a second battery-powered entities having a battery at 20% charge capacity without any priority given to the battery-powered entities having a lower charge capacity. Thus, there is currently no way to determine at a system level which battery-powered entities should be charged and at which charging location. As an additional example of current hurdles to large-scale implementation, the system of battery-powered entities currently includes a variety of different entity types, however none of the various entity types can be charged at the same fixed charging location, meaning redundant charging stations might be necessary at many locations to accommodate the various entity types. Therefore, there is a long-felt need in the industry for a system, method, and apparatus for charging battery-powered entities without relying on fixed charging stations, considering the need for and optimization of charge power to battery-powered entity within complex vehicle networks, and enabling either homogeneous or heterogeneous charging of battery-powered entities while they are "on-the-go," being transported through the system, in motion, in use, or the like.

As such, according to the current systems and approaches for charging EVs, EVs have a range that is limited by battery capacity and charge density, among other factors, which can restrict the effectiveness and suitability of EVs for long-distance driving. Even with enough charging stations, the charging stations are properly located along a driver's intended route, and rapid charging is used at every charging station along a driver's intended route, the travel time is impacted due to frequent, long halts for charging. Further, while the driver's intended route may have sufficient number of charging stations, all perfectly distributed and located along the driver's intended route, the driver is still forced to maintain their intended route and may not deviate unless they previously plan their deviation from the intended route to ensure there are sufficient charging stations located along the new route which deviates from the intended route.

Also, most of the modern high-end EVs are using Lithium-ion batteries, for which complete discharging and charging, or inefficient charging cycles can cause the Lithium-ion batteries to age at an accelerated rate. Hence, a long-distance drive without recharging the battery is undesirable for EVs. While improving the battery capacity is undoubtedly helpful, it could significantly increase the price of the EV. Besides, increasing battery capacity also may not solve the core problem of having to stop at a designated station to recharge.

As research continues to progress with regard to lithium-ion batteries that have a higher charge capacity or charge density, among other characteristics, the price per kilowatt-hour (kWh) for lithium-ion batteries is being reduced, but at a comparatively slow rate, making it difficult to increase the battery capacity of EVs without a drastic price increase. In addition, even drastically increasing the battery capacity of EVs will likely only solve some of the problem and may well only be possible for very high-end EVs due to the elevated cost of such advanced battery technologies. Even high-end EVs may have a maximum range of 300 to 370 miles but suffer from high charging times. Even with a 220V charging station, it often takes about 10 hours for a full charge. Although 440V stations may reduce the charging time, the amount of charging stations expected to be required to support a large EV fleet would be enormous and costly.

Currently, there are only limited stationary charging stations, even in urban areas of the wealthiest countries in the World. The overall number of stationary charging stations are few compared to refueling stations for vehicles with internal combustion engines (ICEs) and mostly limited to urban areas. EVs, especially high-end EVs, will suffer long charging times are level-1 or level-2 charging stations.

A brute force solution to the battery range and charging problem could be to build a high concentration of very high speed (Level-3) charging stations to allow fast charging anywhere in the World. However, dense and uniformly placed Level-3 stations costing around $100,000 each is not feasible. Furthermore, the local power grids must be able to handle the large amount of power that must be transferred in a short amount of time for these stations. Also, there are currently very few level-3 stations (a.k.a. DC Fast Charging [DCFC] stations), making it infeasible to sustain a big EV fleet. Furthermore, building a large number of DCFC stations to sustain a big EV fleet is financially infeasible as each charging unit costs between about $10,000 U.S. Dollars (USD) and about $40,000 USD. Even if such DCFC stations could be built and distributed across a geography, there will still be many instances in which a higher density of EV drivers are clustered around a limited supply of DCFC units at one or more local DCFC stations while other DCFC stations in other areas go relatively unused. The immobility of the fixed location charging system, coupled with the unpredictable and dynamic nature of EV traffic patterns in EV charging systems makes it impossible to quickly adjust charging supply to changes in charging demand.

Another possible solution is to charge vehicles on the fly directly from the roadway. However, in initial implementations in France and elsewhere, roadways fitted with solar panels and designed to charge vehicles on the fly were only able to produce about 80,000 kWh per year due at least in part to the inherent dependency on suitable weather. Converting every road in the world into an electric/solar road is a big financial undertaking, rendering the solution infeasible. Likewise, roadways for on-the-fly EV charging that are powered by the grid are inefficient as every portion of the roadway must be powered by costly and environmentally impacting grid electricity, which is dependent upon the regional or local grid mixture and the inherent environmental impacts and costs associated therewith.

As such, provided herein are apparatuses, systems, computer program products, and methods for charging a network of mobile battery-operated units on the go. According to some embodiments, a method can comprise determining that a mobile battery-powered entity capable of receiving at least one external exchangeable battery unit, is below a pre-determined (e.g., configurable) charge level, causing one or more mobile charging stations (MoCSs) to deploy to the mobile battery-powered entity and deliver at least one external battery unit to the mobile battery-powered entity while in motion, where the external battery unit at least can power the entity and recharge the entity's internal battery, and the MoCS may or may not pick up one or more discharged external battery units from the mobile battery-powered entity.

According to some embodiments, a method can comprise determining that a mobile battery-powered entity with an external exchangeable battery below a pre-determined charge level, causing a MoCS to deploy to the mobile battery-powered entity and pick up at least one discharged external battery unit from the mobile battery-powered entity while in motion, and the MoCS may or may not deliver one or more charged external battery units.

According to other embodiments, a method can comprise determining that a mobile battery-powered entity capable of receiving one or more external exchangeable battery units, is below a pre-determined (e.g., configurable) charge level, causing a control and management system to route the mobile battery-operated vehicle to a battery station, where at least one external battery unit may be attached to the mobile battery-powered entity, and the mobile battery-powered entity may or may not pick up one or more charged external battery units.

According to other embodiments, a method can comprise determining that a mobile battery-powered entity with an external exchangeable battery below a pre-determined charge level, causing a control and management system to route the mobile battery-operated vehicle to a battery station, where at least one discharged external battery unit from the mobile battery-powered entity may be dropped off, and the mobile battery-powered entity may or may not pick up one or more one or more charged external battery units.

According to some embodiments, a method can comprise determining that a mobile battery-powered entity is within a pre-determined proximity of another mobile battery-powered entity, determining a charge level and a transport speed of the mobile battery-powered entity, determining the charge level and the transport speed of the other mobile battery-powered entity, in an instance in which the charge level of the mobile battery-powered entity is below a pre-determined (e.g., configurable) charge level and less than the charge level of the other mobile battery-powered entity, causing the mobile battery-powered entity to receive an electric charge from the other mobile battery-powered entity, and in an instance in which the charge level of the other mobile battery-powered entity is below the pre-determined (e.g., configurable) charge level and less than the charge level of the other mobile battery-powered entity, causing the other mobile battery-powered entity to receive the electric charge from the mobile battery-powered entity.

According to other embodiments, an apparatus can comprise at least one processor and at least one memory including computer program code, the at least one memory and the computer program code configured to, with the processor, cause the apparatus to at least receive current charge level data for a plurality of mobile battery-powered entities, determine, based at least in part on the current charge level data, one or more mobile battery-powered entities of the plurality of mobile battery-powered entities to be charged, determine, based at least in part on the current charge level data, one or more other mobile battery-powered entities of the plurality of mobile battery-powered entities to be caused to charge the one or more mobile battery-powered entities; and cause, while the one or more mobile battery-powered entities and are being transported within a pre-determined proximity of the one or more other mobile battery-powered entities, the one or more other mobile battery-powered entities to charge the one or more mobile battery-powered entities.

According to yet other embodiments, a method can comprise receiving current charge level data for a plurality of mobile battery-powered entities, determining, based at least in part on the current charge level data, one or more mobile battery-powered entities of the plurality of mobile battery-powered entities to be charged, determining, based at least in part on the current charge level data, one or more other mobile battery-powered entities of the plurality of mobile battery-powered entities to be caused to charge the one or more mobile battery-powered entities, and causing, while the one or more mobile battery-powered entities and are being transported within a pre-determined proximity of the one or more other mobile battery-powered entities, the one or more other mobile battery-powered entities to charge the one or more mobile battery-powered entities.

According to still other embodiments, a method can comprise wirelessly transmitting, from a mobile battery-powered entity while the mobile battery-powered entity is being transported through a predefined area, a current charge level to a computing device, receiving an indication from the computing device as to whether the mobile battery-powered entity is to charge another mobile battery-powered entity, to be charged by the other mobile battery-powered entity, or neither charge nor be charged by the other mobile battery-powered entity, and in an instance in which the indication received indicates that the mobile battery-powered entity is either to charge or be charged by the other mobile battery-powered entity: determining a geospatial location and a transport speed of the mobile battery-powered entity, receiving the geospatial location and the transport speed of the other mobile battery-powered entity, causing the mobile battery-powered entity to speed lock with the other mobile battery-powered entity based at least in part on the geospatial location and the transport speed of the mobile battery-powered entity and the other mobile battery-powered entity, in an instance in which the indication received indicates that the mobile battery-powered entity is to charge the other mobile battery-powered entity, causing the mobile battery-powered entity to transmit a charge to the other mobile battery-powered entity, and in an instance in which the indication received indicates that the mobile battery-powered entity is to be charged by the other mobile battery-powered entity, causing the mobile battery-powered entity to receive the charge from the other mobile battery-powered entity.

As used herein, the terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the other computing device or may be received indirectly via one or more computing devices, such as, for example, one or more servers, relays, routers, network access points, base stations, and/or the like.

As used herein, the term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term "circuitry" refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

As used herein, the term "mobile entity" refers to any entity, vehicle, device, apparatus, system, equipment, or the like that is capable of and configured to move during at least some of the course of normal use or operation of the same. The terms "entity," "battery-powered entity," "mobile entity," "mobile battery-powered entity," "vehicle," "electric vehicle," "autonomous vehicle," "drone," "equipment," "vessel," and similar terms may be used interchangeably, according to some example embodiments of the present invention, to refer to any means of transportation, conveyance, transference, shipment, or passage in the physical world.

As used herein, the term "battery-powered" refers to an entity, such as a mobile entity, that is partially or fully powered using a battery collocated with the entity. For purposes of the present disclosure, the battery collocated with and at least partially powering such entities are considered to be rechargeable, replaceable, or both.

As used herein, "on-the-go" refers to activities that occur while terrestrial entities, aerial entities, aquatic entities, relay entities, charging entities, and other entities within the system that participate in or facilitate a charge transaction are in motion.

As used herein, the term "charging network" refers to discrete, disperse entities (such as mobile entities, stationary entities, devices, telecommunications equipment, a power supply, and the like) configured to participate, under at least partial guidance or direction from a centralized computing device, in one or more charge transactions.

As used herein, the term "computing device" refers to a specialized, centralized device, network, or system, comprising at least a processor and a memory device including computer program code, and configured to provide guidance or direction related to the charge transactions carried out in one or more charging networks.

As used herein, the term "charge transaction" refers to an instance of communicating a replenishing supply of electric charge to a battery-powered entity within a charging network.

As used herein, the term "battery" refers to any electrochemical cell capable of storing charged particles (such as electrons and/or protons) and/or generating a current of electrons (such as from ion exchange due to a reduction/oxidation reaction in the battery). The terms "battery," "rechargeable-battery," "charge storage device," "electrochemical cell," "power pack," "battery stack," and similar terms may be used interchangeably, according to some example embodiments of the present invention, to refer to means of generating and/or storing electrical charge.

As used herein, the terms "about," "substantially," and "approximately" generally mean plus or minus 10% of the value stated, e.g., about 250 µm would include 225 µm to 275 µm, about 1,000 µm would include 900 µm to 1,100 µm.

In some embodiments, to allow for efficient charge sharing, a cloud-based control system is provided that comprises a charge transaction scheduling unit, a rerouting unit, and a database for storing information from EVs. In some embodiments, EVs can interact with each other and the control system. The control system can instruct some EVs to share charge with some other EVs, can reroute some specific EVs to bring charge providers and receivers together, can speed lock EVs to allow seamless charge sharing, and/or can detach a charge provider/receiver for overall network charge optimization. To allow the charge scheduler to operate, the EVs can send information to the control system periodically. By way of example only, EV-to-EV synchronization for charge sharing can be carried out by dividing a road system into sections having separate control systems doing the micromanagement, or management of different sections of the road system. In some embodiments, the system can use a global control system to manage the separate control systems that are managing the different sections of the road system, e.g., for handling hand-off of EVs between different sections, for managing charge sharing between different sections, and/or the like. In some embodiments, sharing charge between EVs can distribute the total charge in the network among all the entities.

In some embodiments, without an outside-the-network charge source, the network may experience a slow overall charge decay, which may increase the percentage of EV halts. As used herein, EV halts are instances in which an EV must stop in the road system, either at a charging station, to wait for another EV to arrive to provide a replenishing charge, or because the EV's charge has run out and further progress is not possible. In some embodiments, in an effort to reduce EV halts across the road system, one or more MoCS can be mobilized. In some embodiments, MoCS can introduce a high volume of charge into the network. In some embodiments, a MoCS can charge one or more EVs in a particular lane of traffic, can charge a depleted MoCS, can charge a stationary charging station, can find and provide charge to a halted EV that does not have any remaining charge, and/or the like.

In some embodiments, in order to identify charge deprived regions in the road system, the control unit can maintain a charge distribution map that is updated at a regular interval. In some embodiments, MoCS can be mobilized to charge deprived regions of the road system or a particular section of the road system, e.g., if the constraints of the algorithm permit.

Furthermore, described herein are scalable peer-to-peer vehicle charging solutions that are both low cost and easily to implement with minimal changes to the EVs. According to some embodiments, vehicles will share charge and sustain each other to reach their respective destinations. In some embodiments, a set of cloud-based schedulers may be used to automatically and dynamically monitor participants (e.g., EVs, etc.), decide which participants will be charge providers and receivers (or on standby), and/or control charging locally, regionally, or at a system level.

In some embodiments, based, for instance, on the charge transaction and subsequent reroute decisions, the cloud-based control system can instruct the EVs to carry out charge transfer operations. With this scheme in place, the total charge in the EV network may eventually spread out across all the EVs. However, even in a dynamic network with EVs entering and leaving, as observed through simulation, the total charge of the network will slowly deplete. As such, according to some embodiments, to keep the EVs in a state of perpetual motion, a system may include one or more MoCS, to bring in a considerable amount of outside charge into the EV network. In some embodiments, EVs may then be responsible for the fine-grained distribution of the outside charge deposited by the MoCS. In some embodiments, a local, remote, distributed, cloud, or networked controller or the like may be used to make such charge scheduling decisions. In some embodiments, such a controller may employ a scheduling algorithm that controls the charge transactions and decides when and where to insert a new MoCS. In some embodiments, the effectiveness of a scheduling algorithm may be quantitatively analyzed using a Simulator of Urban Mobility (SUMO) traffic simulator. As demonstrated later in this disclosure, the scheduling algorithms presented herein are fast, scalable, and efficient in dealing with battery-related problems present in modern EVs. The hereinbelow described systems, methods, algorithms, processes, apparatuses, and computer programs address at least some of the long-felt needs in the EV industry by introducing solutions to address EV charging issues by implementing an on-the-go peer-to-peer EV charge sharing scheme, providing a complete framework to enable electric vehicles to share charges as guided by, e.g., a cloud-based control system, provide systems and methods which utilize MoCSs, which fit seamlessly into the described framework, to counteract system charge depletion and/or address local, intra-system charge depletion and charge imbalances, provide algorithms for charge transaction scheduling and MoCS insertion that may also control the EVs for optimal rerouting and charge sharing, and provide an approach for quantitatively analyzing the effectiveness of the described systems, algorithms, methods, apparatuses, and computer programs using extensive simulations in SUMO.

Embodiments described herein relate generally to methods, systems, apparatuses, and associated algorithms for autonomous on-the-go charging of a network of battery-operated mobile entities, including, but not limited to, autonomous/semi-autonomous/manual vehicles, aerial vehicles such as drones, equipment, aquatic vehicles, charging vehicles, relay vehicles, robots, and the like, while the mobile entities are being transported within the system. The system can comprise a plurality of battery-powered vehicles of one or more vehicle types, the plurality of battery-powered vehicles being in wireless communication with one or more computing devices, including one or more servers, one or more relays, one or more routers, one or more network access points, one or more base stations, one or more clouds, one or more processors, the Internet, other such apparatuses or combinations thereof. A computing device can be configured to receive and transmit signals, data, files, or the like from or to battery-powered vehicles. Signals sent and received by the computing devices may include signaling information in accordance with an air interface standard of an applicable cellular system, and/or any number of different wireless networking and/or communications techniques, comprising but not limited to a fifth-generation (5G) wireless network or the like, a Wi-Fi, wireless local access network (WLAN) techniques such as Institute of Electrical and Electronics Engineers (IEEE) 802.11, 802.16, and/or the like. In addition, these signals may include vehicle characteristic data, sensor feedback data, vehicle generated/requested data, user generated/requested data, control instructions, global positioning system (GPS) position, battery status, destination, route information, road conditions, weather conditions, and/or the like. The system can be configured such that charging of battery-powered vehicles can be controlled by the computing device.

The plurality of battery-powered vehicles can comprise at least one of one or more battery-powered terrestrial vehicles, one or more battery-powered aerial vehicles, one or more battery-powered aquatic vehicles, and/or one or more charging vehicles. In some embodiments, battery-powered terrestrial vehicles can comprise but are not limited to automobiles, passenger trucks, cargo vans, transport trucks, eighteen-wheelers, lulls, dump trucks, tractors, motorcycles, snowmobiles, trains, buses, lorries, tanks, trailers, trolleys, scooters, electric bicycles, electric scooters, trams, all-terrain vehicles, recreational vehicles, electric unicycles, electric tricycle, cultivator, harvester, mower, wagon, bulldozer, grader, loader, forklift, crane, paver, loader, street sweeper, garbage truck, front-end loader, feller buncher, backhoe, excavator, any other suitable terrestrial vehicles, equipment, or apparatuses, and any variants or combinations thereof.

In some embodiments, battery-powered aerial vehicles can comprise but are not limited to any fixed wing or rotorcraft, unmanned aerial vehicles, unmanned aerial systems, unmanned combat aerial vehicles, drones, remote-controlled vehicles, airplanes, turbojets, turbofan craft, propeller planes, jet engine aircraft, helicopters, quadcopters, autogyros, cyclogyros, ornithopters, Flettner aircraft, hovercraft, monoplanes, biplanes, rocket-powered aircraft, spacecraft, motor gliders, ducted fan aircraft, airships, personal air vehicles, electric flying vehicles, tilting ducted fan aircraft, any other suitable aerial vehicles, equipment, or apparatuses, and any variants or combinations thereof. In some embodiments, battery-powered aquatic vehicles can comprise but are not limited to any fan-powered aquatic vehicles, jet-powered aquatic vehicles, propeller powered aquatic vehicles, hydrojet powered aquatic vehicles, airboats, barges, cruise ships, cutter, ferry, sloop, scow, freighter, hydroplane, hydrofoil, houseboat, jet ski, jetboat, ketch, naval ship, pontoon, pleasure craft, personal water craft, tanker, tugboat, towboat, trawler, yachts, submarines, any other suitable aquatic vehicles, equipment, or apparatuses, and any variants or combinations thereof.

In some embodiments, charging vehicles can comprise any vehicle or other mobile entity capable of receiving, storing, and/or transmitting an electric charge. In some embodiments, a charging vehicle can be similar to any of the battery-powered aerial vehicles, battery-powered terrestrial vehicles, and/or the battery-powered aquatic vehicles.

In some embodiments in which the system includes a plurality of battery-powered terrestrial vehicles, the system can further include one or more terrestrial charging vehicles. In some other embodiments in which the system includes a plurality of battery-powered aerial vehicles, the system can further include one or more aerial charging vehicles. In some other embodiments in which the system includes a plurality of battery-powered aquatic vehicles, the system can further include one or more aquatic charging vehicles. In some embodiments in which the system includes a plurality of battery-powered terrestrial vehicles and a plurality of battery-powered aerial vehicles, the system can further include one or more terrestrial charging vehicles and one or more aerial charging vehicles. In some other embodiments in which the system includes at least two of a) a plurality of battery-powered terrestrial vehicles, b) a plurality of battery-powered aerial vehicles, and/or c) a plurality of battery-powered aquatic vehicles, the system can comprise one or more of terrestrial, aerial, and/or aquatic charging vehicles, respectively.

In some embodiments, battery-powered mobile entities can be configured to be charged by a charging vehicle and/or another battery-powered mobile entity. In some embodiments, a charging network can comprise a first mobile battery-powered entity, such as a first automobile, can be configured to be electrically coupled to a second mobile battery-powered entity, such as a second automobile in order for the first battery-powered entity to receive or transmit electric charge from or to the second battery-powered entity. In other words, in some embodiments, the first automobile can be configured to establish a charging connection to the second automobile in order for the first automobile to charge or be charged by the second automobile. In some embodiments, the first vehicle can additionally or alternatively be configured to be electrically coupled to a charge vehicle such that a replenishing charge can be communicated from a charge vehicle to the first automobile and from the first vehicle to the second vehicle. In some embodiments, the first automobile, having sufficient charge to both operate and charge the second automobile, can be configured to be releasably, electrically coupled to the second automobile to communicate a replenishing supply of electric charge to the second automobile, in particular, to the battery of the second automobile. Likewise, in some embodiments, an automobile, having sufficient charge to both operate and charge a nearby unmanned aerial vehicle, can be configured to be releasably coupled and/or electrically coupled to the unmanned aerial vehicle to communicate a replenishing supply of electric charge to the unmanned aerial vehicle. As such, any one or more mobile entities described herein can be caused to communicate a replenishing supply of electric charge to any one or more other mobile entities, of any type or mode of transport, within the systems described.

Such charge transactions can be coordinated by a computing device, e.g., a cloud that comprises one or more servers connected to the charged and/or charging mobile entities via a wireless connection. In some embodiments, one or more of a charging entity, a relay entity, and a charged entity involved in a charge transaction can be informationally coupled to the computing device such that information about the charge transaction can be communicated to the computing device. Likewise, the computing device can be informationally coupled to one or more of a charging entity, a relay entity, and a charged entity involved in a charge transaction such that information, signals, suggested actions, and/or commands related to the charging transaction can be communicated to one or more of the charging entity, the relay entity, and the charged entity. In some embodiments, such informational coupling can be carried out wirelessly via a computing device, satellite, relay tower, cell tower, WiFi hotspot, transceiver, transponder, receiver, other suitable telecommunications equipment, or combinations thereof.

In some embodiments, the computing device, such as a server or a cloud computing environment, can be configured to maintain the charge distribution map based upon available sources of charging, entities may need charging, and other relevant aspects and information related to the preparation and enactment of a charge transaction schedule. In other words, in some embodiments, the cloud computing environment or the like can use algorithms or other means for scheduling charge transactions between of heterogeneous or homogeneous mobile entities within a charging network.

In some embodiments, the charging network can comprise tens, hundreds, thousands, millions, or more of any sort or type or mode of transport of mobile entities described herein. In some embodiments, the charging network can also include charging entities, such as mobile and/or stationary charging entities. In some embodiments, the mobile charging entities can be charging trucks, charging aerial vehicles, charging aquatic vessels, or the like. In some embodiments, the mobile charging entity can comprise a charge storage device, such as a battery, a stack of batteries, a power bank, or any other suitable means for storing electric charge as ions or electrons, for generating electrons from chemical reactions such as redox reactions, or the like. By way of example only, and in no way meaning to limit the scope of this disclosure, some of the suitable battery types/chemistries that can be used include but are not limited to zinc-carbon, zinc-chloride, alkaline, nickel oxyhydroxide, lithium-containing, lithium-based, lithium-copper oxide, lithium-ion disulfide, lithium-manganese dioxide, lithium-carbon fluoride, lithium-chromium oxide, lithium-silicon, mercury oxide, zinc-air, Zamboni pile, silver oxide, magnesium, nickel-cadmium, lead-acid, nickel-metal hydride, nickel-zinc, silver-zinc, lithium-iron-phosphate, lithium ion, solid state batteries, aluminum air, Daniell cells, Li—$CoO_2$, Li—$MnO_2$, Li—$Mn_2O_4$, Li—$BF_4$, Li—$NiMnCoO_2$, Li—$FePO_4$, Li—$NiCoAlO_2$, $Li_4$—$Ti_5O_{12}$, Li—$FeS_2$, Li—$SOCl_2$, Li—$SOCl_2$—BrCl, Li—$SO_2Cl_2$, Li—$SO_2$, Li—$I_2$, Li—$Ag_2CrO_4$, Li—$Ag_2V_4O_{11}$, Li—CuO, Li—$Cu_4O(PO_4)_2$, Li—CuS, Li—PbCuS, Li—FeS, Li—$Bi_2Pb_2O_5$, Li—$Bi_2O_3$, Li—$V_2O_5$, Li—$CoO_2$, Li—$NiCoO_2$, Li—$CuCl_2$, Li/Al—$MnO_2$, Li/Al—$V_2O_5$, Li—Se, other suitable chemistries and configurations, variants thereof, and any combination thereof.

In some embodiments, the scheduling, commencement, and/or termination of, payment for, and record-keeping for charge transactions within a charging network or a plurality of charging networks can be governed by at least one or more centralized computing devices (e.g., a cloud). In some embodiments, the one or more computing devices can be configured to track the plurality of vehicles and dynamically authorize charging according to a charge-distribution map. In some embodiments, a computing device can, once, intermittently, or in real-time, generate the charge-distribution map, e.g., with the use of one or more scheduling algorithms. In some embodiments, if the computing device is a cloud computing environment in communication with a plurality of battery-powered vehicles or other battery-powered entities, the cloud can maintain an updated charge-distribution map, receive from the battery-powered entities updated GPS position, speed of travel, type of vehicle/entity, road/weather conditions, and other useful information, and employ an efficient charge scheduling algorithm to schedule charging instances between entities that are controllable within the system. In other words, the battery-powered vehicles transmit, e.g., in real-time, sufficient pertinent information to the cloud such that the cloud computing environment is able to use one or more charge-scheduling algorithms to schedule the next instances of charging between entities within the system and to update the charge-distribution map.

In some embodiments, a first mobile entity may not have the capability to, at least temporarily, communicate with the computing device (e.g., cloud), but may have the capability to communicate with a second mobile entity nearby the first mobile entity, the second mobile entity having the capability to communicate with the computing device. In such an embodiment, it might be helpful for the second mobile entity to relay the information from the first mobile entity to the computing device and to relay other information from the computing device to the first mobile entity. In such embodiments, the second mobile entity acts as a relay entity and can be so named in such a network. In some embodiments, a relay entity can communicate any data gathered by, received by, or generated by a battery-powered mobile entity to the computing device (e.g., cloud), in which case the computing device can update the charge-distribution map with said data from the battery-powered mobile entity, employ an algorithm or other such decision-making model or computer program to determine if a charging transaction is required, and can transmit or otherwise communicate instructions to the relay entity, the relay entity configured to either act upon the instructions or further communicate said instructions on to another entity such as the battery-powered mobile entity. In some embodiments, a relay entity can be configured to communicate with a plurality of mobile entities within a pre-determined proximity to the relay entity. In some embodiments, the relay entity can be a charging entity, a terrestrial mobile entity, an aerial mobile entity, an aquatic mobile entity, a stationary entity, or an intermediary communications entity such as a telecommunications tower or other such telecommunications device.

Once the computing device (e.g., cloud) determines that a charging transaction is desired or required, the computing device can communicate by any suitable means with one or more participants to the charging transaction with instructions to carry out the charging transaction. Upon receiving the instructions to carry out the charging transaction, the one or more participants to the charging transaction can initiate the charging transaction unilaterally, communicate the instructions to one or more other participants to the charging transaction, assume partial or total control of one or more other participants to the charging transaction, or otherwise initiate the charging transaction. In some embodiments, the computing device provides instructions to a relay vehicle to initiate a charging transaction between a nearby charging vehicle and a nearby battery-powered vehicle. The relay vehicle can then communicate said instructions to the charging vehicle solely or to the charging vehicle and also the battery-powered vehicle. In some embodiments, upon receiving said instructions at the charging vehicle, the charging vehicle can initiate communications with the battery-powered vehicle in order to facilitate and/or receive authorization for initiation of the charging transaction. In some embodiments, the charging vehicle might send a signal via a transceiver to a receiver of the battery-powered vehicle, the signal indicative of a command or a request. In some embodiments, the signal might be indicative of a command for the battery-powered vehicle to change its position and/or location with respect to the charging vehicle. In some embodiments, the signal might be indicative of a command for the battery-powered vehicle to changes its speed and/or velocity, such as by "speed locking" with the charging vehicle. In some embodiments, the signal might be indicative of an intention by the charging vehicle to changes its position, location, speed, and/or velocity to match those of the battery-powered vehicle. In some embodiments, the signal might be indicative of a request that the battery-powered vehicle carry out any of the previous actions described, with the difference between a request and a command being that the battery-powered vehicle can refuse to comply with the request whereas the battery-powered vehicle might be either not capable, only partially capable, or only capable following a particular emergency procedure, of refusing to comply with the command.

In some embodiments, once the battery-powered vehicle receives the signal, the battery-powered vehicle can be configured to immediately comply, to return a separate signal from a transceiver of the battery-powered vehicle to a receiver of the charging vehicle of an intention to comply with the instructions to initiate the charge transaction, can return a signal indicative of an intention to not comply with the instructions to initiate the charge transaction, a signal indicative of an alternative course of action or additional course of action with respect to the instructions to initiate a charge transaction, or combinations thereof. Such a return signal from the battery-powered vehicle can be considered a "hand shake" between the charging vehicle and the battery-powered vehicle, which can be carried out with or without encryption or other such authentication and/or security measures. In some embodiments, such an authentication measure might include the battery-powered vehicle communicating directly with the computing device (e.g., cloud) to verify the instructions received from the charging vehicle, to authorize payment for the charging transaction, or to verify or correct data related to the battery-powered vehicle, such as the battery-powered vehicle's location, position, speed, velocity, vehicle type, battery type, battery charge level, desire or lack thereof for participating in the charge transaction, or any other such information as necessary. All or some of this information can also be relayed to the computing device via the charging vehicle, via another battery-powered vehicle, via a relay device such as a mobile phone, tablet, WiFi router, telecommunications tower, other suitable telecommunications devices, variants thereof, and any combination thereof.

In some embodiments, once the particular details of the charge transaction are agreed upon between two or more of the battery-powered vehicle, another battery-powered vehicle, the relay vehicle, the charge vehicle, the computing device (e.g., cloud), and any other participants to the charge transaction or nearby entities that may need to be informed about the agreed-upon charge transaction, the charge transaction can commence. In some embodiments, during the charge transaction, a replenishing supply of electric charge can be communicated from one or more of the charge vehicle, another battery-powered vehicle, the relay vehicle, or any other participants to the charge transaction, and the battery-powered vehicle. In some embodiments, the replenishing supply of electric charge can be communicated to the battery-powered vehicle by a wired electrical coupling of the charge-supplying vehicle and the battery-powered vehicle. In some embodiments, the battery-powered vehicle can comprise a charge receiving element configured to be removably and electrically coupled to a charge transmitting element of the charge-supplying vehicle. In some embodiments, during regular operation of the battery-powered vehicle, the charge receiving element can be configured to be retained within the battery-powered vehicle, while the charge receiving element can be configured to be extended from the battery-powered vehicle during a charge transaction so as to be coupled with the charge transmitting element of the charge-supplying vehicle. In some embodiments, the battery-powered vehicle can have a charge receiving port that is not configured to be extended from the battery-powered vehicle during a charge transaction, while the charge-supplying vehicle can be configured to extend the charge transmitting element to establish and maintain electrical communication between the charge transmitting element and the charge receiving port of the battery-powered vehicle. In some embodiments, the charge receiving element of the battery-powered vehicle can be configured to be extended out from the battery-powered vehicle to establish and maintain electrical communication between the charge receiving element and a charge transmitting port of the charge-supplying vehicle, the charge transmitting port being stationary with regard to the charge-supplying vehicle during a charge transaction.

In some embodiments, the replenishing supply of electrical charge can be communicated to the battery-powered vehicle by a wireless electrically coupling of the charge-supplying vehicle and the battery-powered vehicle. In some embodiments, the replenishing supply of electrical charge can be communicated by a combination of a wired and a wireless electrically coupling of the charge-supplying vehicle and the battery-powered vehicle. In some embodiments, the battery-powered vehicle can comprise a wireless charging receiver and the battery-supplying vehicle can comprise a wireless charging transceiver. In some embodiments, the wireless charging receiver of the battery-powered vehicle can be configured to receive the replenishing supply of electrical charge from the wireless charging transceiver of the charge-supplying vehicle according to any suitable mechanism or protocol. Without wishing to be bound by any particular theory, the battery-powered vehicle can be configured to receive the replenishing supply of electrical charge from the wireless charging transceiver of the charge-supplying vehicle by magnetic resonant coupling therebetween. Alternatively, without wishing to be bound by any particular theory, the battery-powered vehicle can be configured to receive the replenishing supply of electrical charge from the wireless charging transceiver of the charge-supplying vehicle by tightly-coupled electromagnetic inductive or non-radiative charging. Alternatively, without wishing to be bound by any particular theory, the battery-powered vehicle can be configured to receive the replenishing supply of electrical charge from the wireless charging transceiver of the charge-supplying vehicle by loosely-coupled or radiative electromagnetic resonant charging. Alternatively, without wishing to be bound by any particular theory, the battery-powered vehicle can be configured to receive the replenishing supply of electrical charge from the wireless charging transceiver of the charge-supplying vehicle by uncoupled radio frequency wireless charging. Any and all other suitable wireless charging technologies, protocols, methods, approaches, systems, devices, and phenomena are contemplated herein and are hereby considered within the scope of this disclosure. In some embodiments, a proximity less than a pre-determined wireless charging proximity should be maintained between the battery-powered vehicle and the charge-supplying vehicle for the duration of the charge transaction in order to maintain a wireless charging connection therebetween.

In some embodiments, depending upon the type and charging protocol of wireless charging device or system used, the pre-determined wireless charging proximity can be between about zero meters and about 20 meters, about 0.001 meters and about 20 meters, about 0.001 meters and about 19 meters, about 0.001 meters and about 18 meters, about 0.001 meters and about 17 meters, about 0.001 meters and about 16 meters, about 0.001 meters and about 15 meters, about 0.001 meters and about 14 meters, about 0.001 meters and about 13 meters, about 0.001 meters and about 12 meters, about 0.001 meters and about 11 meters, about 0.001 meters and about 10 meters, about 0.001 meters and about 9 meters, about 0.001 meters and about 8 meters, about 0.001 meters and about 7 meters, about 0.001 meters and about 6 meters, about 0.001 meters and about 5 meters, about 0.001 meters and about 4 meters, about 0.001 meters and about 3 meters, about 0.001 meters and about 2 meters, about 0.001 meters and about 1 meter, about 0.001 meters and about 0.5 meters, about 0.001 meters and about 0.25 meters, about 0.001 meters and about 0.1 meters, about 0.001 meters and about 0.01 meters, about 0.01 meters and about 5 meters about 0.02 meters and about 4 meters, about 0.03 meters and about 3 meters, about 0.04 meters and about 2 meters, about 0.05 meters and about 1 meter, about 0.002 meters and about 5 meters, about 0.003 meters and about 5 meters, about 0.003 meters and about 5 meters, about 0.004 meters and about 5 meters, about 0.005 meters and about 5 meters, about 0.006 meters and about 5 meters, about 0.007 meters and about 5 meters, about 0.008 meters and about 5 meters, about 0.009 meters and about 5 meters, or about 0.01 meters and about 5 meters, inclusive of all values and ranges therebetween. In some embodiments, depending upon the type and charging protocol of wireless charging device or system used, the pre-determined wireless charging proximity can be less than about 20 meters, about 19 meters, about 18 meters, about 17 meters, about 16 meters, about 15 meters, about 14 meters, about 13 meters, about 12 meters, about 11 meters, about 9 meters, about 8 meters, about 7 meters, about 6 meters, about 5 meters, about 4 meters, about 3 meters, about 2 meters, about 1 meter, about 0.5 meters, about 0.25 meters, about 0.1 meters, less than about 0.05 meters, less than about 0.01 meters, or less than about 0.001 meters, inclusive of all values and ranges therebetween. In some embodiments, depending upon the type and charging protocol of wireless charging device or system used, the pre-determined wireless charging proximity can be greater than about zero meters, about 0.001 meters, about 0.002 meters, about 0.003 meters, about 0.004 meters, about 0.005 meters, about 0.006 meters, about 0.007 meters, about 0.008 meters, about 0.009 meters, about 0.01 meters, about 0.02 meters, about 0.03 meters, about 0.04 meters, about 0.05 meters, about 0.06 meters, about 0.07 meters, about 0.08 meters, about 0.09 meters, about 0.1 meters, about 0.2 meters, about 0.3 meters, about 0.4 meters, about 0.5 meters, about 0.6 meters, about 0.7 meters, about 0.8 meters, about 0.9 meters, about 1 meter, about 1.25 meters, about 1.5 meters, about 1.75 meters, about 2 meters, about 2.25 meters, about 2.5 meters, about 2.75 meters, about 3 meters, about 3.25 meters, about 3.5 meters, about 3.75 meters, about 4 meters, about 4.25 meters, about 4.5 meters, about 4.75 meters, about 5 meters, about 6 meters, about 7 meters, about 8 meters, about 9 meters, about 10 meters, about 11 meters, about 12 meters, about 13 meters, about 14 meters, about 15 meters, about 16 meters, about 17 meters, about 18 meters, about 19 meters, or greater than about 20 meters, inclusive of all values and ranges therebetween.

In some embodiments, in order to maintain a proper "speed lock," "position lock," "destination lock," "proximity lock," "velocity lock," and the like during the charge transaction, the charge-supplying vehicle may often either need to attain control or partial control of the battery-powered vehicle receiving the replenishing supply of electrical charge or relinquish control or partial control of the charge-supplying vehicle to the battery-powered vehicle receiving the replenishing supply of electrical charge for the duration of the charge transaction or a portion thereof. In some embodiments, in attaining or relinquishing control, one or both of the battery-powered vehicle and the charge-supplying vehicle may be asked or required to slow down, speed up, maintain a course of travel, diverge from a current course of travel, change lanes or headings, move to beside, behind, or ahead of the other vehicle, or in another way diverge from the normal course of travel maintained prior to commencement of the charge transaction.

In some embodiments, computing device (e.g., cloud computing devices) can comprise one or more servers, one or more computers, one or more networks, one or more intranets, one or more signal transmission devices, one or more signal receiving devices, one or more memory devices, computer program code, specialized computer program code, computer models, databases, one or more user interfaces, one or more displays, one or more user input devices, one or more middleware applications, one or more web browser applications, one or more virtual session applications, one or more satellites, one or more telecommunication towers, one or more telecommunication dishes, one or more power supplies, one or more signal booster devices, one or more network security programs, one or more authentication modules, one or more mobile devices, one or more tablets, one or more data models, one or more structured query language (SQL) databases, one or more NoSQL databases, one or more application programming interfaces, and/or any other suitable apparatuses, devices, networks, systems, programs, applications, or databases, without limitation.

In some embodiments, the computing device can further comprise a charge transaction ledger, a charge-distribution map, a mobile entity database, a user database, and/or one or more charge transaction scheduling algorithms. The charge transaction ledger can be a centralized ledger or a decentralized (e.g., blockchain) ledger of charge transactions that have occurred. The charge-distribution map can be generated, maintained and updated according to information received from the network or networks of mobile entities related to the past, real-time, or near real-time location, destination, speed, battery type, battery charge level, battery capacity, and other information related to each mobile entity (terrestrial, aerial, aquatic, charge entities, relay entities, etc.), as well as environmental data, available sources of grid or network electricity, and the like. The mobile entity database can comprise a listing of all or approximately all or substantially all of the mobile entities that are considered to be within the network or networks upon which the system described herein is enacted, while the user database can comprise owners/operators of said mobile entities as well as any pertinent information about the owners/operators, such as the one or more mobile entities to which the user is associated, biographical information, whether or not the owner/operator has agreed to participate in charge transactions, user payment information, and the like. The charge transaction scheduling algorithm is a specialized model for scheduling charge transactions that takes into account the relative location, destination, mobile entity type, battery type, battery charge level, and any other suitable information from the charge transaction ledger, the charge-distribution map, the mobile entity database, the user database, or elsewhere, to determine at any given time or for any given duration of time which mobile entities should be participating in a charge transaction and the role that each participating mobile entity should play in each charge transaction.

In some embodiments, an apparatus for governing charge transactions for a charging network can comprise at least one processor and at least one memory device including computer program code, the at least one memory device and the computer program code configured to, with the processor, cause the apparatus to at least receive current charge level data for a plurality of mobile battery-powered entities, determine, based at least in part on the current charge level data, one or more mobile battery-powered entities of the plurality of mobile battery-powered entities to be charged, determine, based at least in part on the current charge level data, one or more other mobile battery-powered entities of the plurality of mobile battery-powered entities to be caused to charge the one or more mobile battery-powered entities, and cause, while the one or more mobile battery-powered entities and are being transported within a pre-determined proximity of the one or more other mobile battery-powered entities, the one or more other mobile battery-powered entities to charge the one or more mobile battery-powered entities.

In some embodiments, a method of charging a mobile entity can comprise determining that a mobile battery-powered entity is within a pre-determined proximity of another mobile battery-powered entity, determining a charge level and a transport speed of the mobile battery-powered entity, determining the charge level and the transport speed of the other mobile battery-powered entity, in an instance in which the charge level of the mobile battery-powered entity is below a pre-determined (e.g., configurable) charge level and less than the charge level of the other mobile battery-powered entity, causing the mobile battery-powered entity to receive an electric charge from the other mobile battery-powered entity, and in an instance in which the charge level of the other mobile battery-powered entity is below the pre-determined (e.g., configurable) charge level and less than the charge level of the other mobile battery-powered entity, causing the other mobile battery-powered entity to receive the electric charge from the mobile battery-powered entity.

In some embodiments, a method for governing charge transactions for a charging network can comprise receiving current charge level data for a plurality of mobile battery-powered entities, determining, based at least in part on the current charge level data, one or more mobile battery-powered entities of the plurality of mobile battery-powered entities to be charged, determining, based at least in part on the current charge level data, one or more other mobile battery-powered entities of the plurality of mobile battery-powered entities to be caused to charge the one or more mobile battery-powered entities, and causing, while the one or more mobile battery-powered entities and are being transported within a pre-determined proximity of the one or more other mobile battery-powered entities, the one or more other mobile battery-powered entities to charge the one or more mobile battery-powered entities.

In some embodiments, a method for instigating a charge transaction for a mobile battery-powered entity in a charging network can comprise wirelessly transmitting, from a mobile battery-powered entity while the mobile battery-powered entity is being transported through a predefined area, a current charge level to a computing device, receiving an indication from the computing device as to whether the mobile battery-powered entity is to charge another mobile battery-powered entity, to be charged by the other mobile battery-powered entity, or neither charge nor be charged by the other mobile battery-powered entity, and in an instance in which the indication received indicates that the mobile battery-powered entity is either to charge or be charged by the other mobile battery-powered entity: determining a geospatial location and a transport speed of the mobile battery-powered entity, receiving the geospatial location and the transport speed of the other mobile battery-powered entity, causing the mobile battery-powered entity to speed lock with the other mobile battery-powered entity based at least in part on the geospatial location and the transport speed of the mobile battery-powered entity and the other mobile battery-powered entity, in an instance in which the indication received indicates that the mobile battery-powered entity is to charge the other mobile battery-powered entity, causing the mobile battery-powered entity to transmit a charge to the other mobile battery-powered entity, and in an instance in which the indication received indicates that the mobile battery-powered entity is to be charged by the other mobile battery-powered entity, causing the mobile battery-powered entity to receive the charge from the other mobile battery-powered entity.

Figure 2:
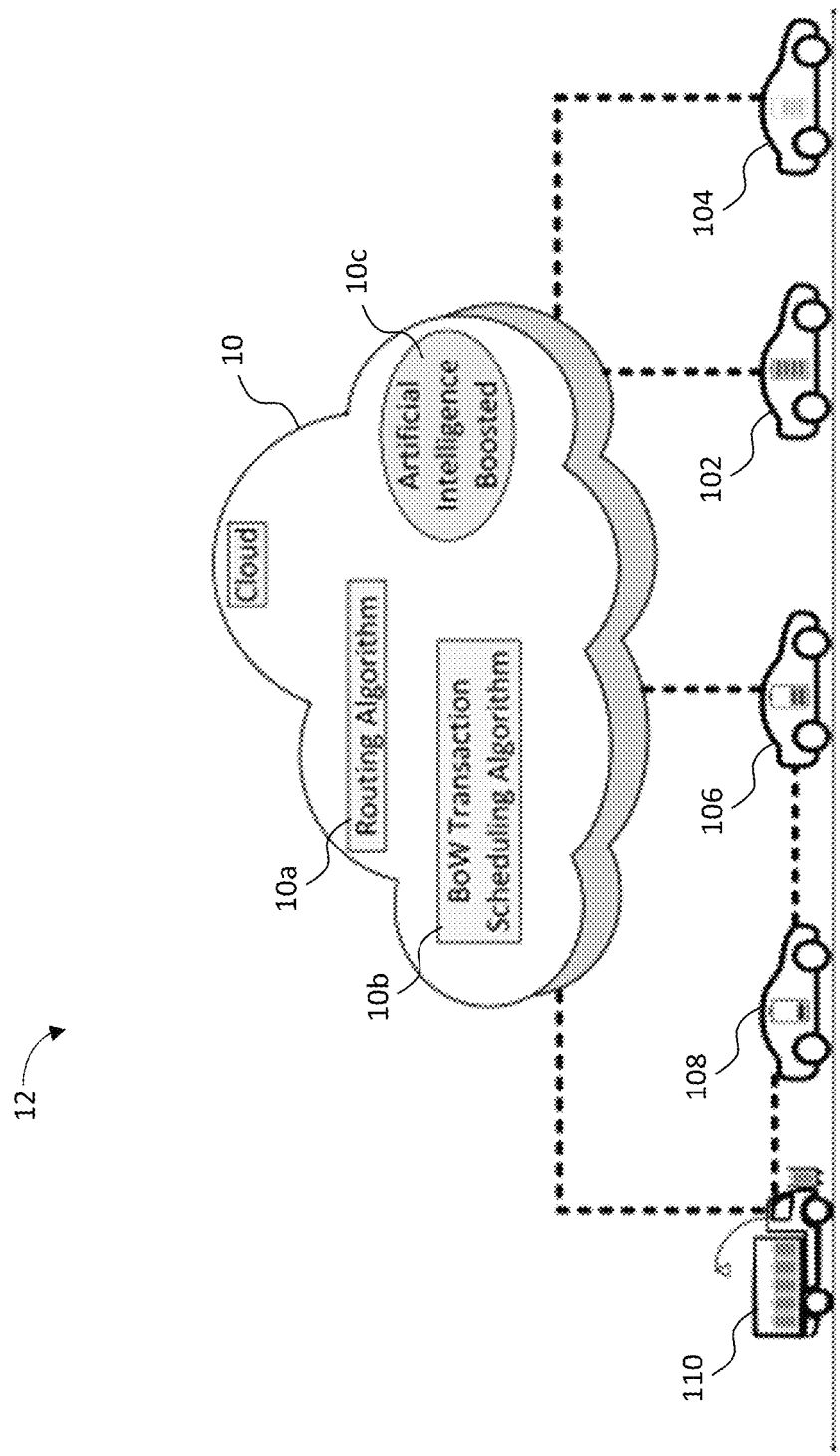
FIG. 2 provides an example of a system for entity-to-entity and entity-to-cloud communication, according to some embodiments discussed herein.

Referring now to FIGS. 1-2, a system 1 is illustrated for charging mobile entities on-the-go. In some embodiments, the autonomous charging of battery-operated mobile entities on-the-go may be similar in principle to on-air refueling of airplanes. According to some embodiments of the approach, a battery-operated mobile entity (Entity-A) can be caused to move to the front/rear or left/right side of another entity to be charged (Entity-B); speed-lock (i.e., communicate among themselves through entity-to-entity communication or through entity-to-cloud-to-entity communication to synchronize their speeds); and entity A extending a retractable charging cable to releasably engage a retractable charge receiving point of Entity-B (and other cars next to it, with which it speed-locks) and starts charging on-the-go. In some embodiments, the charging cable can be removed from Entity-B and taken back to Entity-A after sufficient charge is provided, if it is determined that continued engagement presents any sort of risk to life or infrastructure, if the route of one or both of Entity-A and Entity-B diverges from the other, or the like. By design of the on-the-go charging methods and apparatuses described herein, Entity-A should mirror the route and travel speed of Entity-B during the charging process. While this approach is suitable for any mixture of mobile entities having any mixture of modes of transport, the approach is particularly suitable for fully autonomous or substantially fully autonomous entities, although the basic mechanisms are applicable to partially autonomous or manual entities. The technology, approach, method, apparatuses, and systems naturally applies to any network of mobile battery-powered entities.

In some embodiments, the system 1 can comprise a computing entity 10 comprising a cloud computing environment and associated infrastructure, telecommunications equipment, hardware, one or more processors, one or more memory devices, and the like. The one or more memory devices can store one or more algorithms, the algorithms capable of, with at least one of the one or more processors and at least one of the one or more memory devices, a method for scheduling charge transactions. In some embodiments, the one or more algorithms can comprise at least one of a routing algorithm and a charge transaction scheduling algorithm. In some embodiments, the computing entity 10 can further include an artificial intelligence program stored on at least one of the one or more memory devices and configured to enact the one or more algorithms such that the computing entity 10 can at least partially govern the movement of one or more mobile entities within a network and charge transactions carried out within the network. In some embodiments, the system 1 can comprise a first homogenous vehicle network 12 comprising a plurality of vehicles of a single type, category, mode of transport, and/or charge transaction protocol type. In some embodiments, charge transactions within the first homogenous vehicle network 12 can be at least partially governed by the computing entity 10.

In some embodiments, information related to the first homogenous vehicle network 12 can be communicated to the computing entity 10. In some embodiments, information related to the first homogenous vehicle network 12 that can be communicated to the computing entity 10 can comprise mobile entity identifiers, mobile entity locations, mobile entity battery type and current charge level, mobile entity destinations, road and weather conditions, and other suitable information, such as described above. Likewise, in some embodiments, the computing entity 10 can be capable of communicating routing and/or charge transaction instructions to one or more mobile entities of the first homogeneous vehicle network 12.

For instance, as illustrated in FIG. 2, the computing entity 10 can be configured to communicate routing and/or charge transaction instructions to one or more of a plurality of vehicles in the first homogeneous vehicle network 12, depending on the charge level of each of the plurality of vehicles. In some embodiments, the plurality of vehicles can be subdivided into any type or number of classes or groups of vehicles based at least in part on the charge level of the battery for each vehicle. For instance, the mobile battery-powered entities might be subdivided into four groups based upon current battery charge level, e.g., as follows: i) Vehicle A: 76%-100% of capacity, ii) Group B: 50%-75% of capacity, iii) Group C: 26%-50% of capacity, and iv) Group D: 0%-25% of capacity. As illustrated in FIG. 2, Group A mobile battery-powered entities are identified as 102, Group B mobile battery-powered entities are identified as 104, Group C mobile battery-powered entities are identified as 106, and Group D mobile battery-powered entities are identified as 108. In some embodiments, such as when the plurality of vehicles are subdivided into four groups as described, Group D vehicles may be prioritized in terms of routing and scheduling a charge transaction, with descending levels of prioritization for, respectively, Group C vehicles, Group B vehicles, and Group A vehicles. In some embodiments, Group A vehicles, and perhaps even Group B vehicles, may be removed from the schedule completely for a pre-determined time based upon an estimation of when the batter of said vehicles will likely be depleted of electric charge sufficiently to re-classify said vehicles as Group C or Group D. In some embodiments, Group A vehicles, and perhaps even Group B vehicles, may be re-classified as Charging Vehicles (also called "charge-supplying vehicles" herein), routed based upon an upcoming scheduled charge transaction, and tasked with communicating a replenishing supply of electrical charge to a Group D or Group C vehicle during the scheduled charge transaction.

In some embodiments, the computing entity 10 may be capable of communicating with only a portion of the plurality of vehicles, or only a portion of the plurality of vehicles are capable of communicating with the computing entity 10. As illustrated in FIG. 2, in some embodiments, one or more of the plurality of mobile battery-powered entities (e.g., 102, 104, and/or 106) are capable of independent communication with the computing entity 10, while one or more others of the plurality of mobile battery-powered entities (e.g., 108) are incapable of independent communication with the computing entity 10. As such, in some embodiments, one or more mobile battery-powered entities (e.g., 106) may be configured to act as relay vehicles that receive, from other mobile battery-powered entities (e.g., 102 and/or 104) incapable of independent communication with the computing entity 10, pertinent information, instructions, and/or charge (e.g., at 108) incapable of independent communication with the computing entity 10, and communicate such pertinent information from the one or more battery-powered entities (e.g., 108) to the computing entity 10. In some embodiments, relay vehicles (e.g., 106) can be configured to receive, from the computing entity 10, routing instructions and/or charge transaction instructions destined for other mobile battery-powered entity(ies) (e.g., 108) incapable of independent communication with the computing entity 10, and communicate such routing instructions and/or charge transaction instructions to the other mobile battery-powered entity(ies) (e.g., 108) incapable of independent communication with the computing entity 10. In some embodiments, the system 1 can be configured such that the mobile battery-powered entity 104 or 106 can function as a relay vehicle that communicates information, instructions, and/or charge between the computing entity 10 and another mobile battery-powered entity 108. In some embodiments, the system 1 can be configured such that the mobile battery-powered entity 106 can act as a further relay configured to further communicate the information, instructions, and/or charge between the mobile battery-powered entity 102 or 104 as a relay vehicle and the mobile battery-powered entity 108 which is incapable of independent communication with the computing entity 10. In some embodiments, the system 1 can be configured such that relay vehicle (e.g., 104 and/or 106) are used even if a terminal vehicle (e.g., 108) is not incapable of independent communication with the computing entity 10. For instance, in some embodiments, a charging network (e.g., the first homogenous vehicle network 12) may be configured such that a limited number of vehicles communicate independently with the computing entity 10, the limited number of vehicles acting as relay vehicles to some or all of the remaining vehicles in the charging network. Without wishing to be bound by any particular theory, by communicating independent with only a limited number of the vehicles in the charging network, the computing entity 10 can reduce the capacity and bandwidth required for communicating information and instructions between the plurality of vehicles of the charging network and the computing entity 10. Furthermore, in some embodiments, the relay vehicles (e.g., 104 and/or 106) can comprise an on-board computer or other such computing device preconfigured to carry out some aspects of decision-making with regard to charge scheduling and route scheduling without being required to communicate independently with the computing entity 10 for every routing or charging decision. Furthermore, in some embodiments, the on-board computer or other such computing device of the relay vehicles (e.g., 104 and/or 106) can be capable of receiving information from one or more other vehicles (e.g., 108) and in some way optimizing the data packet(s) before transmitting the optimized data packet(s) to the computing entity 10. In some embodiments, data packet optimization may include sampling from a signal record or signal stream, eliminating redundant data, eliminating unnecessary data, and other such means and methods for reducing the packet size and/or data complexity, thereby at least reducing the processing complexity and/or decision-making complexity for the computing entity 10. For instance, if environmental conditions at or nearby the charge-receiving vehicle (e.g., 102) are above or below a pre-determined threshold and are considered sufficient, the relay vehicle(s) (e.g., 104 and/or 106) or a component (e.g., on-board computer) thereof may be instructed to replace the environmental condition data with an indicate that the environmental condition was sufficient to proceed with a charge transaction, thus eliminating unnecessary data storage and processing complexity during decision-making about whether and where to route the charge-receiving vehicle (e.g., 102) and whether and where to schedule a charge transaction.

In some embodiments, the system 1 can further include a second homogenous vehicle network 14 comprising a plurality of vehicles of a single type, category, mode of transport, and/or charge transaction protocol type. In some embodiments, the first homogenous vehicle network 12 and the second homogenous vehicle network 14 can be located in different geographical locations, can be differentiated by comprising vehicles of different types, categories, modes of transport and/or charge transaction protocol types, and/or can be differentiated by other characteristics or aspects such as payment method, hierarchical level within a hierarchy of mobile entities in the system 1, or other causes, means, or reasons without limitation. In some embodiments, the differentiation between the first homogenous vehicle network 12 and the second homogenous vehicle network 14 can be at least partially arbitrary or completely arbitrary, such as by design of the system 1. In some embodiments, the differentiation between the first homogenous vehicle network 12 and the second homogenous vehicle network 14 can be based upon an efficient sorting and categorization of a larger group of mobile entities by the computing entity 10, the artificial intelligence program, an algorithm, or some combination thereof.

In some embodiments in which the first and/or second homogenous vehicle networks 12, 14 comprise mobile terrestrial vehicles only, the system 1 can comprise other homogenous networks, such as a homogenous drone network 16 comprising a plurality of drones or other aerial mobile entities of a single type, category, mode of transport, and/or charge transaction protocol type. In some embodiments, the homogenous drone network 16 can be located in a different geographical location than the first homogenous vehicle network 12 and the second homogenous vehicle network 14, can be differentiated by comprising vehicles of a different type, from a different category, vehicles having different modes of transport, and/or vehicles adhering to different charge transaction protocols. In some embodiments, the homogenous drone network 16 can be differentiated from the first homogenous vehicle network 12 and the second homogenous vehicle network 14 by other characteristics or aspects such as payment method, hierarchical level within a hierarchy of mobile entities in the system 1, or other causes, means, or reasons without limitation.

In some embodiments, the system 1 can comprise a heterogeneous network 18 comprising a plurality of vehicles of two or more different vehicle types, from two or more different vehicle categories, having two or more different modes of transport, and/or adhering to two or more different charge transaction protocols. In some embodiments, the heterogeneous network 18 includes at least two of i) one or more terrestrial vehicles, ii) one or more aerial vehicles, iii) one or more aquatic vehicles, iv) one or more hybrid terrestrial/aerial vehicles, v) one or more hybrid terrestrial/aquatic vehicles, vi) one or more hybrid aerial/aquatic vehicles, vii) one or more charge vehicles, and viii) one or more charge relay vehicles.

In some embodiments, each charge transaction from one mobile entity to another can be scheduled by running an efficient (optimal, when possible) scheduling algorithm in the cloud that considers a charge distribution map and other information transmitted from the charging network (e.g., the first homogenous vehicle network 12). In some embodiments, the goal of the system 1 can be to keep the battery-operated mobile entities in a perpetual running condition. Each entity can be equipped with one or more of the following features/capabilities: (1) receiving charge from another entity (of similar or dissimilar type—e.g., a drone charging a car or vice versa while both in motion); (2) provide charge to another entity; (3) relay charge from one charge donor entity to another charge receiver entity; and (4) vehicle-to-vehicle and/or vehicle-to-cloud communication about charge transaction scheduling, route, etc.

In some embodiments, the system 1 can comprise a network of mobile battery-operated entities and the cloud, and optionally, specialized charger entities, which are capable of storing and giving large amounts of charge to other entities. In some embodiments, these charging entities (also called "charge vehicles" herein) can be dedicated charging vehicles and might not, for instance, have another primary purpose such as personal transportation, recreation, freight transport, or the like. These charging entities or units can be stationed at a stationary charge station and can be caused to move on demand to join the charging network for the purpose of increasing the overall charge into the charging network. These charging entities may provide charge to one or more of the mobile battery-powered entities, which can use the charge to replenish a corresponding battery, if needed, and additionally or alternatively can distribute some or all of the charge to other entities such that the charge is distributed based at least in part on the demand of individual entities and to increase the overall efficiency of the entire charging network. In some embodiments, the goal for the set of charge transactions in a charging network is not necessary to (or only to) maximize the charge level in the battery of the recipient car—but to achieve an optimal working level given the amount of available charge. In other words, since the system 1 employs one or more algorithms, artificial intelligence, and/or other such technologies that are generally meant to make decisions with regard to a particular goal, a goal of the system 1 itself may be to increase the total miles traversed by battery-powered vehicles in the charging network (e.g., the first homogenous vehicle network 12) without necessarily or simply optimizing a charge level of any one vehicle of the plurality of vehicles in the charging network.

In other disclosures by the inventors, Applicant has described peer-to-peer vehicle charging, such as in U.S. Patent Application Ser. Nos. 62/807,909, 16/782,531, and 62/987,471, the entire disclosures of each of which are hereby incorporated herein by reference in their entireties for all purposes. In instances where, for purposes of routing optimization, user preference, or other undisclosed reasons, mobile battery-powered entities may be preferably used for providing a replenishing supply of charge to a charge-depleted mobile battery-powered entity to charge the entity's internal battery(ies).

Figure 3:
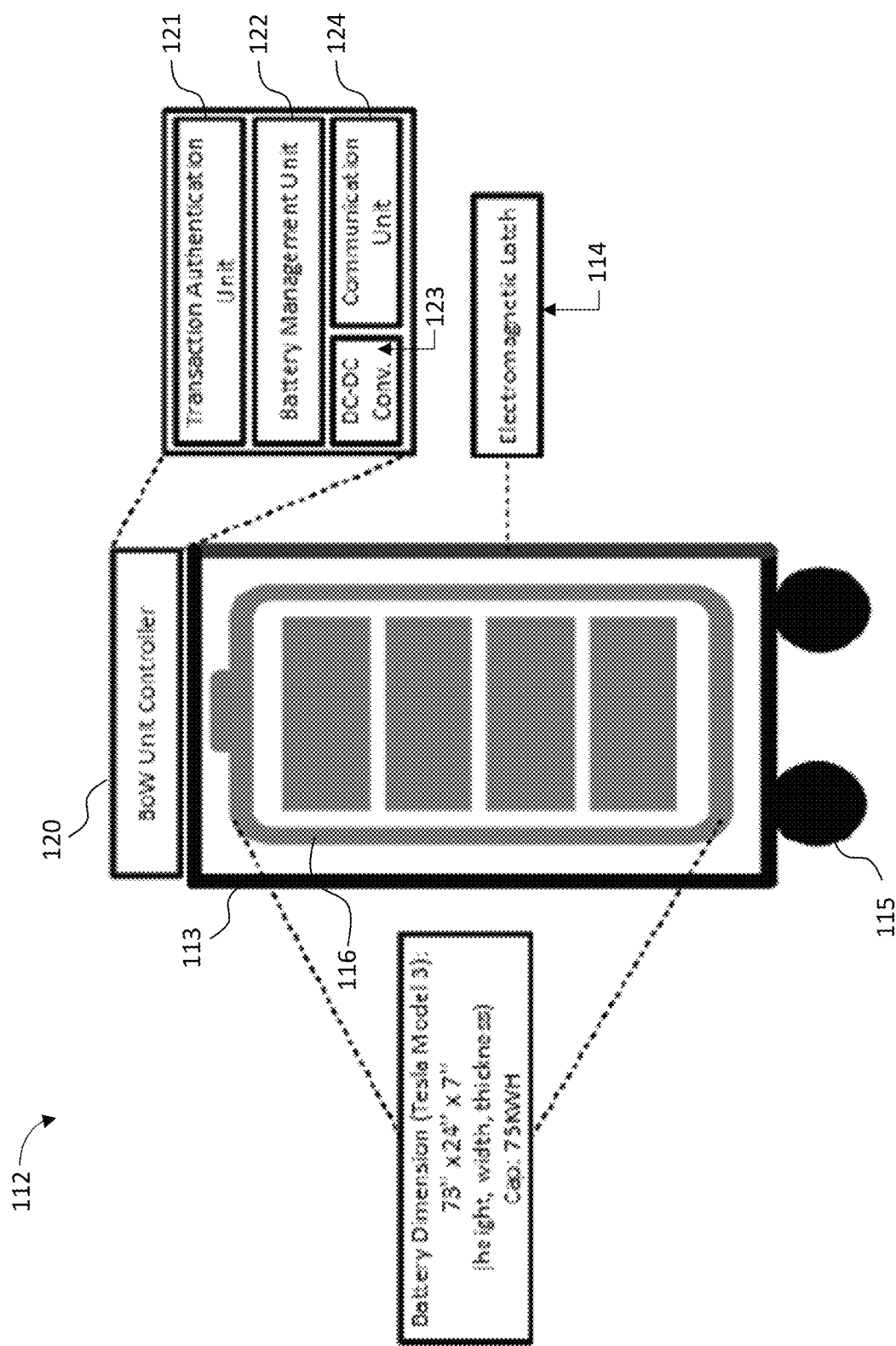
FIG. 3 provides an example of a battery on wheels (BoW) system for on-the-go entity-to-entity charging, according to some embodiments discussed herein.

Referring now to FIG. 3, an external battery unit 112 used to charge mobile battery-powered entities on the go is described herein. The external battery unit 112, also referred to as a battery on wheel (BoW) unit, consists of one or more batteries 116, a magnetic or electromagnetic latch 114, and one or more unit controllers 120. The external battery unit 112 may be situated upon one or more wheels 115 and may contain an engine for motion. The dimension of the unit is dependent on the battery dimension. In one embodiment, an equivalent battery to the Tesla Model 3 battery has dimensions 73"×24"×7." In some embodiments, the battery 116 may be protected by an external cover 113, which thereby shields the battery from the elements, airborne debris, and other potentially hazardous conditions. In some embodiments, the magnetic or electromagnetic latch 114 is located on a side between the unit controller 120 and the one or more wheels 115. The magnetic or electromagnetic latch 114 may be responsible for attachment and release of the external battery unit 112 and may be controlled by one or more of the computing entity 10, the unit controller 120, the mobile battery-powered entity (e.g., 108), and/or a driver or operator of the mobile battery-powered entity. In other embodiments, the mobile battery-powered entity may be or comprise an autonomous driverless battery-operated entity, decisions concerning the attachment or release of the unit may be made automatically by the system 1, which may be or comprise a cloud-based control management system.

In some embodiments, the external battery unit 112 may be equipped with the unit controller 120, where the unit controller 120 comprises one or more of a transaction authentication unit 121, a battery management unit 122, a DC-DC converter 123, and a communication unit 124. The transaction authentication unit 121 may ensure the external battery unit 112 is authorized to be used, e.g., to connect to the mobile battery-powered entity. Once authorized, the battery management unit 122 may be in control of the connection and/or charge transfer in order to make optimal charge transfer decisions from the perspective of the system 1. The DC-DC converter 123 may be configured to allow the external battery unit 112 to connect with the mobile battery-powered entity's charge network. The DC-DC converter 123 may be programmable or programmed accordingly, and may be combined with the DC-DC converter 123 from another external battery unit 112 to work in tandem and deliver the optimal charging voltage and current to the mobile battery-powered entity for more efficient charging. The communication unit 124 can be configured to coordinate between one or more of the mobile battery-powered entities, one or more battery charging stations, one or more MoCS 110, and/or the computing entity 10, e.g., when making individual or system-wide charge distribution and transfer decisions, routing decisions, and/or halt decisions, among others.

Figure 4:
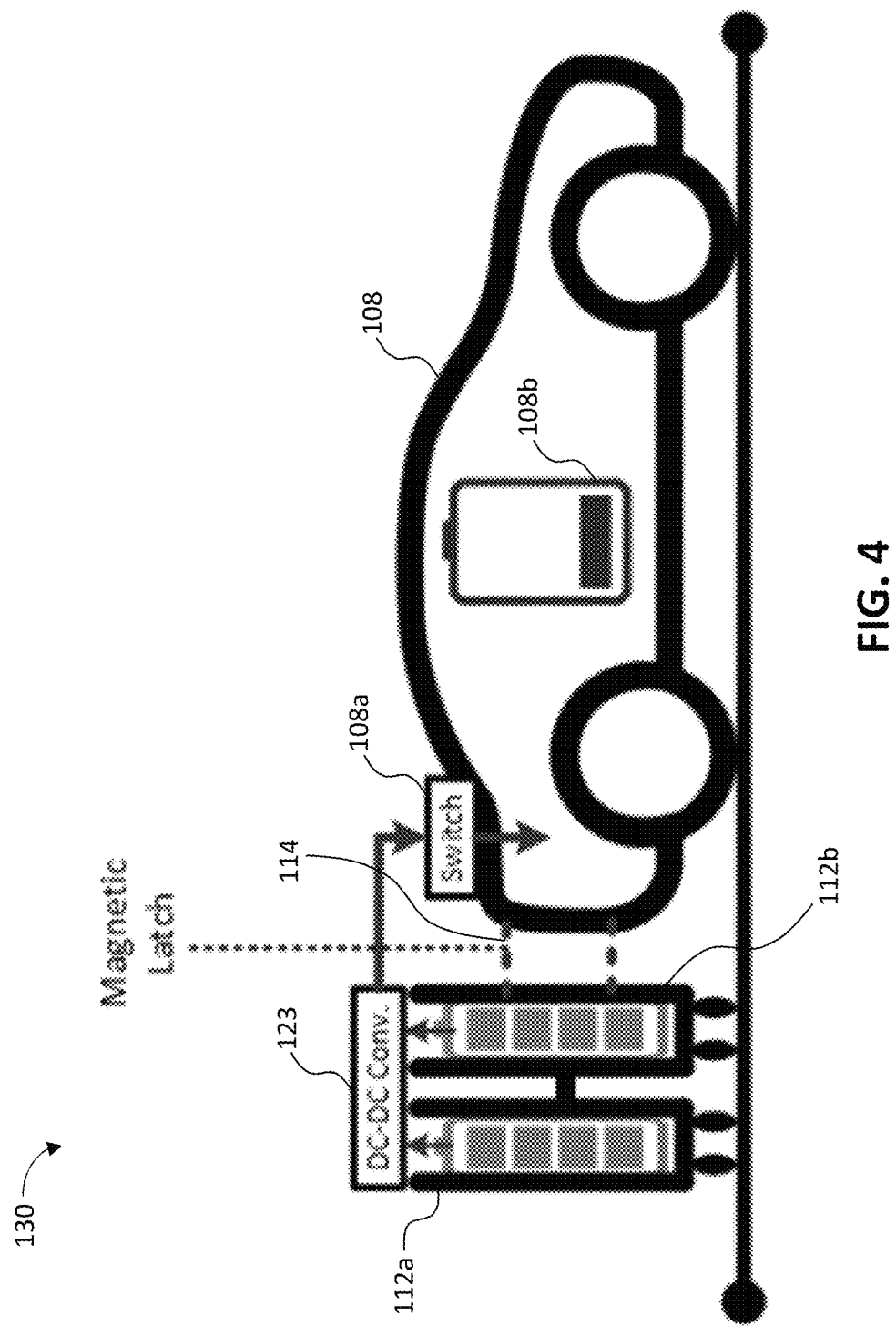
FIG. 4 provides an example of an approach for on-the-go charging of entities by a mobile charging unit, according to some embodiments discussed herein.

FIG. 4 illustrates an approach 130, according to one embodiment, for electrically coupling the external battery unit 112 to a switch 108a of the mobile battery-powered entity 108 in order to carry out a charge transfer event. In this embodiment, the mobile battery-powered entity 108 comprises an internal battery 108b with a current remaining charge or charge level below a threshold, e.g., below about 25% remaining charge. An external battery unit 112 is connected to the mobile battery-powered entity 108 with the magnetic or electromagnetic latch 114. An additional external battery unit 112 may be attached to unit 112. Both external battery units 112 may work in tandem to provide charge to the mobile battery-powered entity 108 and charge the EV's internal battery 108b. The DC-DC converter 123 is used to provide optimal charging efficiency by allowing for a programmable charging voltage and current. The switch 108a of the mobile battery-powered entity 108 may be used to enable/disable the connection between the external battery unit 112 and the mobile battery-powered entity 108.

Figure 5:
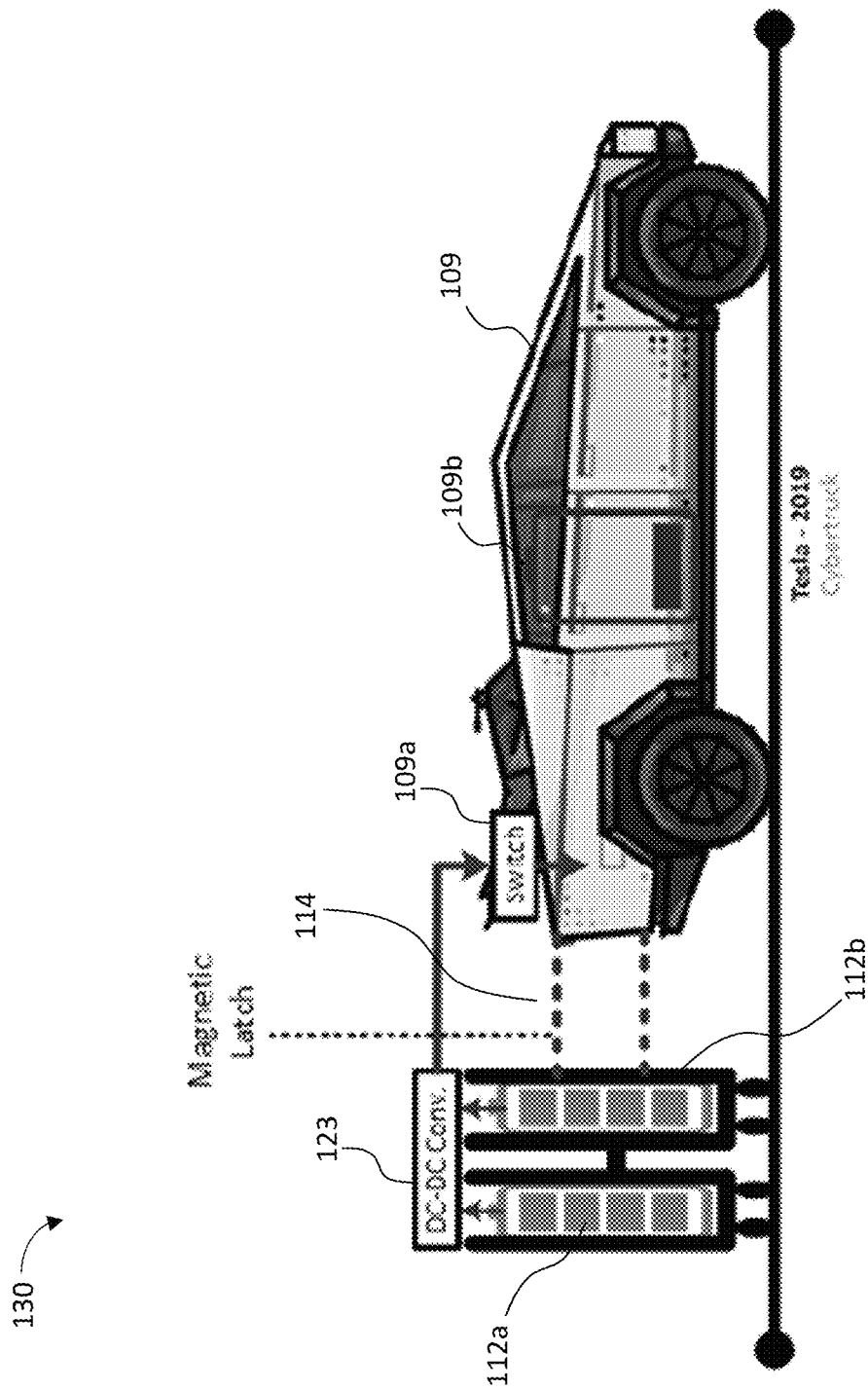
FIG. 5 provides an example of an approach for on-the-go charging of entities by a mobile charging unit, according to some embodiments discussed herein.

FIG. 5 illustrates a specific embodiment of a mobile battery-powered vehicle with a 2019 Tesla Cybertruck 109. Similarly to the EV in FIG. 4, the Tesla Cybertruck 109 has an internal battery 109b with 0%-25% remaining charge and has two external battery units 112a and 112b attached to via the magnetic or electromagnetic latch 114. In one embodiment, external battery units 112a and 112b are identical and each are configured with 75 KWH. The Tesla Cybertruck 109 optimally requires 150 KWH, which may be achieved when external battery units 112a and 112b are used in tandem to provide the required 150 KWH capacity as well as higher charging voltage. FIG. 5 also illustrates a latch 114b, a switch 109a, control circuit, and/or the like between the Tesla Cybertruck 109 and the external battery unit 112. The latch 114b can be used for other mobile battery-powered entities. As such, the latch 114b is discussed in greater detail below with reference to FIGS. 10A-11.

Figure 6A:
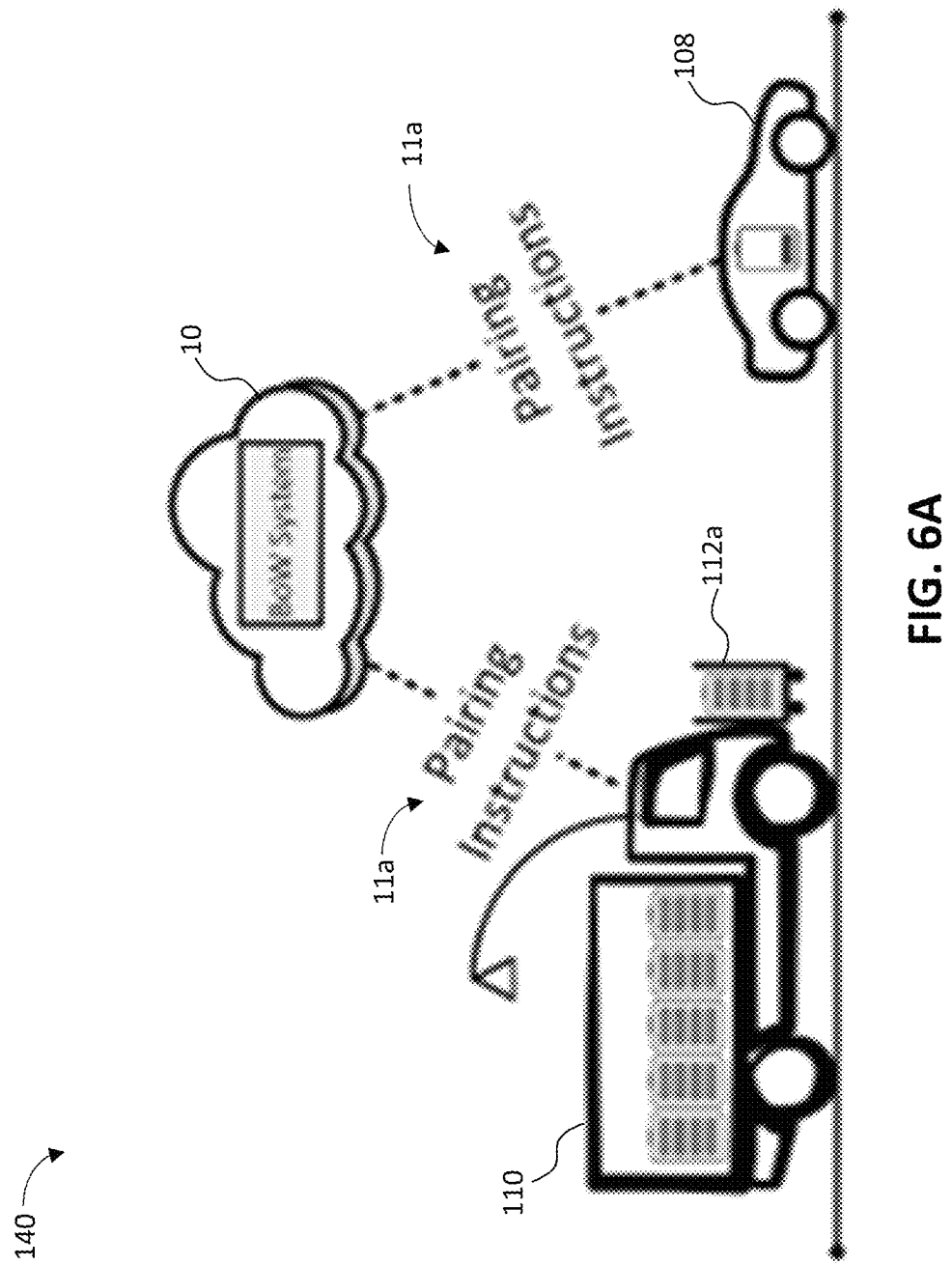
FIGS. 6A-6D provide portions of a sequence for on-the-go charging of entities by a mobile charging unit, according to some embodiments discussed herein.

Referring to FIG. 6A, in one embodiment where the mobile battery-powered entity 108 has a critical battery charge, the system 1 (e.g., a cloud-based control and management system) can deploy one or more MoCSs 110 that are nearby the mobile battery-powered entity 108 to pair up with the mobile battery-powered entity 108. The system 1 (e.g., cloud-based control and management system) may include a communication entity of the system 1 that is configured to provide both the mobile battery-powered entity 108 and MoCS 110 with pairing instructions 11, comprising of instructions to get in the same lane, sync speed, and prepare to carry out the external battery transaction.

Figure 6B:
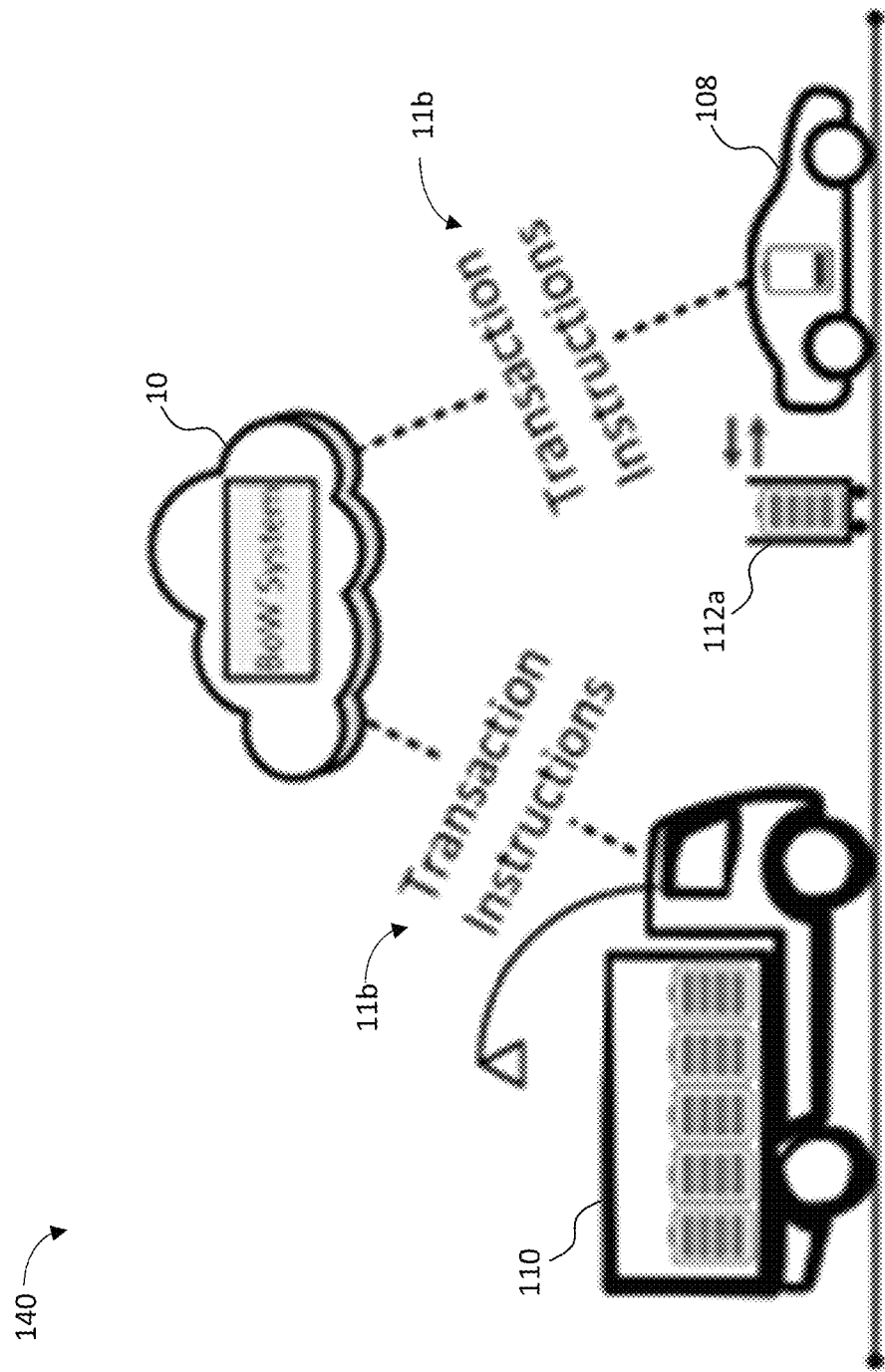

Once the pairing instructions have been completed, transaction instructions are transmitted by a communication entity of the system 1 (e.g., cloud-based control and management system) to the mobile battery-powered entity 108 and MoCS 110 as shown in FIG. 6B. The MoCS 110 will release an external battery unit 112 from a safe distance and the external battery unit 112 will coordinate with the mobile battery-powered entity 108 to latch onto the mobile battery-powered entity 108. In a separate embodiment, two or more external battery units 112 may be dispensed together.

Figure 6C:
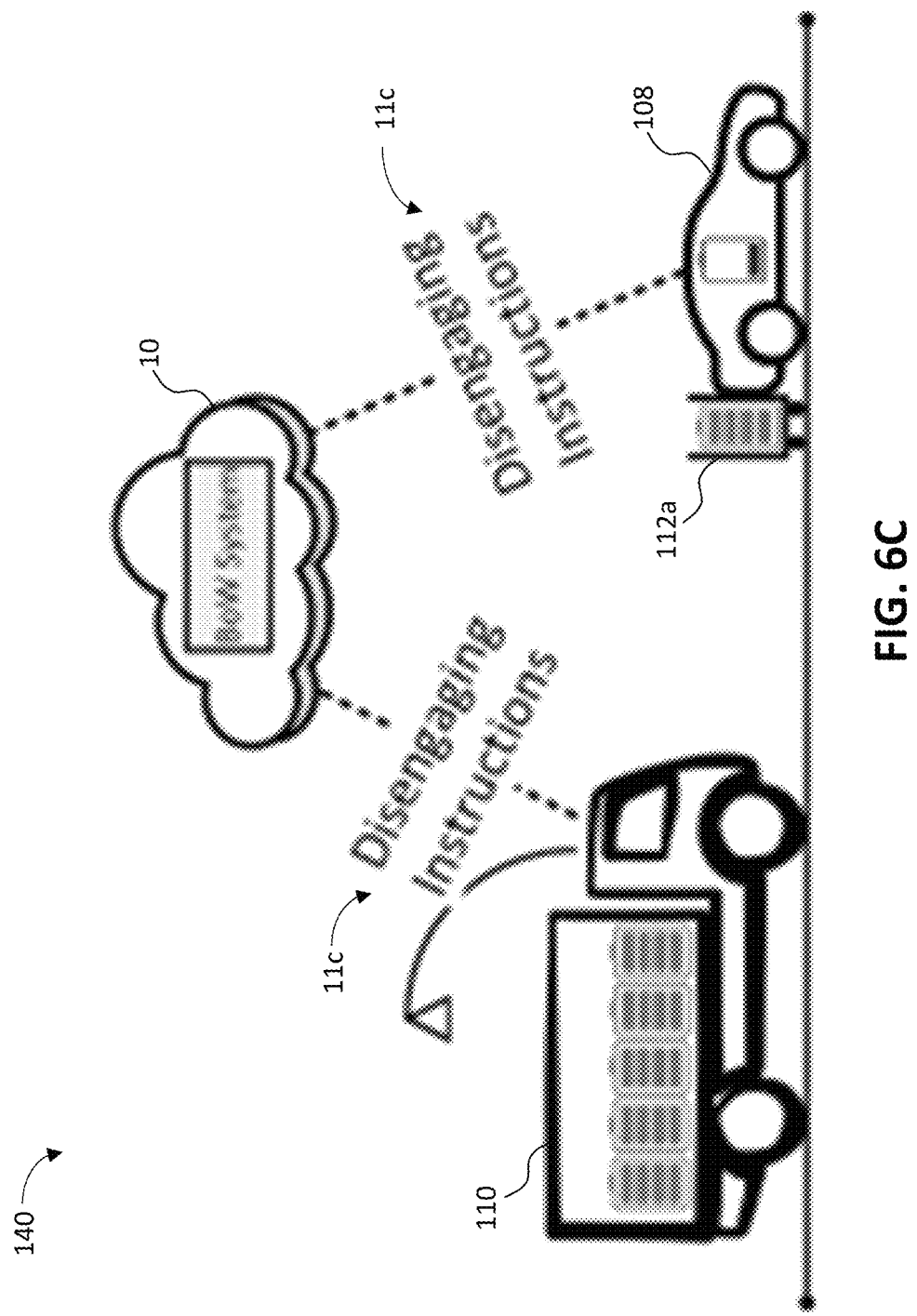

Immediately upon successful transaction of the external battery unit(s) 112, the mobile battery-powered entity 108 begins to receive charge from the external battery units(s) as depicted in FIG. 6C. The system 1 (e.g., a cloud-based control management system) can send disengaging instructions 11c to both the MoCS 110 and the mobile battery-powered entity 108 to unpair.

Figure 6D:
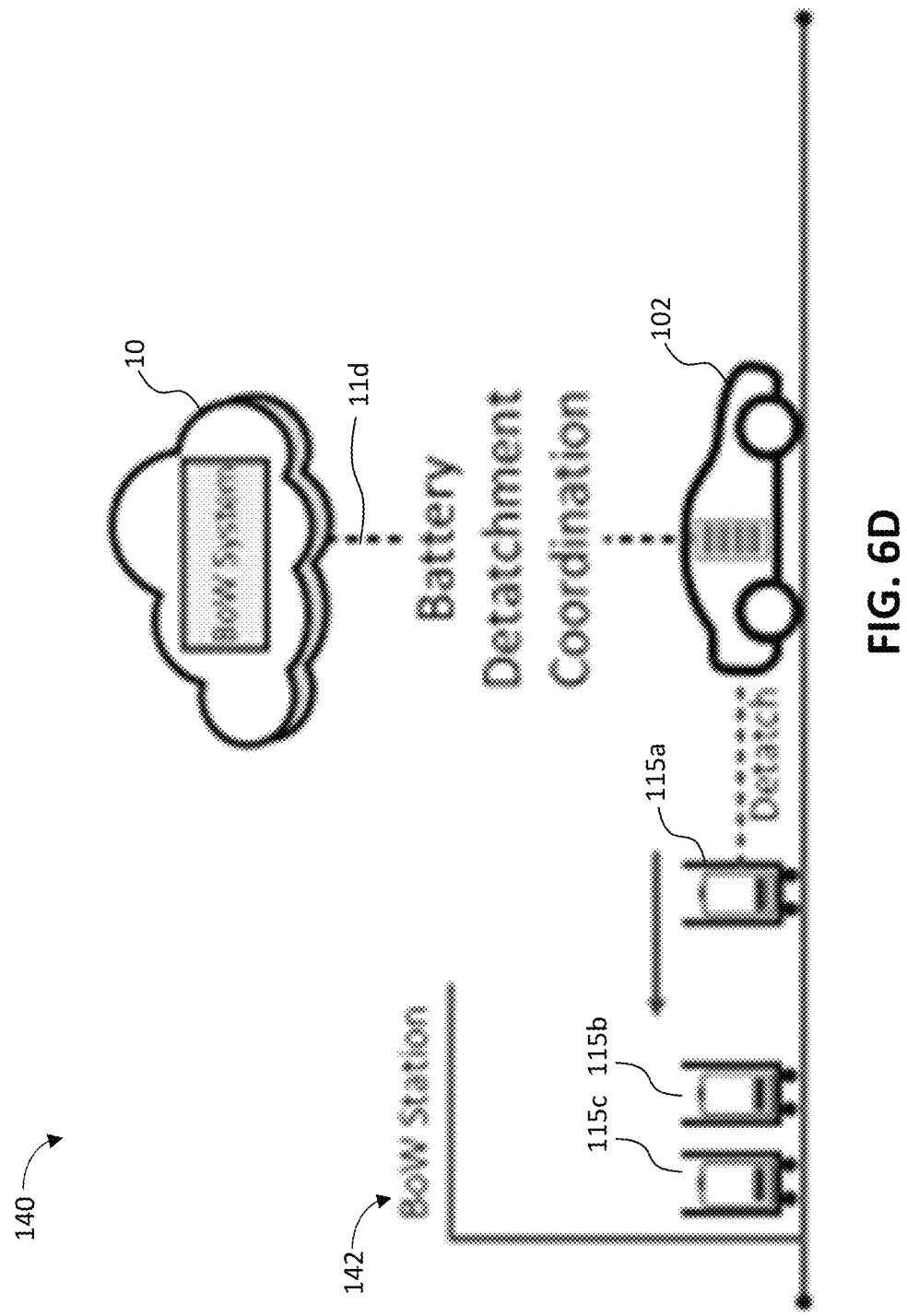

In one embodiment, the discharged one or more external battery units 112 may be dropped off by the mobile battery-powered entity 108 at a battery station 142 conveniently located along the route or nearby a destination of the mobile battery-operated entity 108, e.g., as shown in FIG. 6D. The system 1 may send battery detachment coordination instructions 11d to the mobile battery-powered entity 108 such that a discharged external battery unit 115a removed from nearby the mobile battery-powered entity 108 is placed with or caused to be moved into proximity with other depleted external battery units 115b and 115c at the battery station 142. In separate embodiment, the system 1 or computing entity 10 (or, alternatively, the mobile battery-powered entity 108) may decide that the MoCS 110 should be re-deployed to collect the discharged external battery unit(s) 115a rather than having the mobile battery-powered entity 108 stop and release the discharged external battery unit(s) 115a at the battery station 142.

Figure 7:
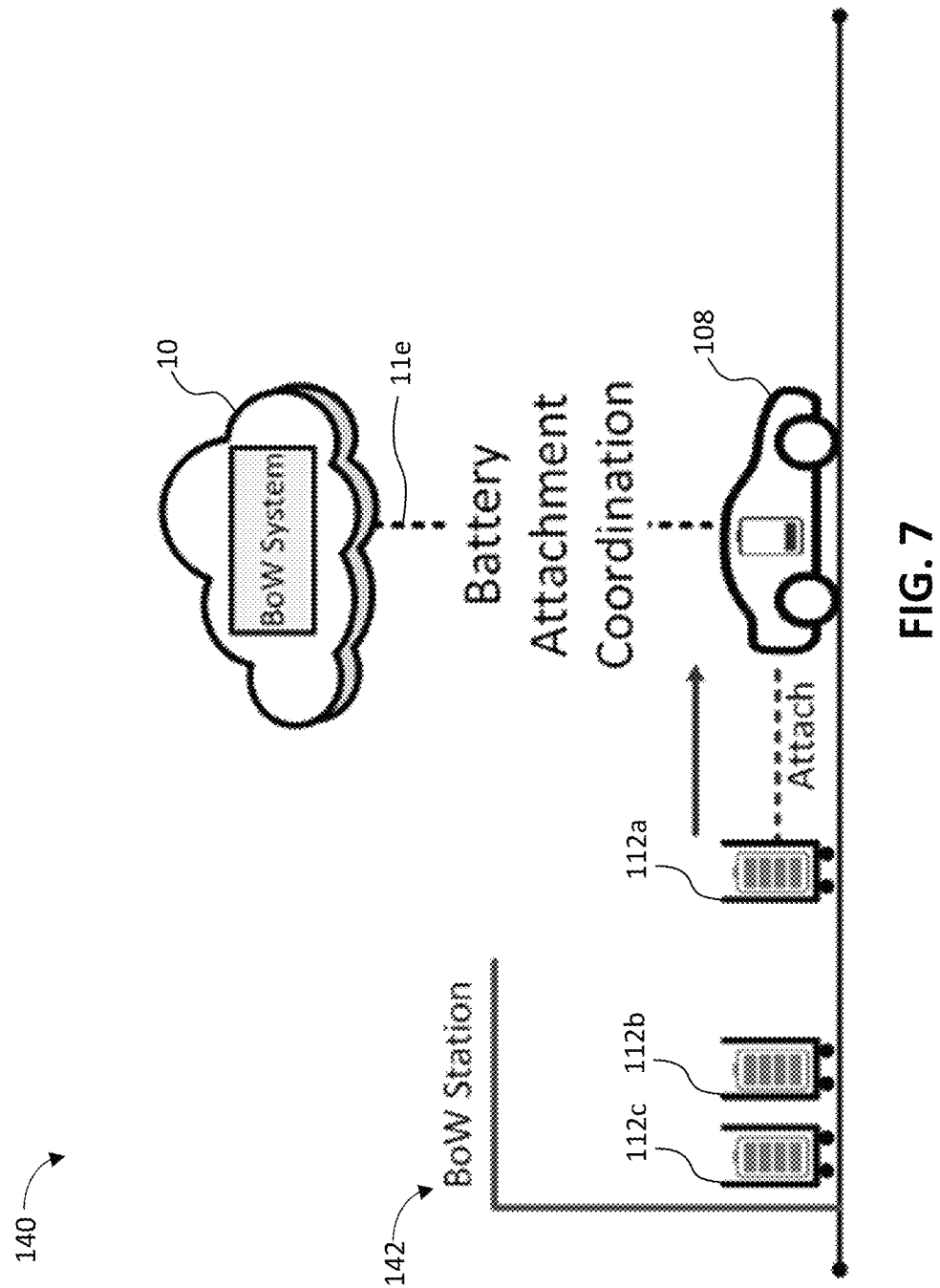
FIG. 7 provides an example of an alternative approach for deploying external battery units for on-the-go entity-to-entity charging of terrestrial entities, according to some embodiments discussed herein.

In some embodiments, when the mobile battery-powered entity 108 returns the discharged battery(ies) 115a, the mobile battery-powered entity 108 may obtain another external battery unit 112, that is fully charged, at the battery station 142, as shown in FIG. 7. The system 1 or computing entity 10 can send battery attachment coordination instructions 11e to the mobile battery-powered entity 108 to initiate, coordinate, and/or control this process. In some embodiments, the system 1, computing entity 10, MoCS 110, and/or mobile battery-powered entity 108 may cause the mobile battery-powered entity 108 to initially receive a charged external battery unit 112 from the battery station 142 (e.g., as shown in FIG. 7) rather than causing the MoCS 110 to be deployed to deliver the external battery unit 112 (charged) to the mobile battery-powered entity 108.

Figure 8:
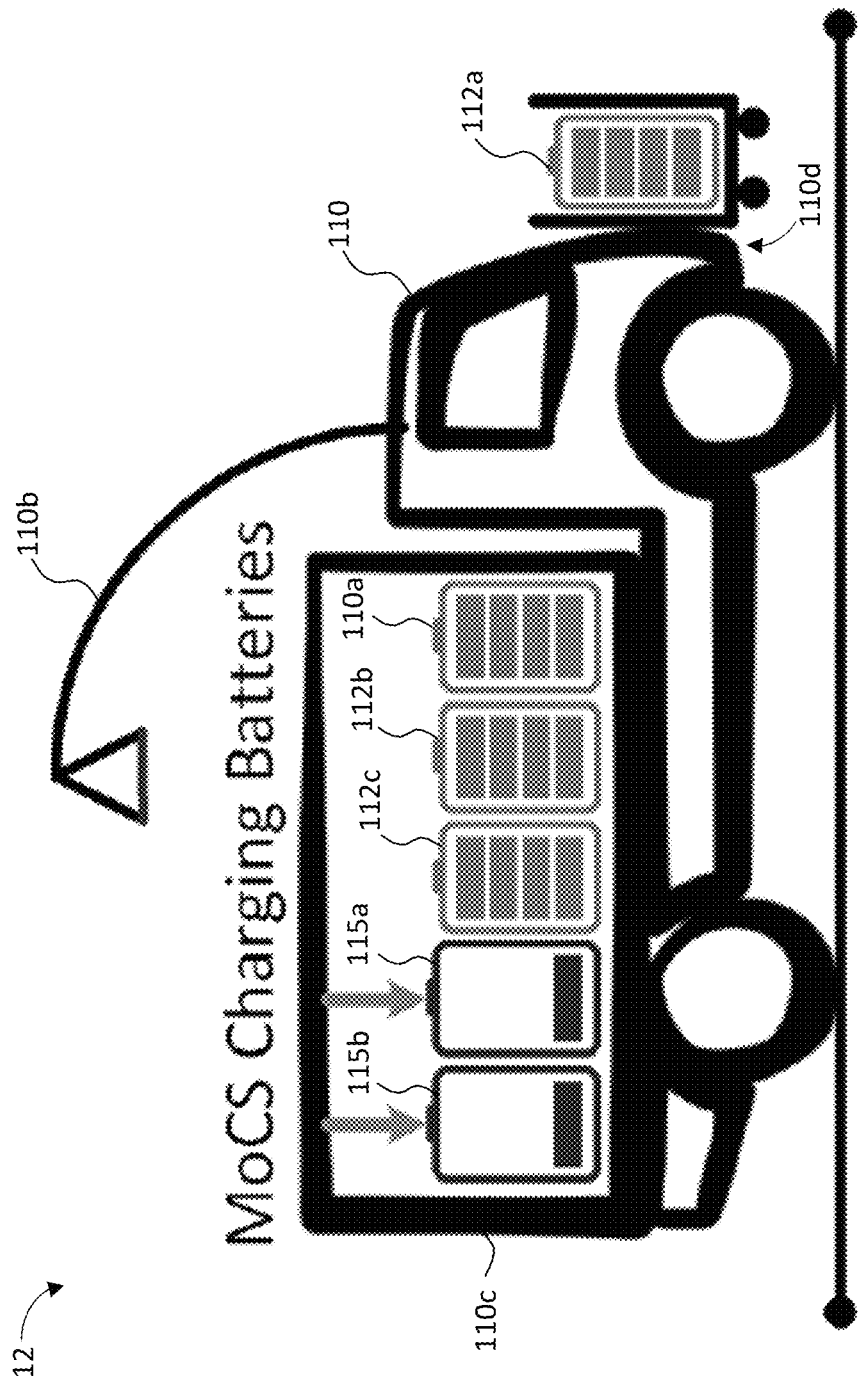
FIG. 8 provides an example of a mobile charging unit configured to deploy and retrieve external battery units, such as one or more BoW systems or devices, according to some embodiments discussed herein.

According to the embodiment of FIG. 8, the MoCS 110 may be configured to hold, position, or retain the external battery unit 112 (charged and deployable) on or near a front portion 110*d* (front bumper) of the MoCS 110 for ease of deployment of the external battery unit 112 to a rear portion (e.g., back bumper) of the mobile battery-powered entity 108. In some embodiments, the MoCS 110 may be configured to store both charged external battery units 112 and discharged external battery units 115*a* and non-deployable battery units 110*a* within its bed 110*c*. The bed 110*c* of the MoCS 110 may be protected with a movable covering such that the contents within the bed 110*c* of the MoCS 110 are protected from hazardous conditions and ambient weather. The MoCS 110 may comprise a mechanism 110*b* configured to move both discharged external battery units 115*a* and external battery units 112 between the front portion 110*d* of the MoCS 110 and the bed 110*c* of the MoCS 110. In some embodiments, this mechanism 110*b* can comprise but is not limited to one or more robotic arms, a chute system, movable platforms, conveyor belts, pneumatic tubes, hydraulics, and other suitable equipment, or apparatuses, and any variants or combinations thereof.

In some embodiments, the MoCS 110 may contain one or more non-deployable batteries 110*a*. These batteries may remain with the MoCS 110 and may be used to power the MoCS 110 and/or charge one or more discharged external battery units 115*a*. In another embodiment, the MoCS 110 may also comprise other energy sources, including but not limited to flexible solar paneling placed around the MoCS 110. These other energy sources may be used to power the MoCS 110 and/or charge one or more discharged external battery units 115*a*. In another embodiment, the MoCS 110 may use entity-to-entity charging to charge its internal battery and/or one or more discharged external battery units 115*a*.

Figure 9:
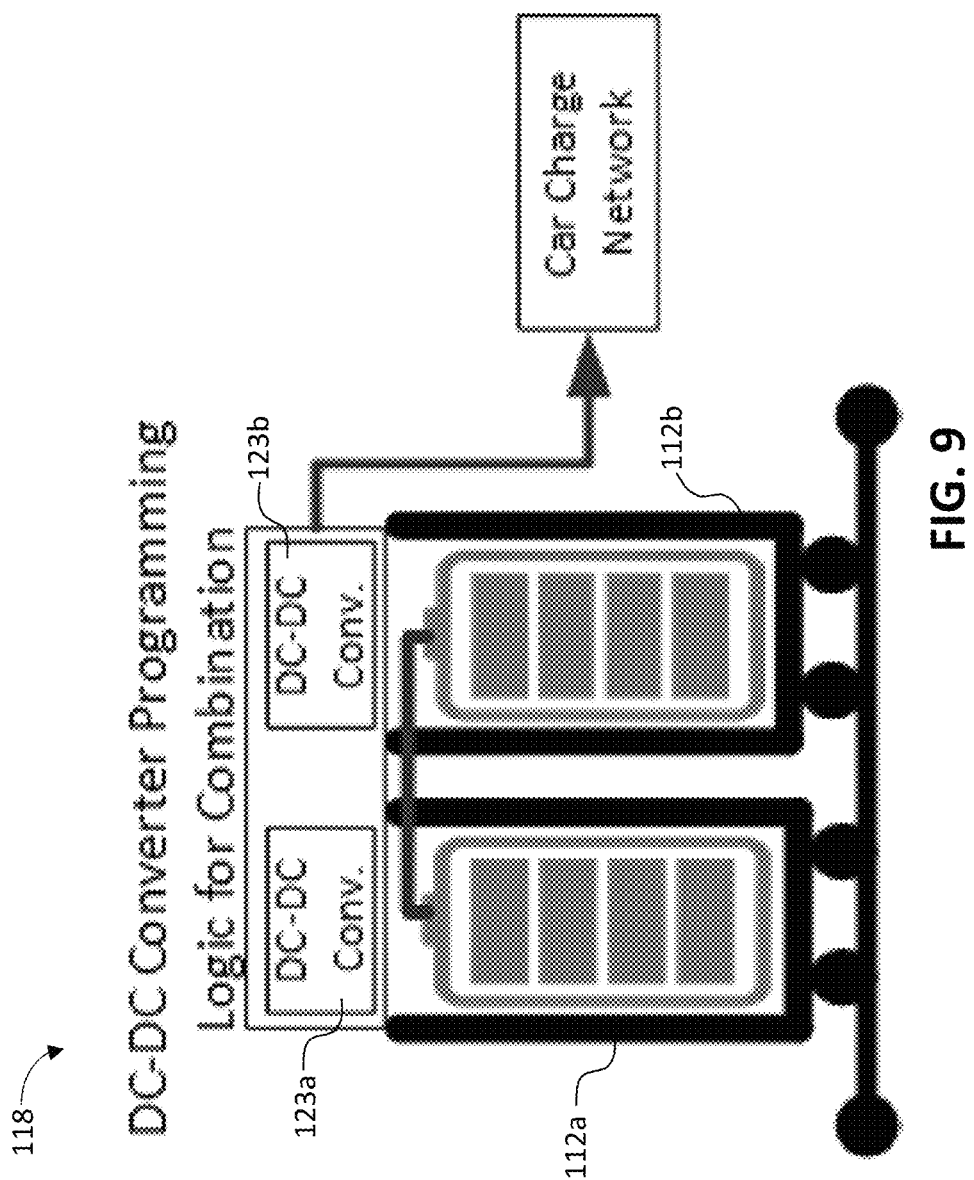
FIG. 9 provides an example external battery unit configured to be deployed for charging terrestrial entities on-the-go, according to some embodiments discussed herein.

According to the embodiment of FIG. 9, individual external battery units 112*a* and 112*b* may each comprise a DC-DC converter 123*a* and 123*b*, respectively. Individually, the DC-DC converter 123*a* allows the external battery unit 112*a* to connect with a car charge network comprising one or more of the mobile battery-powered entities 102, 104, 106, 108. In some embodiments, the DC-DC converters 123*a*, 123*b* are configured to be combined with one or more other DC-DC converters (not shown) to deliver further improved charging performance. For example, when two external battery units 112*a* and 112*b* are connected in tandem, the DC-DC converters 123*a*, 123*b* will act as a combined unit to provide for higher voltage charge transfer and faster charging. In some embodiments, the one or more external battery units 112 may be programmed to provide the optimal charging voltage and current.

FIGS. 10A-10D illustrate an example latching configuration and procedure for establishing an electrical connection between an external battery unit (e.g., 112) and a mobile battery-powered entity (e.g., 102).

Figure 10A:
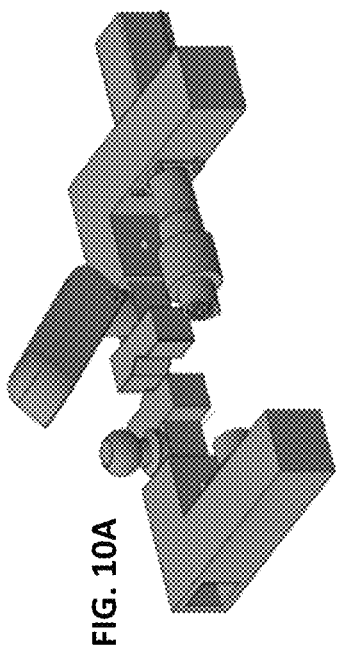
FIGS. 10A-10D illustrate various example latch options for connecting an external battery unit to a mobile battery-powered entity for on-the-go charge transfer, according to some embodiments discussed herein.
Figure 10B:
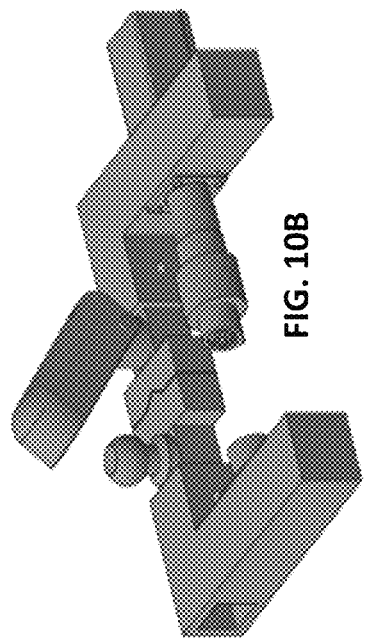
Figure 10C:
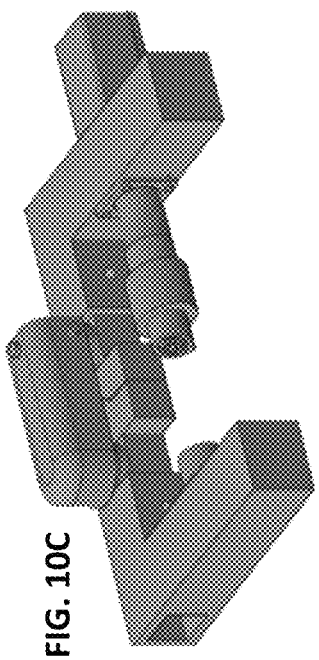
Figure 10D:
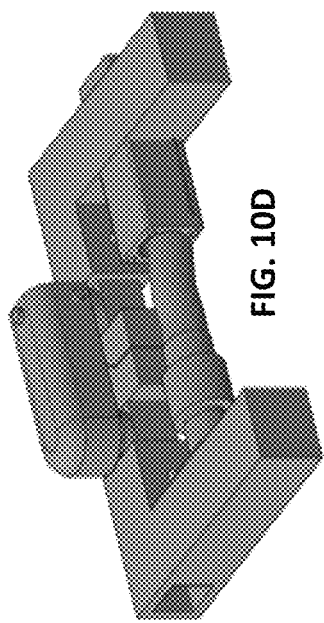

In some embodiments, a connection can be made using a trailer hitch, e.g., a specially configured trailer hitch operable to secure the two objects and connect the batteries. In FIGS. 10A-10D, a connection portion of a hitch for an example mobile battery-powered entity 102 is illustrated as a ball hitch, however many other suitable configurations are possible and are contemplated herein. A connection portion of a socket carried on an example external battery unit 112, the connection portion being operable to be secured to or about or through the hitch of the mobile battery-powered entity 102. In some embodiments, alignment, positioning, and confirmation of suitable approach for two entities in motion can be carried out using an electromagnet or the like. In FIG. 10A, we can see the two connectors separated. Once aligned a latch will connect the two trailer hitches using an electromagnet as showing in FIG. 10B and secure the connection with a latch, as shown in FIG. 10C. The bow can then extend a locking peg to ensure the latch does not become dislodged. Once the two vehicles are attached, an arm connected to the electrical plug extends to connect the BOW's battery to the EV's as shown in FIG. 10D. In some embodiments, the arm has a gear rack on its side which allows a motor to extend it. Once charging is completed the plug can be retracted and disconnected. Then the bow can be disconnected by disengaging the electromagnet, lowering the hitch and raising the latch.

In some embodiments, the process of connecting can be carried out by one or both of the electrical connection between the external battery unit 112 and the mobile battery-powered entity 102. In some embodiments, when the mobile battery-powered entity 102 has a low or critically low battery charge, an MoCS may be deployed where the MoCS may store one or more of the external battery units 112. The MoCS may receive guidance from the BoW System (e.g., system 1) in order to arrive sufficiently nearby the mobile battery-powered entity 102, get into the same or an adjacent lane (in a case in which both the MoCS and mobile battery-powered entity 102 are terrestrial entities; or otherwise sufficiently nearby in the airspace or waterway), the MoCS can be caused to synchronize its speed and route with that of the mobile battery-powered entity 102, and the MoCS can deploy the external battery unit 112 in an instance in which the mobile battery-powered entity is configured to latch to an external battery unit 112.

In some embodiments, the MoCS may release the external battery unit 112 (e.g., BoW unit), e.g., when a sufficient distance from the mobile battery-powered entity 102, and the external battery unit 112 may coordinate with the mobile battery-powered entity 102 while traversing the remaining distance to the mobile battery-powered entity 102. The external battery unit 112 may include sensors, a GPS system, telecommunications devices, or the like in order to send and receive information, instructions, and the like while traversing the remaining distance to the mobile battery-powered entity 102. Once the external battery unit 112 is sufficiently adjacent the mobile battery-powered entity 102, the external battery unit 112 and/or the mobile battery-powered entity 102 may initiate a latch sequence in which the external battery unit 112 and the mobile battery-powered entity 102 become operably coupled (e.g., physically coupled, electrically coupled, chemically coupled, fluidically coupled, releasably coupled, and/or the like). In some embodiments, multiple external battery units 112 can be deployed at the same time or during a same period of time.

In some embodiments, once the BoW(s) align with the EV using an electromagnet, the bow can lower it's hitch latch and secure the connection, the BoW can then extend its plug and connect it's battery to the EV, and/or, once the transaction is determined to be successful and the EV starts receiving charge from the BoW unit.

Figure 11:
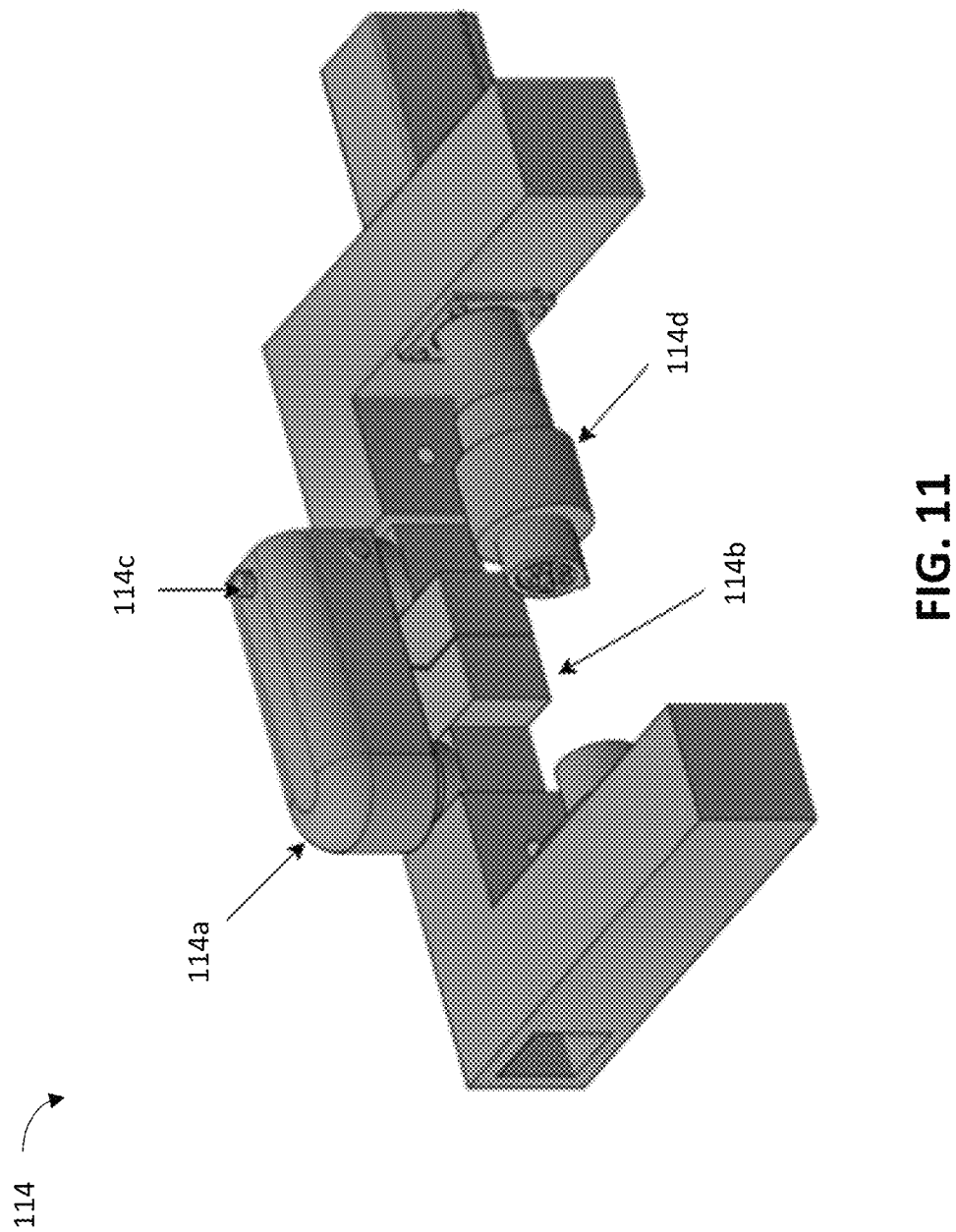
FIG. 11 illustrates one of the example latch option for connecting an external battery unit to a mobile battery-powered entity for on-the-go charge transfer, according to some embodiments discussed herein.

Referring now to FIG. 11, the latch 114 is illustrated in greater detail as comprising a hitch and a first electromagnet 114*b* on the mobile battery-powered entity 102 that are configured to, respectively, physically and electromagnetically coupled to a latch 114*a* and held in place using a locking peg 114*c* at the external battery unit 112. Once the latch 114*a* is physically coupled to the hitch, the external battery unit 112 can provide a transferring electrical coupling 114*d* to electrically connect to a receiving electrical coupling at the mobile battery-powered entity 102, and thereafter the charge transfer event can take place. In some embodiments, the latch 114 may further comprise a metering entity configured to track, measure, estimate, or calculate the amount of charge transfer between the external battery unit 112 and the mobile battery-powered entity 112.

Figure 12:
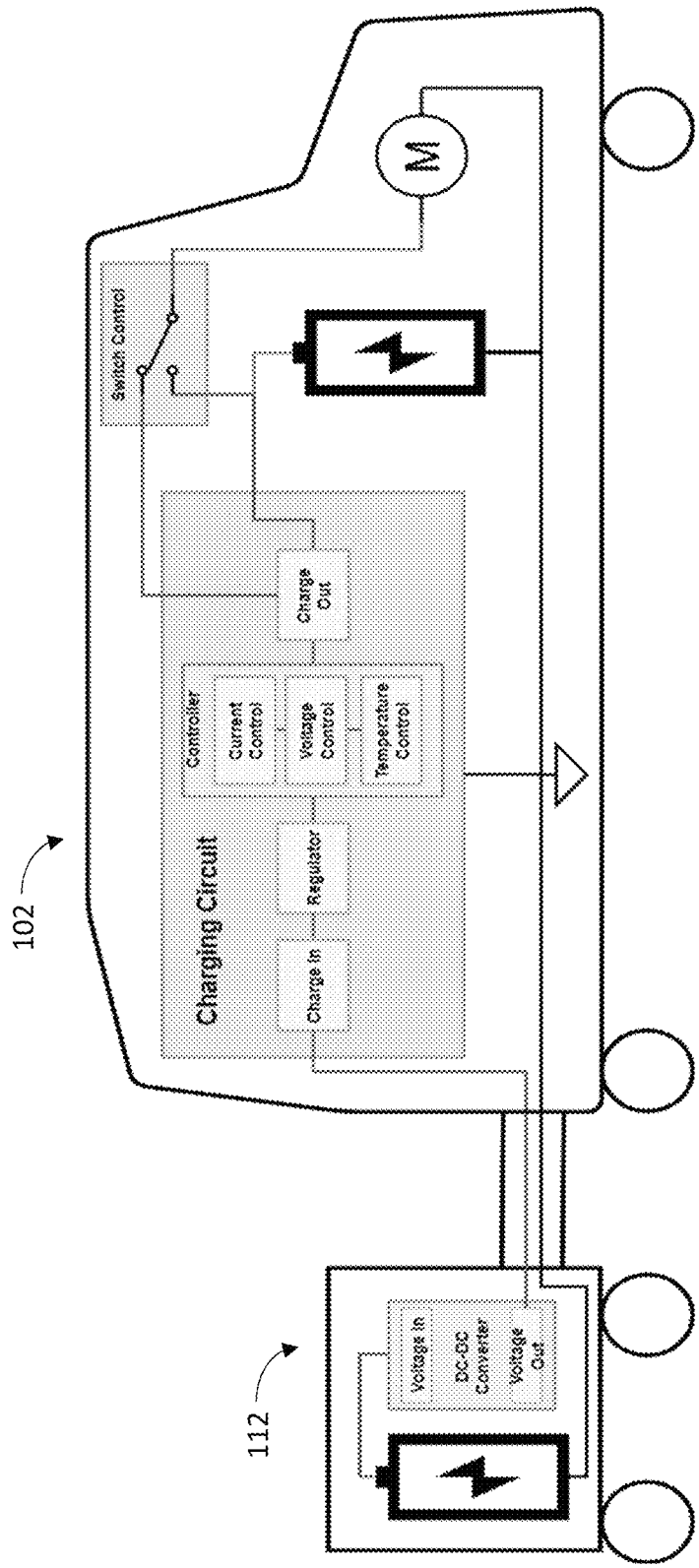
FIG. 12 illustrates a charging circuit for a battery on wheels (BoW) system, according to some embodiments discussed herein.

In some embodiments, once a mobile battery unit 112 connected to the mobile battery-powered entity 102 may be required to both charge the battery and power the vehicle at the same time. To accomplish this, a charging control circuit, such as that illustrate din FIG. 12, can be used to both charge the battery and power the vehicle at the same time. To accomplish this, a charging control circuit, such as that illustrated in FIG. 12 may be used to switch between the battery and the external battery unit 112. When the external battery unit 112 is connected, e.g., via the latch 112*b* described hereinabove, a signal is sent from the external battery unit 112 to the charge control circuit of the mobile battery-powered entity 102. The external battery unit 112 may use, for instance, a SAE J1772 plug, which may include a dedicated pin to determine the position of the plug. Certain voltages represent a partial and full connection. When fully connected, the controller can then begin transmitting the necessary information to the bow indicating what output voltage should be set. Once the proper voltage is supplied, the switch controller can then connect the BOW battery as the vehicle's main power supply and disconnect its own battery for charging. The Charge controller is also responsible for ensuring voltage, current and temperature control; ensuring that the vehicle and BOW battery are not damaged or operating in an unsafe manner. This is done using current and voltage monitors which are responsible for controlling the current and voltage being supplied. A temperature sensor may also be used to monitor the battery and ensure that it does not reach a temperature that could cause damage. The charging circuit can then output the power to charge the vehicles battery and power it's motor.

Figure 13:
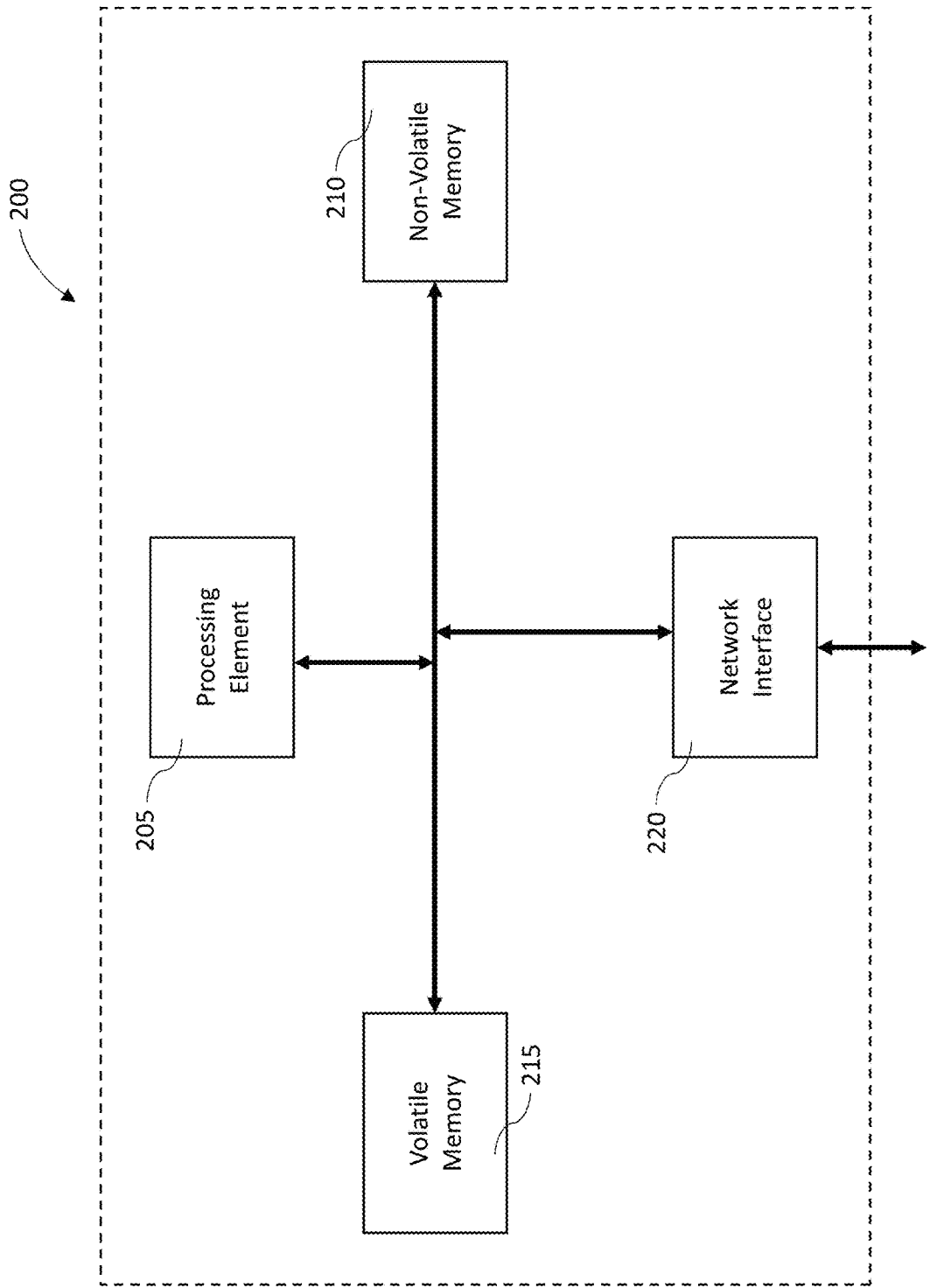
FIG. 13 provides an example computing entity configured to carry out part or all of at least some of the various processes, algorithms, and methods described herein, according to some embodiments discussed herein.

FIG. 13 provides a schematic of a computing device 200 according to at least one embodiment of the present disclosure. In some embodiments, the computing device 200 can be similar to or the same as the computing entity 10. In some embodiments, the computing entity 10 can comprise the computing device 200, or vice versa. In some embodiments, the computing device 200 can be configured to carry out all or part of any of the methods, algorithms, processes, or approaches described herein, according to a set of instructions or according to computer program code. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in at least one embodiment, the computing device 200 may include may include or be in communication with one or more processing elements 205 (also referred to as processors, processing circuitry, and/or similar terms used herein interchangeably) that communicate with other elements within the computing device 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the computing device 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the computing device 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the computing device 200 with the assistance of the processing element 205 and operating system.

In at least one embodiment, the computing device 200 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing device 200 may include or be in communication with one or more input elements, such as a keyboard input, a mouse input, a touch screen/display input, motion input, movement input, audio input, pointing device input, joystick input, keypad input, and/or the like. The computing device 200 may also include or be in communication with one or more output elements (not shown), such as audio output, video output, screen/display output, motion output, movement output, and/or the like.

Exemplary External Computing Entity

Figure 14:
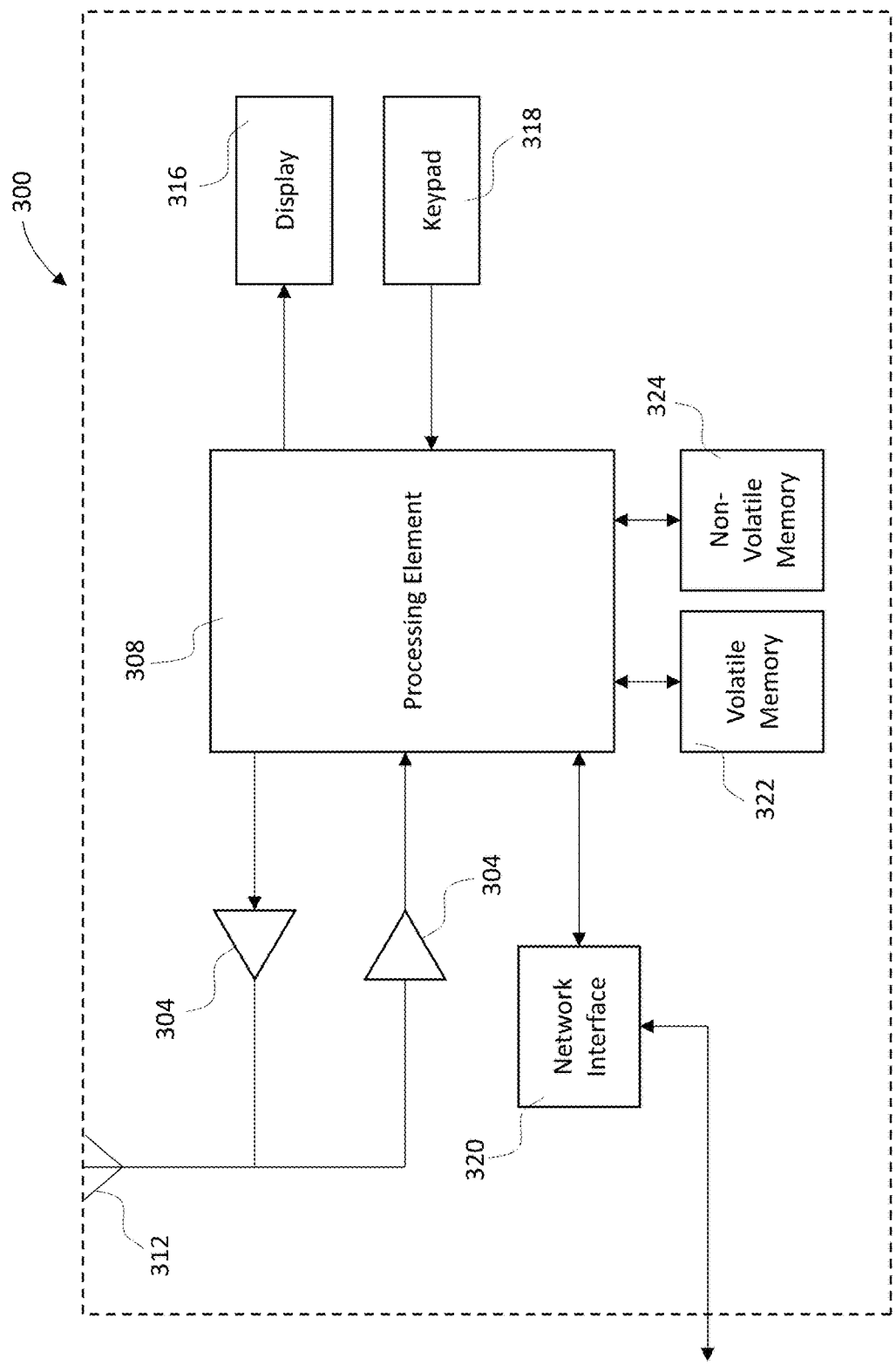
FIG. 14 provides an example computing entity configured to carry out part or all of at least some of the various processes, algorithms, and methods described herein, according to some embodiments discussed herein.

FIG. 14 provides an illustrative schematic representative of an external computing entity 300 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 300 can be operated by various parties. As shown in FIG. 14, the external computing entity 300 can comprise an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 300 may be capable of operating with one or more air interface standards, communication protocols, modulation types, and access types. More particularly, the external computing entity 300 may operate in accordance with any of a number of wireless communication standards and protocols, such as those described above with regard to the computing device 200. In a particular embodiment, the external computing entity 300 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 300 may operate in accordance with multiple wired communication standards and protocols, such as those described above with regard to the computing device 200 via a network interface 320.

Via these communication standards and protocols, the external computing entity 300 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 300 can also download changes, add-ons, and updates, for instance, to its firmware, software (e.g., including executable instructions, applications, program modules), and operating system.

According to one embodiment, the external computing entity 300 may include location determining aspects, devices, modules, functionalities, and/or similar words used herein interchangeably. For example, the external computing entity 300 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 300 position in connection with a variety of other systems, including cellular towers, Wi-Fi access points, and/or the like. Similarly, the external computing entity 300 may include indoor positioning aspects, such as a location module adapted to acquire, for example, latitude, longitude, altitude, geocode, course, direction, heading, speed, time, date, and/or various other information/data. Some of the indoor systems may use various position or location technologies including radio-frequency identification (RFID) tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 300 may also comprise a user interface (that can comprise a display 316 coupled to a processing element 308) and/or a user input interface (coupled to a processing element 308). For example, the user interface may be a user application, browser, user interface, and/or similar words used herein interchangeably executing on and/or accessible via the external computing entity 300 to interact with and/or cause display of information/data from the computing device 200, as described herein. The user input interface can comprise any of a number of devices or interfaces allowing the external computing entity 300 to receive data, such as a keypad 318 (hard or soft), a touch display, voice/speech or motion interfaces, or other input device. In embodiments including a keypad 318, the keypad 318 can comprise (or cause display of) the conventional numeric (0-9) and related keys (#, *), and other keys used for operating the external computing entity 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 300. As indicated, this may include a user application that is resident on the entity or accessible through a browser or other user interface for communicating with the computing device 200 and/or various other computing entities.

In another embodiment, the external computing entity 300 may include one or more components or functionality that are the same or similar to those of the computing device 200, as described in greater detail above. As will be recognized, these architectures and descriptions are provided for exemplary purposes only and are not limiting to the various embodiments.

In various embodiments, the external computing entity 300 may be embodied as an artificial intelligence (AI) computing entity, such as a vehicle's AI-based navigation system, Apple's Siri, an Amazon Echo, Amazon Echo Dot, Amazon Show, Google Home, and/or the like. Accordingly, the external computing entity 300 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Figure 15:
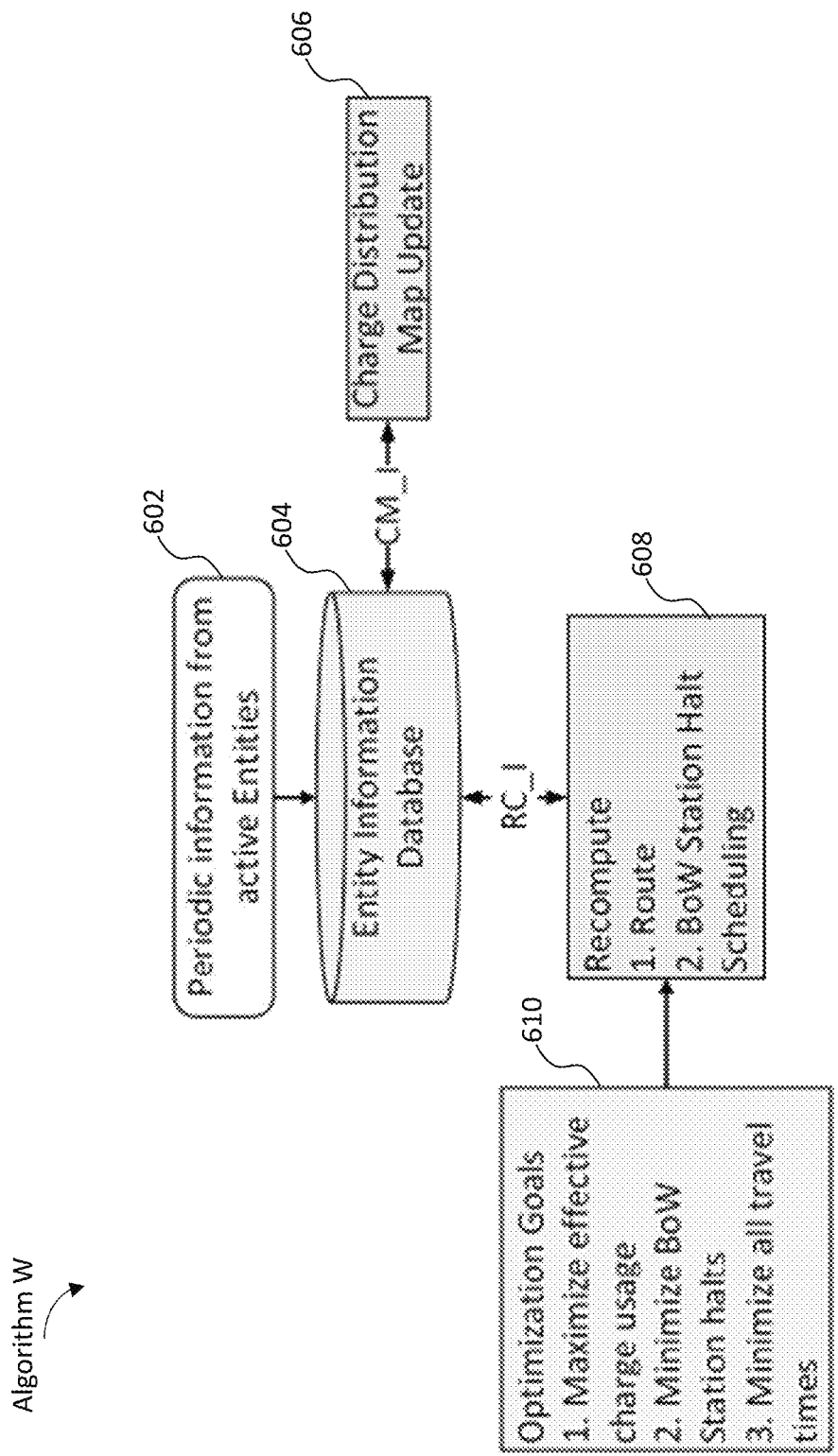
FIG. 15 provides an example of a charge scheduling algorithm, according to some embodiments discussed herein.
Figure 16:
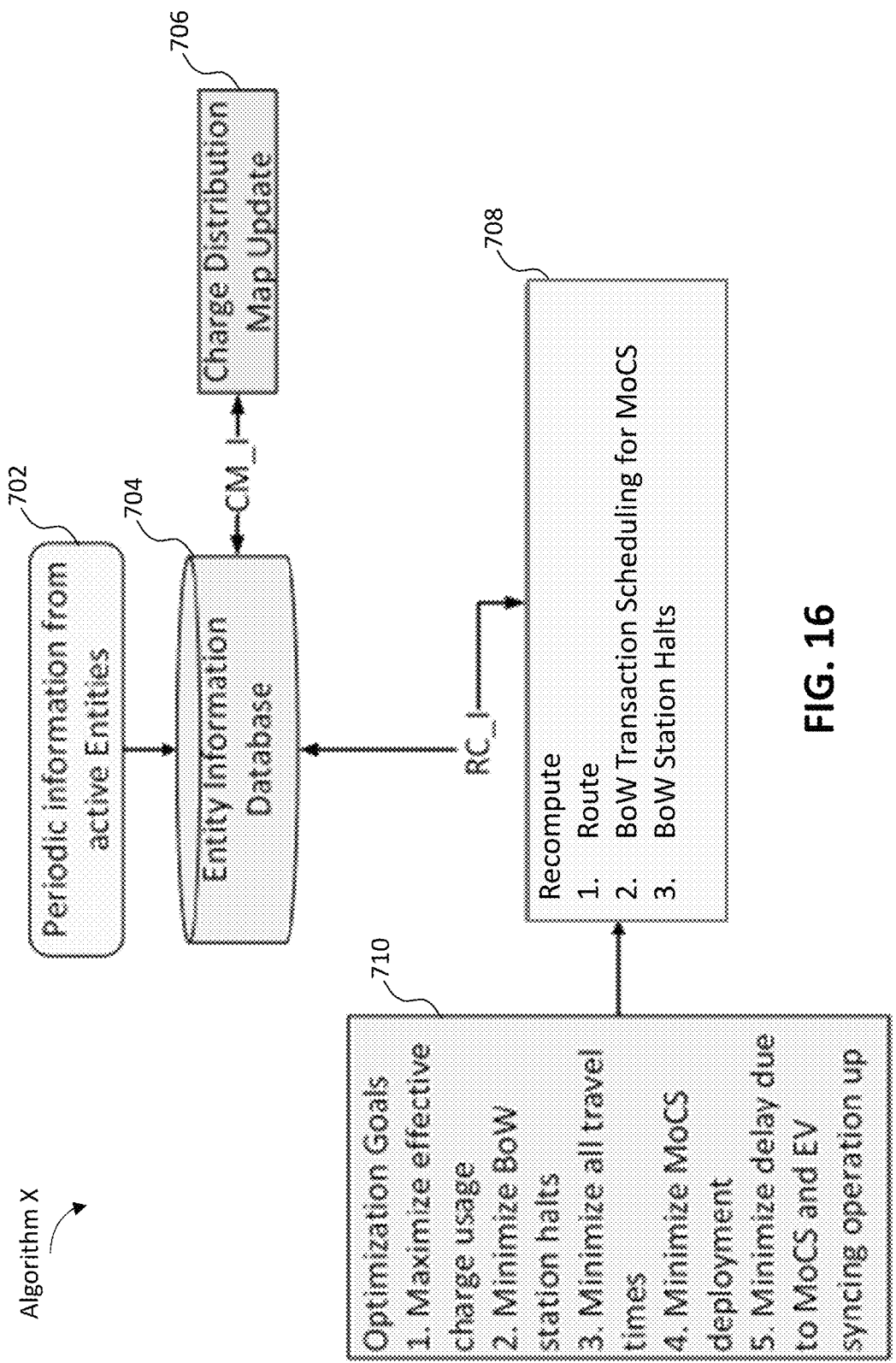
FIG. 16 provides an example of a charge scheduling algorithm, according to some embodiments discussed herein.
Figure 17:
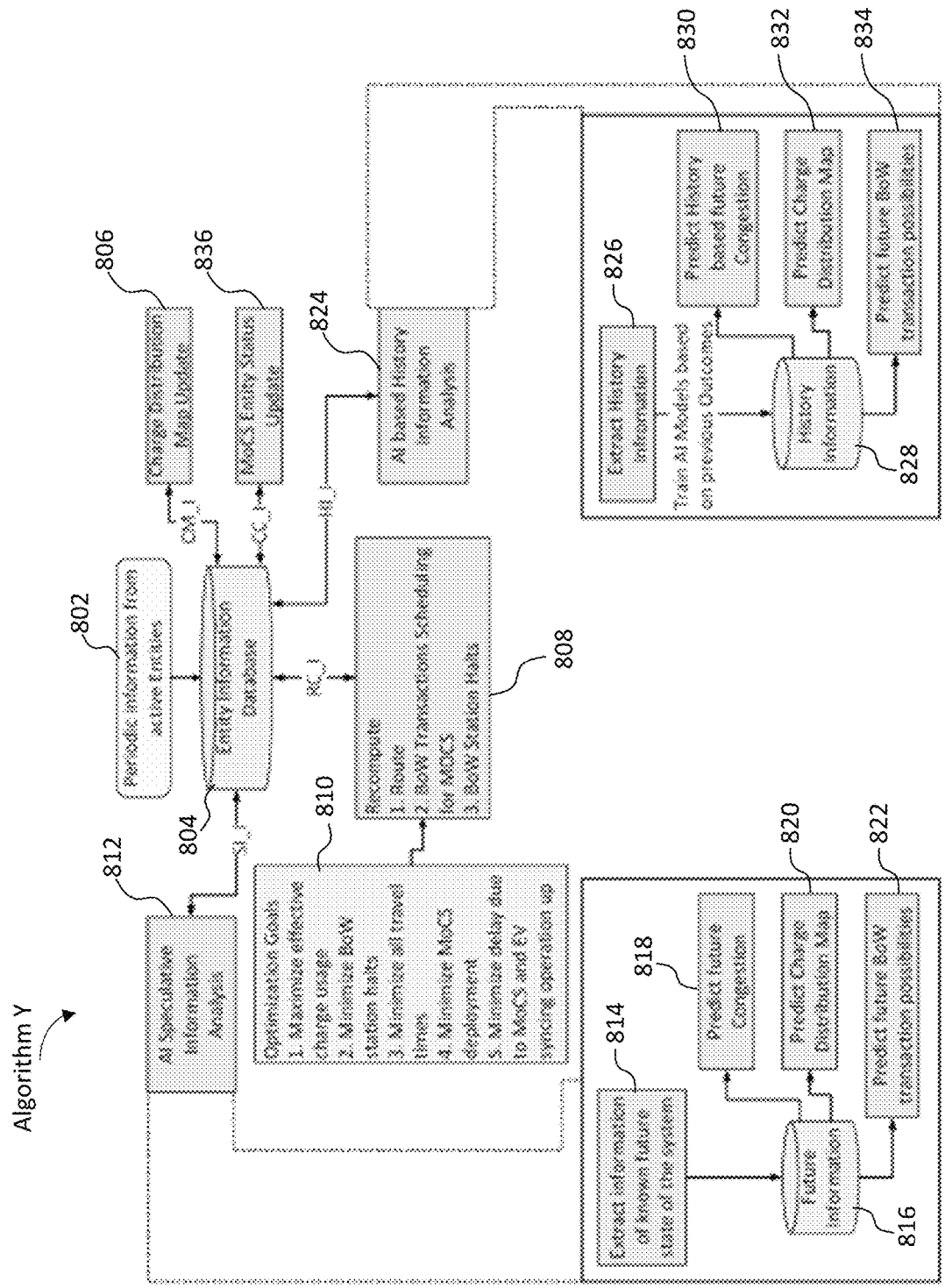
FIG. 17 provides an example of a charge scheduling algorithm, according to some embodiments discussed herein.

Turning now to the algorithmic decision-making process and to discussion of at least some of the algorithms considered herein, a general overview of some of the features of three example algorithms is illustrated in FIGS. 15-17. Algorithms W, X, and Y represent scheduling and routing algorithms with varying levels of complexity, each of which are useful for decision-making with regard to the complex task of planning a large number of entity routes and charge transactions for a charge network, such as described herein.

As with many goal-oriented or goal-directed processes and models, the particular charge scheduling and routing algorithms identified as Algorithm W, Algorithm X, and Algorithm Y in Table 1 each have optimization goals which include i) maximizing effective charge usage, ii) minimize the number and the duration of stops required by entities for charging at stationary charging stations, and iii) minimize all travel times for entities in the charge network. The three algorithms presented here and discussed in further detail below are provided for purposes of example and illustration only and are in no way intended to limit the scope of the present disclosure.

As illustrated in FIG. 15, Algorithm W, which is the least complex algorithm from among the three discussed herein, can be used by a computing device to generate and maintain a charge-distribution map and can be used to iteratively update, or update in real time, the charge-distribution map based at least in part on information about the current status of entities in the charge network to re-route entities as necessary and to schedule charge transactions. In some embodiments, periodic information from the vehicles/entities 602 is sent to the computing device (e.g., a cloud application) and are stored in an Entity Information Database 604. In some embodiments, with a periodicity of CM_I, an updated charge distribution map 606 is generated and stored in the Entity Information Database 604. In some embodiments, the Entity Information Database 604 can contain some or all of the information used for routing and charge transaction scheduling. In some embodiments, with a periodicity of RC_I, routing and battery charge station scheduling 608 is performed for the network based upon pre-determined optimization goals 610.

As illustrated in FIG. 16, Algorithm X, which is more complex than Algorithm W and which provides the additional features of speculative information incorporation and historic information incorporation, also arguably provides, at least in some embodiments, a more optimized charge network with regard to the optimization goals. In some embodiments, the computing device can use Algorithm X to generate and maintain a charge-distribution map and can be used to iteratively update, or update in real time, the charge-distribution map based at least in part on information about the current status of entities in the charge network to re-route entities as necessary and to schedule charge transactions. In some embodiments, periodic information from the vehicles/entities 702 in the charge network is sent to the computing device (e.g., a cloud application) and they are stored in an Entity Information Database 704. In some embodiments, with a periodicity of CM_I, an updated charge distribution map 706 is generated and stored in the Entity Information Database 704. In some embodiments, with a periodicity of RC_I, routing, battery charge station scheduling, and MoCS external battery transaction scheduling 708 is performed for the network based upon the pre-determined optimization goals 710.

As illustrated in FIG. 17, Algorithm Y, which is more complex than Algorithms W or Y, and which provides the additional features of speculative information incorporation, historic information incorporation, and relay charging, also arguably provides, at least in some embodiments, a more optimized charge network with regard to the optimization goals. In some embodiments, the computing device can use Algorithm Y to generate and maintain a charge-distribution map and can be used to iteratively update, or update in real time, the charge-distribution map based at least in part on information about the current status of entities in the charge network to re-route entities as necessary and to schedule charge transactions. In some embodiments, periodic information from the vehicles/entities 802 in the charge network is sent to the computing device (e.g., a cloud application) and they are stored in an Entity Information Database 804. In some embodiments, with a periodicity of CM_I, an updated charge distribution map 806 is generated and stored in the Entity Information Database 804. In some embodiments, with a periodicity of SI_I, a speculative analysis 812 is performed based at least in part on information obtained regarding future travel plans, weather forecast, traffic forecast, etc., as well as extracted information about a known future station of the system 814. The algorithm employs artificial intelligence to predict future information 816 about different aspects of the network, including, but is not limited to, predicting future congestion 818, predicting future charge distribution map 820, and predicting future charge transaction possibilities 822. This information is computed and stored in the Entity Information Database 804. In some embodiments, the algorithm is capable of, with a periodicity of HI_I, performing a history information analysis 824 based at least in part on extracted historic information 826 that is compiled into history information 828. In some embodiments, an artificial intelligence program uses Algorithm Y to make certain predictions based upon the history information 828, including, but is not limited to, predicting congestion 830, predicting the future charge distribution map 832, and predicting future charge transaction possibilities 834. In some embodiments, a status of all charger entities 8036 is then processed and stored in the Entity Information Database 804. In some embodiments, some or all the information needed by the artificial intelligence, produced by the artificial intelligence, needed by Algorithm Y, and/or produced by Algorithm Y may be stored in the Entity Information Database 804. In some embodiments, with a periodicity of RC_I, routing, battery charge station scheduling, and MoCS external battery transaction scheduling 808 is performed for the network based upon the pre-determined optimization goals 810.

In some embodiments, the number and types of units in a network can dynamically change, e.g., a network at a specific instant of time may consist of n units which are only capable of receiving cars, m units of which are capable of just providing charge and p units which can do both as well as relaying charge (optionally). In some embodiments, the types of the units may vary in terms of their type of motion, e.g., a network may consist of n number of cars and m number of drones. In some embodiments, a charge transaction can occur between two different networks. Assume, for instance, that one network of units is owned by a specific company or organization and another network is owned by a different company or organization. In an event that there are several networks (each with dynamically varying number and types of units), then charge can be shared across networks based at least in part on pre-negotiated or real-time online negotiations on charge transfer rate and other parameters. Hence, both intra- and inter-network charge transfers are possible. Both inter- and inter-network charge transactions can be fully autonomous, based at least in part on the algorithms described above or variants thereof, and based at least in part on the requisite information on the locations of units, charge distribution map, etc.

Figure 18:
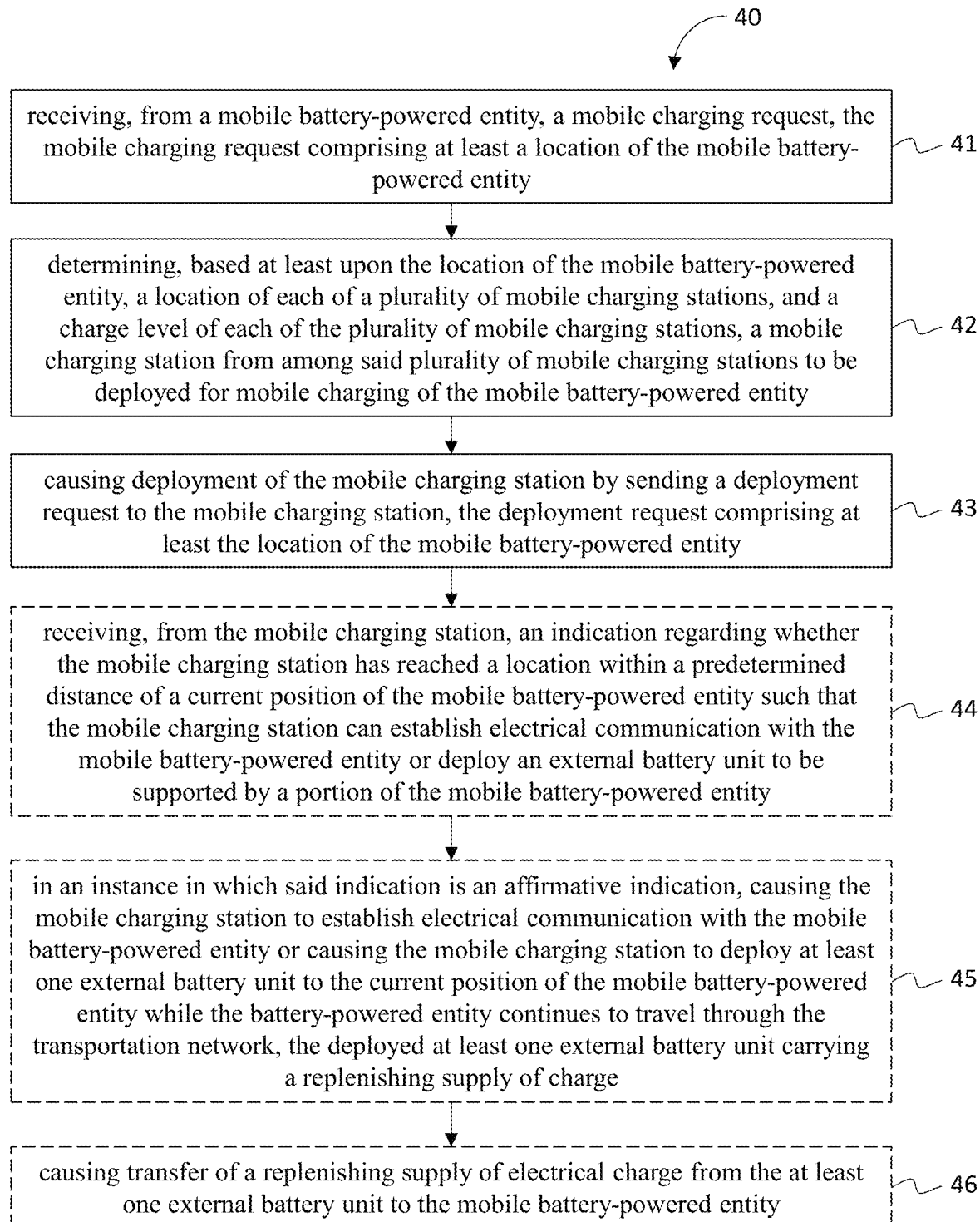
FIG. 18 provides a process flow diagram of an example method for charging a mobile entity, according to some embodiments discussed herein.

Referring now to FIG. 18, a method 40 can be carried out, for instance by one of the cloud computing entity 10, the computing device 200, the external computing entity 300, or the like, in order to distribute charge to mobile battery-powered entities in a transportation system. In some embodiments, the method 40 can comprise receiving, from a mobile battery-powered entity, a mobile charging request, the mobile charging request comprising at least a location of the mobile battery-powered entity, at 41. In some embodiments, the method 40 can further comprise determining, based at least in part on the location of the mobile battery-powered entity, a location of each of a plurality of mobile charging stations, and a charge level of each of the plurality of mobile charging stations, a mobile charging station from among said plurality of mobile charging stations to be deployed for mobile charging of the mobile battery-powered entity, at 42. In some embodiments, the method 40 can further comprise causing deployment of the mobile charging station by sending a deployment request to the mobile charging station, the deployment request comprising at least the location of the mobile battery-powered entity, at 43. In some embodiments, the method 40 can, optionally, further comprise receiving, originating from the mobile charging station, an indication regarding whether the mobile charging station has reached a location within a predetermined distance of a current position of the mobile battery-powered entity such that the mobile charging station can establish electrical communication with the mobile battery-powered entity or deploy an external battery unit to be supported by a portion of the mobile battery-powered entity, at 44. In some embodiments, the method 40 can, optionally, further comprise, in an instance in which said indication is an affirmative indication, causing the mobile charging station to establish electrical communication with the mobile battery-powered entity or causing the mobile charging station to deploy at least one external battery unit to the current position of the mobile battery-powered entity while the battery-powered entity continues to travel through the transportation network, the deployed at least one external battery unit carrying a replenishing supply of charge, at 45. In some embodiments, the method 40 can, optionally, further comprise causing transfer of a replenishing supply of electrical charge from the at least one external battery unit to the mobile battery-powered entity, at 46.

Figure 19:
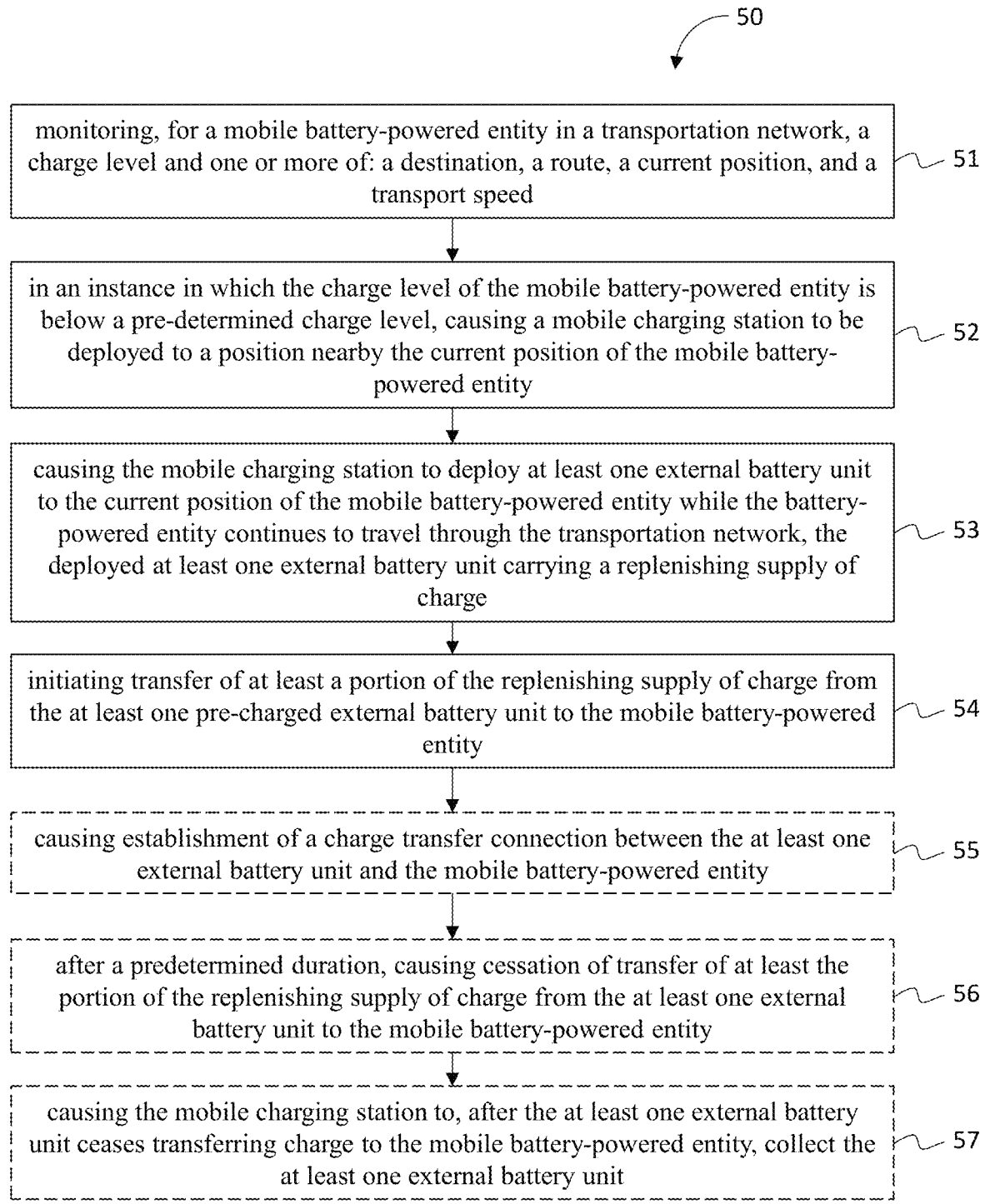
FIG. 19 provides a process flow diagram of an example method for charging a mobile entity, according to some embodiments discussed herein.

Referring now to FIG. 19, a method 50 can be carried out, for instance by one of the cloud computing entity 10, the computing device 200, the external computing entity 300, or the like, in order to distribute charge to mobile battery-powered entities in a transportation system. In some embodiments, the method 50 can comprise monitoring, for a mobile battery-powered entity in a transportation network, a charge level and one or more of: a destination, a route, a current position, and a transport speed, at 51. In some embodiments, the method 50 can further comprise, in an instance in which the charge level of the mobile battery-powered entity is below a pre-determined charge level, causing a MoCS to be deployed to a position nearby the current position of the mobile battery-powered entity, at 52. In some embodiments, the method 50 can further comprise causing the MoCS to deploy at least one external battery unit to the current position of the mobile battery-powered entity while the battery-powered entity continues to travel through the transportation network, the deployed at least one external battery unit carrying a replenishing supply of charge, at 53. In some embodiments, the method 50 can further comprise initiating transfer of at least a portion of the replenishing supply of charge from the at least one external battery unit to the mobile battery-powered entity, at 54. In some embodiments, the method 50 can, optionally, further comprise causing establishment of a charge transfer connection between the at least one external battery unit and the mobile battery-powered entity, at 55. In some embodiments, the method 50 can, optionally, further comprise, after a predetermined duration, causing cessation of transfer of at least the portion of the replenishing supply of charge from the at least one external battery unit to the mobile battery-powered entity, at 56. In some embodiments, the method 50 can, optionally, further comprise causing the MoCS to, after the at least one external battery unit ceases transferring charge to the mobile battery-powered entity, collect the at least one external battery unit, at 57.

Figure 20:
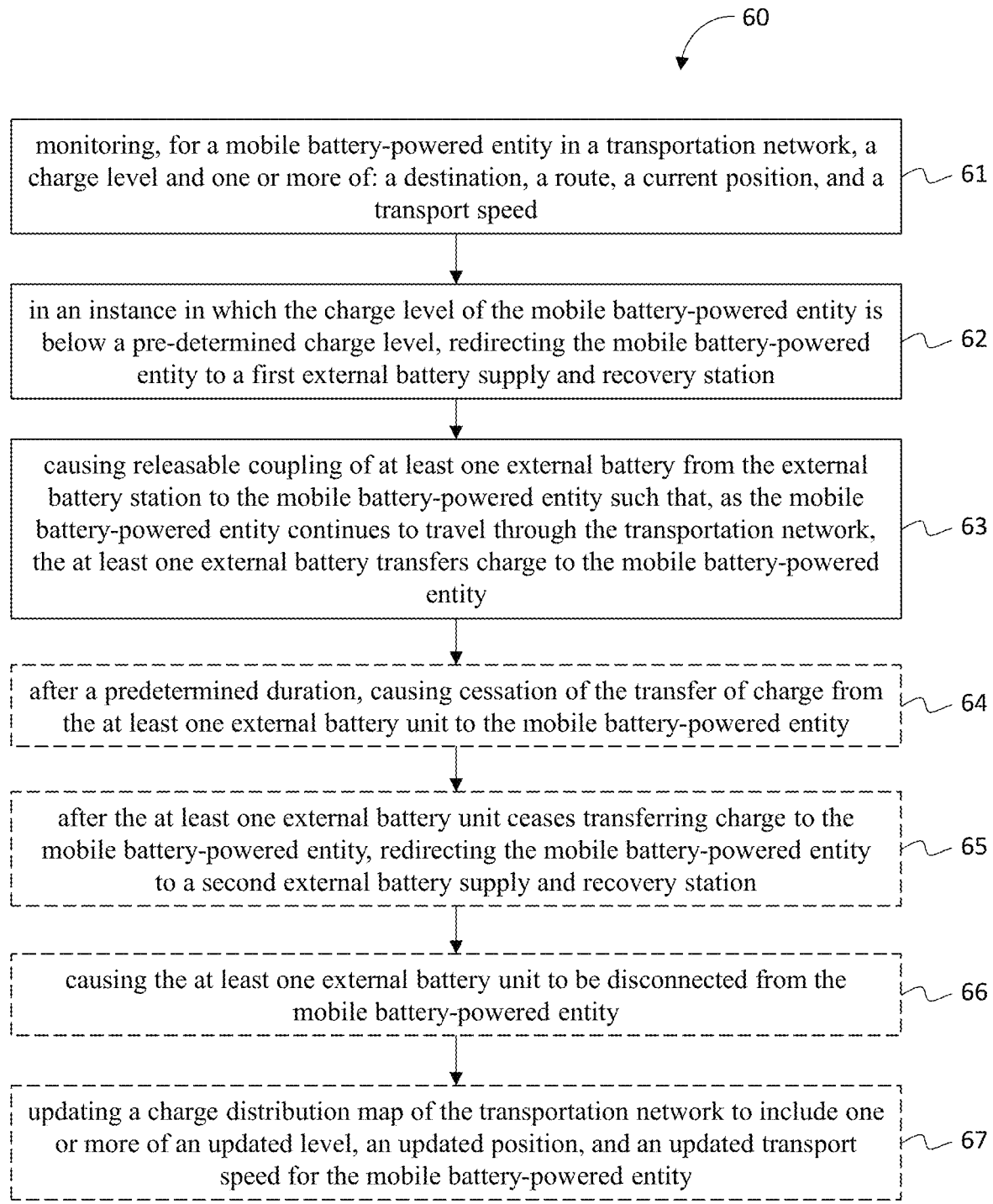
FIG. 20 provides a process flow diagram of an example method for governing charge transactions for a charging network, according to some embodiments discussed herein.

Referring now to FIG. 20, a method 60 can be carried out, for instance by one of the computing entity 10, the computing device 200, the external computing entity 300, or the like, in order to distribute charge to mobile battery-powered entities in a transportation system. In some embodiments, the method 60 can comprise monitoring, for a mobile battery-powered entity in a transportation network, a charge level and one or more of: a destination, a route, a current position, and a transport speed, at 61. In some embodiments, the method 60 can further comprise, in an instance in which the charge level of the mobile battery-powered entity is below a pre-determined charge level, redirecting the mobile battery-powered entity to a first external battery supply and recovery station, at 62. In some embodiments, the method 60 can further comprise causing releasable coupling of at least one external battery from the external battery supply and recovery station to the mobile battery-powered entity such that, as the mobile battery-powered entity continues to travel through the transportation network, the at least one external battery transfers charge to the mobile battery-powered entity, at 63. In some embodiments, the method 60 can, optionally, further comprise, after a predetermined duration, causing cessation of the transfer of charge from the at least one external battery unit to the mobile battery-powered entity, at 64. In some embodiments, the method 60 can, optionally, further comprise, after the at least one external battery unit ceases transferring charge to the mobile battery-powered entity, redirecting the mobile battery-powered entity to a second external battery supply and recovery station, at 65. In some embodiments, the method 60 can, optionally, further comprise causing the at least one external battery unit to be disconnected from the mobile battery-powered entity, at 66. In some embodiments, the method 60 can, optionally, further comprise updating a charge distribution map of the transportation network to include one or more of an updated level, an updated position, and an updated transport speed for the mobile battery-powered entity, at 67.

Figure 21:
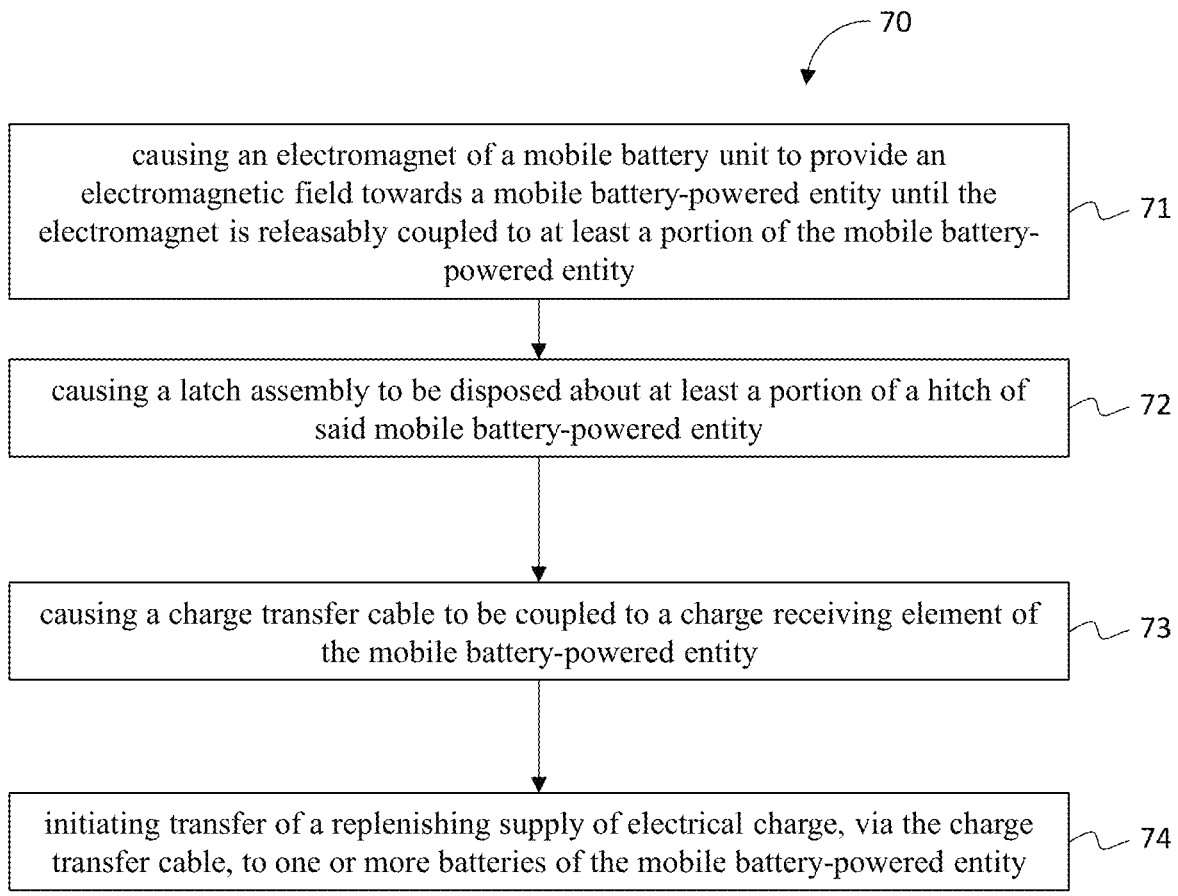
FIG. 21 provides a process flow diagram of an example method for charging a mobile entity, according to some embodiments discussed herein.

Referring now to FIG. 21, a method 70 can be carried out, for instance by one of the computing entity 10, the computing device 200, the external computing entity 300, or the like, in order to distribute charge to mobile battery-powered entities in a transportation system. In some embodiments, the method 70 can comprise causing an electromagnet of a mobile battery unit to provide an electromagnetic field towards a mobile battery-powered entity until the electromagnet is releasably coupled to at least a portion of the mobile battery-powered entity, at 71. In some embodiments, the method 70 can further comprise causing a latch assembly to be disposed about at least a portion of a hitch of said mobile battery-powered entity, at 72. In some embodiments, the method 70 can further comprise causing a charge transfer cable to be coupled to a charge receiving element of the mobile battery-powered entity, at 73. In some embodiments, the method 70 can further comprise initiating transfer of a replenishing supply of electrical charge, via the charge transfer cable, to one or more batteries of the mobile battery-powered entity, at 74.

Figure 22:
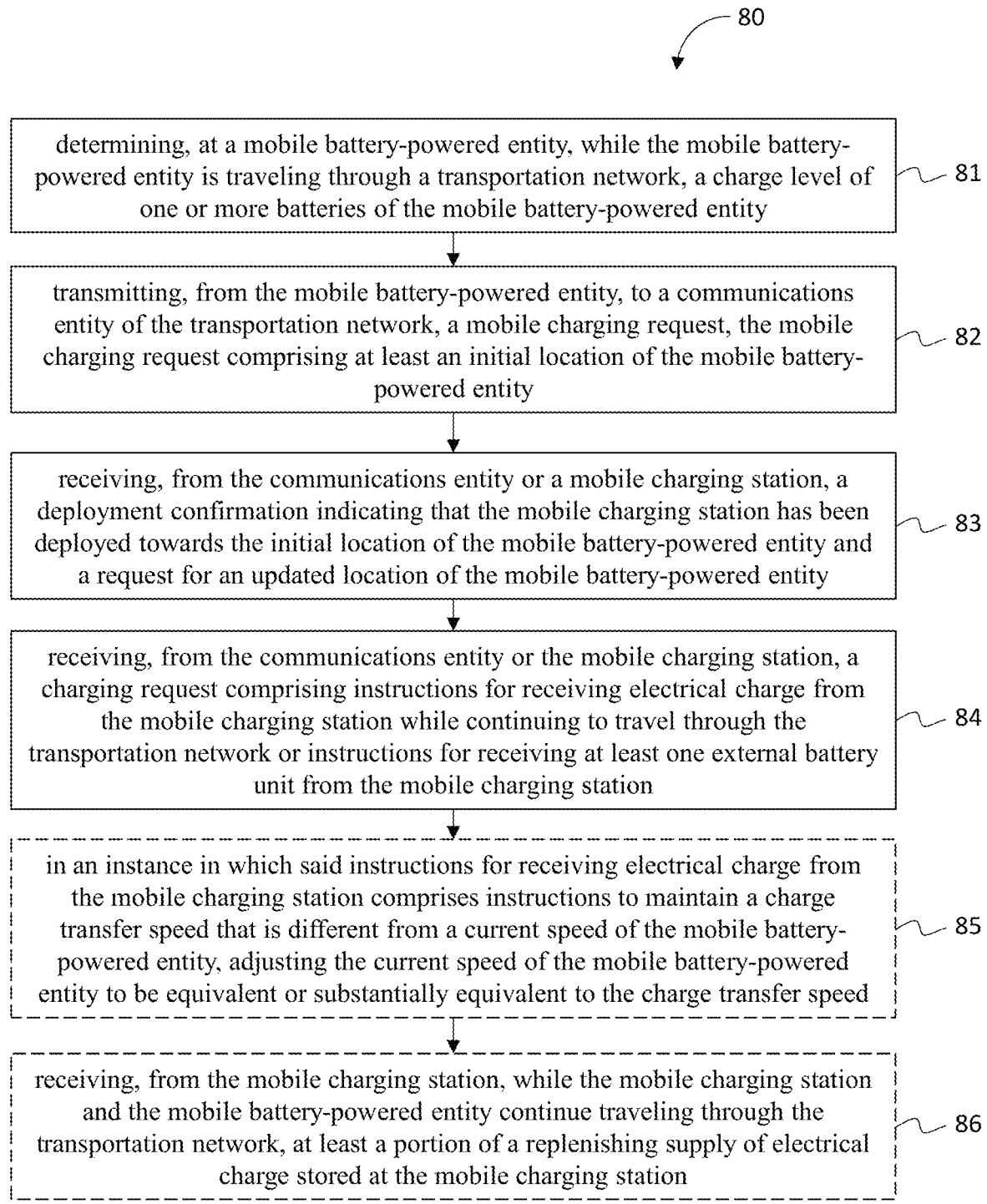
FIG. 22 provides a process flow diagram of an example method for charging a mobile entity, according to some embodiments discussed herein.

Referring now to FIG. 22, a method 80 can be carried out, for instance by one of the computing entity 10, the computing device 200, the external computing entity 300, or the like, in order to receive a replenishing supply of electrical charge at a battery-powered entity in a transportation system. In some embodiments, the method 80 can comprise determining, at a mobile battery-powered entity, while the mobile battery-powered entity is traveling through a transportation network, a charge level of one or more batteries of the mobile battery-powered entity, at 81. In some embodiments, the method 80 can further comprise transmitting, from the mobile battery-powered entity, to a communications entity of the transportation network, a mobile charging request, the mobile charging request comprising at least an initial location of the mobile battery-powered entity, at 82. In some embodiments, the method 80 can further comprise receiving, from the communications entity or a mobile charging station, a deployment confirmation indicating that the mobile charging station has been deployed towards the initial location of the mobile battery-powered entity and a request for an updated location of the mobile battery-powered entity, at 83. In some embodiments, the method 80 can further comprise receiving, from the communications entity or the mobile charging station, a charging request comprising instructions for receiving electrical charge from the mobile charging station while continuing to travel through the transportation network or instructions for receiving at least one external battery unit from the mobile charging station, at 84. In some embodiments, the method 80 can, optionally, further comprise, in an instance in which said instructions for receiving electrical charge from the mobile charging station comprises instructions to maintain a charge transfer speed that is different from a current speed of the mobile battery-powered entity, adjusting the current speed of the mobile battery-powered entity to be equivalent or substantially equivalent to the charge transfer speed, at 85. In some embodiments, the method 80 can, optionally, further comprise receiving, originating from the mobile charging station, while the mobile charging station and the mobile battery-powered entity continue traveling through the transportation network, at least a portion of a replenishing supply of electrical charge stored at the mobile charging station, at 86.

In some embodiments, approaches described herein and algorithms described herein can be operable to charge battery-powered entities both within and between charge networks. For instance, excess charge can be transmitted from a first charge network to a second charge network upon determining that the second charge network is a charge-depleted network relative to the first charge network and/or that the first charge network has excess charge. In some embodiments, an algorithm such as described above, can be used for charge transaction scheduling and/or route scheduling within and between a plurality of charge networks. In some embodiments, a computing device, such as a cloud application, computing network, server, or the like, can be used to apply such an algorithm to schedule a charge transaction between the first charge network and the second charge network.

In some embodiments, a scheduler may use an algorithm and/or a charge distribution map to determine where to allocate charge, either by peer-to-peer charging, charging via MoCS, or charging with an external battery unit. The scheduler may operate according to a set of optimization goals, which guide the scheduler in determining an optimal distribution of charge throughout an EV fleet. In some embodiments, while computing various EV routes, rerouting EVs as necessary, determining a spatiotemporal schedule for charge transactions, and/or a schedule for deploying MoCS in the system, the scheduler may consider certain factors. In some embodiments, the scheduler may consider the following optimization goals:

1) maximize effective charge usage by analyzing the charge distribution map;
2) minimize charging station halts by sustaining low battery vehicles;
3) minimize travel time of all EVs by limiting the number of rerouting;
4) minimize MoCS deployment
5) minimize delay due to MoCS and EV syncing up operation In some embodiments, the final decision of the scheduler may be a function of all the optimization parameters, where each parameter can be weighted differently depending on which goals the user wishes to prioritize. While the five optimization goals presented above are one possible set of optimization goals, other embodiments include less, more, and/or different optimization goals, e.g., based upon the desired outcome of a system operator and/or alternative constraints and/or preferences.

Apparatus, systems, and methods described herein relate generally charging a network of mobile battery-powered units on the go. For example, according to a first embodiment, a method can be provided that comprises receiving current charge level data from one or more mobile battery-powered entities of the plurality of mobile battery-powered entities to be charged, deploying a MoCS to the mobile battery-powered entity, transferring a charged external battery unit to the mobile battery-powered entity, and optionally receiving one or more discharged external battery units from the mobile battery-powered entity.

According to a second embodiment, a method that comprises receiving current charge level data from one or more mobile battery-powered entities of the plurality of mobile battery-powered entities to be charged, deploying a MoCS to the mobile battery-powered entity, receiving a discharged external battery unit from the mobile battery-powered entity, and optionally transferring a charged external battery unit to the mobile battery-powered entity.

According to a third embodiment, a method that comprises receiving current charge level data from one or more mobile battery-powered entities of the plurality of mobile battery-powered entities to be charged, routing the mobile battery-powered entity to a nearby battery station, transferring a charged external battery unit to the mobile battery-powered entity, and optionally receiving one or more discharged external battery units from the mobile battery-powered entity.

According to a fourth embodiment, a method that comprises receiving current charge level data from one or more mobile battery-powered entities of the plurality of mobile battery-powered entities to be charged, routing the mobile battery-powered entity to a nearby battery station, receiving a discharged external battery unit from the mobile battery-powered entity, and optionally transferring a charged external battery unit to the mobile battery-powered entity.

According to a fifth example, a method can be provided that comprises determining that a mobile battery-powered entity is within a pre-determined proximity of another mobile battery-powered entity, determining a charge level and a transport speed of the mobile battery-powered entity, determining the charge level and the transport speed of the other mobile battery-powered entity, in an instance in which the charge level of the mobile battery-powered entity is below a pre-determined (e.g., configurable) charge level and less than the charge level of the other mobile battery-powered entity, causing the mobile battery-powered entity to receive an electric charge from the other mobile battery-powered entity, and in an instance in which the charge level of the other mobile battery-powered entity is below the pre-determined (e.g., configurable) charge level and less than the charge level of the other mobile battery-powered entity, causing the other mobile battery-powered entity to receive the electric charge from the mobile battery-powered entity.

According to a sixth embodiment, an apparatus can be provided that comprises at least one processor and at least one memory including computer program code, the at least one memory and the computer program code configured to, with the processor, cause the apparatus to at least receive current charge level data for a plurality of mobile battery-powered entities, determine, based at least in part on the current charge level data, one or more mobile battery-powered entities of the plurality of mobile battery-powered entities to be charged, determine, based at least in part on the current charge level data, one or more other mobile battery-powered entities of the plurality of mobile battery-powered entities to be caused to charge the one or more mobile battery-powered entities; and cause, while the one or more mobile battery-powered entities and are being transported within a pre-determined proximity of the one or more other mobile battery-powered entities, the one or more other mobile battery-powered entities to charge the one or more mobile battery-powered entities.

According to a seventh embodiment, a method can be provided that comprises receiving current charge level data for a plurality of mobile battery-powered entities, determining, based at least in part on the current charge level data, one or more mobile battery-powered entities of the plurality of mobile battery-powered entities to be charged, determining, based at least in part on the current charge level data, one or more other mobile battery-powered entities of the plurality of mobile battery-powered entities to be caused to charge the one or more mobile battery-powered entities, and causing, while the one or more mobile battery-powered entities and are being transported within a pre-determined proximity of the one or more other mobile battery-powered entities, the one or more other mobile battery-powered entities to charge the one or more mobile battery-powered entities.

According to an eighth embodiment, a method can be provided that comprises wirelessly transmitting, from a mobile battery-powered entity while the mobile battery-powered entity is being transported through a predefined area, a current charge level to a computing device, receiving an indication from the computing device as to whether the mobile battery-powered entity is to charge another mobile battery-powered entity, to be charged by the other mobile battery-powered entity, or neither charge nor be charged by the other mobile battery-powered entity, and in an instance in which the indication received indicates that the mobile battery-powered entity is either to charge or be charged by the other mobile battery-powered entity: determining a geospatial location and a transport speed of the mobile battery-powered entity, receiving the geospatial location and the transport speed of the other mobile battery-powered entity, causing the mobile battery-powered entity to speed lock with the other mobile battery-powered entity based at least in part on the geospatial location and the transport speed of the mobile battery-powered entity and the other mobile battery-powered entity, in an instance in which the indication received indicates that the mobile battery-powered entity is to charge the other mobile battery-powered entity, causing the mobile battery-powered entity to transmit a charge to the other mobile battery-powered entity, and in an instance in which the indication received indicates that the mobile battery-powered entity is to be charged by the other mobile battery-powered entity, causing the mobile battery-powered entity to receive the charge from the other mobile battery-powered entity.

According to a ninth embodiment, a method can be provided that comprises determining a charge level, a current position, and a transport speed for a mobile battery-powered entity in a transportation network; determining the charge level, the current position, and the transport speed for another mobile battery-powered entity in the mobile charging network; and, in an instance in which the charge level of the mobile battery-powered entity is below a pre-determined charge level and less than the charge level of the other mobile battery-powered entity, causing the mobile battery-powered entity to receive an electric charge from the other mobile battery-powered entity while the mobile battery-powered entity and the other mobile battery-powered entity continue traveling through the transportation network. In some embodiments, the method can further comprise determining that the mobile battery-powered entity is within a pre-determined proximity of the other mobile battery-powered entity. In some embodiments, the method can further comprise, in an instance in which the charge level of the mobile battery-powered entity is below a pre-determined charge level and less than the charge level of the other mobile battery-powered entity, transmitting route instructions and transport speed instructions to the other mobile battery-powered entity; determining whether the other mobile battery-powered entity has complied with the route instructions and the transport speed instructions; and if the other mobile battery-powered entity has complied with the route instructions and the transport speed instructions, transmitting charge transfer instructions to the other mobile battery-powered entity. In some embodiments, the method can further comprise causing the other mobile battery-powered entity to transfer an electric charge to the mobile battery-powered entity according to the charge transfer instructions. In some embodiments, the charge transfer instructions can comprise one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity. In some embodiments, the method can further comprise, in an instance in which the charge level of the other mobile battery-powered entity is below the pre-determined charge level and less than the charge level of the other mobile battery-powered entity, causing the other mobile battery-powered entity to receive the electric charge from the mobile battery-powered entity. In some embodiments, the method can further comprise, in an instance in which the charge levels of the mobile battery-powered entity and the other mobile battery-powered entity are both below the pre-determined charge level, causing deployment of at least one charging vehicle or at the MoCS. In some embodiments, the mobile battery-powered entity and the other mobile battery-powered entity are selected from among battery-powered terrestrial vehicles, battery-powered aerial vehicles, battery-powered aquatic vehicles, charge relay vehicles, and charge storage vehicles. In some embodiments, the method can further comprise updating a charge distribution map of the transportation network to include one or more of the charge level, current position, and transport speed for the mobile battery-powered entity and the other mobile battery-powered entity.

According to a tenth embodiment, a method can be provided that comprises receiving current position information and current charge level data for a plurality of mobile battery-powered entities; determining, based at least in part on the current position information and the current charge level data, one or more mobile battery-powered entities of the plurality of mobile battery-powered entities to be charged; and determining, based at least in part on the current charge level data, one or more other mobile battery-powered entities of the plurality of mobile battery-powered entities to transfer charge to the one or more mobile battery-powered entities. In some embodiments, the method can further comprise determining whether the one or more mobile battery-powered entities are within a pre-determined proximity of corresponding ones of the one or more other mobile battery-powered entities. In some embodiments, the method can further comprise, in an instance in which the one or more mobile battery-powered entities are within the pre-determined proximity of corresponding ones of the one or more other mobile battery-powered entities, transmitting route instructions and transport speed instructions to the one or more other mobile battery-powered entities; determining whether the one or more other mobile battery-powered entities have complied with the route instructions and the transport speed instructions; and if the one or more other mobile battery-powered entities have complied with the route instructions and the transport speed instructions, transmitting charge transfer instructions to the one or more other mobile battery-powered entities. In some embodiments, the method can further comprise causing the one or more other mobile battery-powered entities to transfer an electric charge to a corresponding one of the one or more mobile battery-powered entities according to the charge transfer instructions. In some embodiments, the charge transfer instructions comprise one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity. In some embodiments, the method can further comprise, in an instance in which the charge levels of the mobile battery-powered entity and the other mobile battery-powered entity are both below the pre-determined charge level, causing deployment of at least one charging vehicle or at the MoCS. In some embodiments, the plurality of mobile battery-powered entities are selected from among battery-powered terrestrial vehicles, battery-powered aerial vehicles, battery-powered aquatic vehicles, charge relay vehicles, and charge storage vehicles. In some embodiments, the method can further comprise updating a charge distribution map of the transportation network to include one or more of the charge level, current position, and transport speed for the mobile battery-powered entity and the other mobile battery-powered entity.

According to an eleventh embodiment, an apparatus is provided that comprises at least one processor and at least one memory including computer program code, the at least one memory and the computer program code configured to, with the processor, cause the apparatus to at least: receive current position information and current charge level data for a plurality of mobile battery-powered entities; determine, based at least in part on the current position information and the current charge level data, one or more mobile battery-powered entities of the plurality of mobile battery-powered entities to be charged; and determine, based at least in part on the current charge level data, one or more other mobile battery-powered entities of the plurality of mobile battery-powered entities to transfer charge to the one or more mobile battery-powered entities. In some embodiments, the at least one memory and the computer program code are configured to, with the processor, cause the apparatus to at least: determine whether the one or more mobile battery-powered entities are within a pre-determined proximity of corresponding ones of the one or more other mobile battery-powered entities; in an instance in which the one or more mobile battery-powered entities are within the pre-determined proximity of corresponding ones of the one or more other mobile battery-powered entities, transmit route instructions and transport speed instructions to the one or more other mobile battery-powered entities; determine whether the one or more other mobile battery-powered entities have complied with the route instructions and the transport speed instructions; and, if the one or more other mobile battery-powered entities have complied with the route instructions and the transport speed instructions, transmit charge transfer instructions to the one or more other mobile battery-powered entities. In some embodiments, the at least one memory and the computer program code are configured to, with the processor, cause the apparatus to at least: cause the one or more other mobile battery-powered entities to transfer an electric charge to a corresponding one of the one or more mobile battery-powered entities according to the charge transfer instructions, said charge transfer instructions comprising one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity.

According to an twelfth embodiment, a method is provided for distributing charge within a system of battery-powered vehicles. In some embodiments, the method can comprise receiving current position information, destination information, and current charge level data for a plurality of mobile battery-powered entities; and determining, based upon at least the current position information, the destination information, and the current charge level data, route instructions, speed instructions, and charge transfer instructions for each of the plurality of mobile battery-powered entities. In some embodiments, the method can further comprise generating, based upon at least the current position information, the destination information, and the current charge level data, for the plurality of mobile battery-powered entities, a charge distribution map of the system. In some embodiments, the method can further comprise identifying, based upon at least the optimal route and charge transfer instructions for each of the plurality of mobile battery-powered entities and the current charge level data for the plurality of mobile battery-powered entities, one or more charge deficient regions within the system of battery-powered vehicle; and, in an instance in which one or more charge deficient regions exist, identifying one or more charging vehicles or MoCSs to deploy within the system. In some embodiments, the method can further comprise transmitting the route instructions, speed instructions, and charge transfer instructions to one or more mobile battery-powered entities of the plurality of mobile battery-powered entities; determining whether the one or more mobile battery-powered entities have complied with the route instructions and the speed instructions; and in an instance in which the one or more mobile battery-powered entities have complied with the route instructions and the speed instructions, transmitting the charge transfer instructions to the one or more mobile battery-powered entities. In some embodiments, the method can further comprise causing the one or more mobile battery-powered entities to transfer an electric charge to a corresponding one or more other mobile battery-powered entities according to the charge transfer instructions. In some embodiments, the charge transfer instructions can comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity. In some embodiments, the plurality of mobile battery-powered entities can be selected from among battery-powered terrestrial vehicles, battery-powered aerial vehicles, battery-powered aquatic vehicles, charge relay vehicles, and charge storage vehicles. In some embodiments, the method can further comprise receiving, from the plurality of mobile battery-powered entities and the one or more charging vehicles or MoCSs, updated current position information, updated destination information, and updated current charge level data; and updating the charge distribution map of the system to include one or more of an updated charge level, an updated current position, and an updated speed for the plurality of mobile battery-powered entities and the one or more charge vehicles or MoCSs.

According to a thirteenth embodiment, an apparatus can be provided for charge distribution within a system of mobile battery-powered entities. In some embodiments, the apparatus can comprise at least one processor and at least one memory including computer program code. In some embodiments, the at least one memory and the computer program code can be configured to, with the processor, cause the apparatus to at least: receive current position information, destination information, and current charge level data for a plurality of mobile battery-powered entities and one or more MoCSs; generate, based upon at least the current position information, the destination information, and the current charge level data, for the plurality of mobile battery-powered entities and the one or more MoCSs, a charge distribution map; and determine, based upon at least the charge distribution map, route instructions, speed instructions, and charge transfer instructions for one or more mobile battery-powered entities of the plurality of mobile battery-powered entities. In some embodiments, the at least one memory and the computer program code are configured to, with the processor, cause the apparatus to at least: transmit the route instructions and speed instructions to the one or more mobile battery-powered entities; determine whether the one or more mobile battery-powered entities have complied with the route instructions and the speed instructions; and, in an instance in which the one or more mobile battery-powered entities have complied with the route instructions and the speed instructions, transmit the charge transfer instructions to the one or more mobile battery-powered entities. In some embodiments, the at least one memory and the computer program code are configured to, with the processor, cause the apparatus to at least: identify, based upon at least the charge distribution map, one or more charge deficient regions within the charge distribution map; and, in an instance in which one or more charge deficient regions exist, transmit deployment instructions to the one or more charging vehicles or MoCSs.

According to a fourteenth embodiment, a method can be carried out for charge distribution within a system of mobile battery-powered entities, the method comprising: monitoring, for a mobile battery-powered entity in a transportation network, a charge level and one or more of: a destination, a route, a current position, and a transport speed; in an instance in which the charge level of the mobile battery-powered entity is below a pre-determined charge level, causing a MoCS to be deployed to a position nearby the current position of the mobile battery-powered entity; causing the MoCS to deploy at least one external battery unit to the current position of the mobile battery-powered entity while the battery-powered entity continues to travel through the transportation network, the deployed at least one external battery unit carrying a replenishing supply of charge; and initiating transfer of at least a portion of the replenishing supply of charge from the at least one external battery unit to the mobile battery-powered entity. In some embodiments, the method can further comprise: causing establishment of a charge transfer connection between the at least one external battery unit and the mobile battery-powered entity. In some embodiments, the method can further comprise: after a predetermined duration, causing cessation of transfer of at least the portion of the replenishing supply of charge from the at least one external battery unit to the mobile battery-powered entity. In some embodiments, the method can further comprise: causing the MoCS to, after the at least one external battery unit ceases transferring charge to the mobile battery-powered entity, collect the at least one external battery unit. In some embodiments, the method can further comprise: once the MoCS collects the at least one external battery unit, causing the MoCS to recharge the at least one external battery unit while the MoCS continues to travel through the transportation network. In some embodiments, the method can further comprise: after the at least one external battery unit ceases transferring charge to the mobile battery-powered entity, redirecting the mobile battery-powered entity to an external battery supply and recovery station; and causing the at least one external battery unit to be disconnected from the mobile battery-powered entity. In some embodiments, the mobile battery-powered entity is selected from among battery-powered terrestrial vehicles, battery-powered aerial vehicles, battery-powered aquatic vehicles, charge relay vehicles, and charge storage vehicles. In some embodiments, the method can further comprise: updating a charge distribution map of the transportation network to include one or more of an updated level, an updated position, and an updated transport speed for the mobile battery-powered entity.

According to a fifteenth embodiment, a method can be carried out for charge distribution within a transportation system. In some embodiments, the method can comprise: monitoring, for a mobile battery-powered entity in a transportation network, a charge level and one or more of: a destination, a route, a current position, and a transport speed; in an instance in which the charge level of the mobile battery-powered entity is below a pre-determined charge level, redirecting the mobile battery-powered entity to a first external battery supply and recovery station; and causing releasable coupling of at least one external battery from the external battery supply and recovery station to the mobile battery-powered entity such that, as the mobile battery-powered entity continues to travel through the transportation network, the at least one external battery transfers charge to the mobile battery-powered entity. In some embodiments, the method can further comprise: after a predetermined duration, causing cessation of the transfer of charge from the at least one external battery unit to the mobile battery-powered entity. In some embodiments, the method can further comprise: after the at least one external battery unit ceases transferring charge to the mobile battery-powered entity, redirecting the mobile battery-powered entity to a second external battery supply and recovery station; and causing the at least one external battery unit to be disconnected from the mobile battery-powered entity. In some embodiments, the method can further comprise: causing deployment of a MoCS to, after the at least one external battery unit ceases transferring charge to the mobile battery-powered entity, collect the at least one external battery unit. In some embodiments, the method can further comprise: once the MoCS collects the at least one external battery unit, causing the MoCS to recharge the at least one external battery unit while the MoCS continues to travel through the transportation network. In some embodiments, the mobile battery-powered entity is selected from among battery-powered terrestrial vehicles, battery-powered aerial vehicles, battery-powered aquatic vehicles, charge relay vehicles, and charge storage vehicles. In some embodiments, the method can further comprise: updating a charge distribution map of the transportation network to include one or more of an updated level, an updated position, and an updated transport speed for the mobile battery-powered entity.

According to a sixteenth embodiment, a system can be provided that comprises: one or more MoCSs comprising one or more external battery units; and one or more computing entities configured to: monitor or receive current position information, current destination information, current route information, current speed level information, and current charge level information for a plurality of mobile battery-powered entities and one or more MoCSs, and determine, based upon one or more of the current position information, the current destination information, the current route information, the current speed level information, or the current charge level information, route instructions and charge transfer instructions for one or more of the plurality of mobile battery-powered entities and at least one of the one or more MoCSs. In some embodiments, the one or more computing entities are further configured to: in an instance in which the current charge level of at least one mobile battery-powered entity of the plurality of mobile battery-powered entities is below a pre-determined charge level, cause a MoCS of the one or more MoCSs to be deployed to a position nearby a current position of the mobile battery-powered entity, cause the MoCS to deploy at least one external battery unit of the one or more external battery unit to the current position of the mobile battery-powered entity while the battery-powered entity continues to travel through the transportation network, the deployed at least one external battery unit carrying a replenishing supply of charge; and initiate transfer of at least a portion of the replenishing supply of charge from the at least one external battery unit to the mobile battery-powered entity. In some embodiments, the one or more computing entities are further configured to: cause establishment of a charge transfer connection between the at least one external battery unit and the mobile battery-powered entity. In some embodiments, the one or more computing entities are further configured to: after a predetermined duration, cause cessation of transfer of at least the portion of the replenishing supply of charge from the at least one external battery unit to the mobile battery-powered entity. In some embodiments, the one or more computing entities are further configured to: cause the MoCS to, after the at least one external battery unit ceases transferring charge to the mobile battery-powered entity, collect the at least one external battery unit. In some embodiments, the one or more computing entities are further configured to: once the MoCS collects the at least one external battery unit, cause the MoCS to recharge the at least one external battery unit while the MoCS continues to travel through the transportation network. In some embodiments, the one or more computing entities are further configured to: after the at least one external battery unit ceases transferring charge to the mobile battery-powered entity, redirect the mobile battery-powered entity to an external battery supply and recovery station; and cause the at least one external battery unit to be disconnected from the mobile battery-powered entity. In some embodiments, the mobile battery-powered entity is selected from among battery-powered terrestrial vehicles, battery-powered aerial vehicles, battery-powered aquatic vehicles, charge relay vehicles, and charge storage vehicles. In some embodiments, the one or more computing entities are further configured to: generate, based upon one or more of the current position information, the current destination information, the current route information, the current speed level information, and the current charge level information for the plurality of mobile battery-powered entities, a charge distribution map of the system. In some embodiments, the one or more computing entities are further configured to: update the charge distribution map of the transportation network to include one or more of an updated charge level, an updated position, and an updated transport speed for the mobile battery-powered entity. In some embodiments, the one or more computing entities are further configured to: transmit route instructions and transport speed instructions to the mobile battery-powered entity; and, in an instance in which the mobile battery-powered entity has complied with the route instructions and the transport speed instructions, transmit charge transfer instructions to the mobile battery-powered entity, thereby causing the MoCS to deploy the at least one external battery unit of the one or more external battery units to the current position of the mobile battery-powered entity while the battery-powered entity continues to travel through the transportation network.

According to a seventeenth embodiment, a system can be provided that comprises: one or more external battery supply and recovery stations configured to store, deploy, and receive external battery units; and one or more computing entities configured to: monitor, for a mobile battery-powered entity in a transportation network, a charge level and one or more of: a destination, a route, a current position, and a transport speed; in an instance in which the charge level of the mobile battery-powered entity is below a pre-determined charge level, redirect the mobile battery-powered entity to a first external battery supply and recovery station; and cause releasable coupling of at least one external battery from the external battery supply and recovery station to the mobile battery-powered entity such that, as the mobile battery-powered entity continues to travel through the transportation network, the at least one external battery transfers charge to the mobile battery-powered entity. In some embodiments, the one or more computing entities are further configured to: after a predetermined duration, cause cessation of the transfer of charge from the at least one external battery unit to the mobile battery-powered entity. In some embodiments, the one or more computing entities are further configured to: after the at least one external battery unit ceases transferring charge to the mobile battery-powered entity, redirect the mobile battery-powered entity to a second external battery supply and recovery station; and cause the at least one external battery unit to be disconnected from the mobile battery-powered entity. In some embodiments, the one or more computing entities are further configured to: cause deployment of a MoCS to, after the at least one external battery unit ceases transferring charge to the mobile battery-powered entity, collect the at least one external battery unit. In some embodiments, the one or more computing entities are further configured to: once the MoCS collects the at least one external battery unit, cause the MoCS to recharge the at least one external battery unit while the MoCS continues to travel through the transportation network. In some embodiments, the mobile battery-powered entity is selected from among battery-powered terrestrial vehicles, battery-powered aerial vehicles, battery-powered aquatic vehicles, charge relay vehicles, and charge storage vehicles. In some embodiments, the one or more computing entities are further configured to: update a charge distribution map of the transportation network to include one or more of an updated level, an updated position, and an updated transport speed for the mobile battery-powered entity.

According to an eighteenth embodiment, a method can be carried out that comprises: receiving, from a mobile battery-powered entity in a transportation system, a mobile charging request, the mobile charging request comprising at least a location of the mobile battery-powered entity; determining, based at least in part on the location of the mobile battery-powered entity, a location of each of a plurality of mobile charging stations, and a charge level of each of the plurality of mobile charging stations, a mobile charging station from among said plurality of mobile charging stations to be deployed for mobile charging of the mobile battery-powered entity; and causing deployment of the mobile charging station by sending a deployment request to the mobile charging station, the deployment request comprising at least the location of the mobile battery-powered entity. In some embodiments, the method can further comprise: receiving, originating from the mobile charging station, an indication regarding whether the mobile charging station has reached a location within a predetermined distance of a current position of the mobile battery-powered entity such that the mobile charging station can establish electrical communication with the mobile battery-powered entity or deploy an external battery unit to be supported by a portion of the mobile battery-powered entity; in an instance in which said indication is an affirmative indication, causing the mobile charging station to establish electrical communication with the mobile battery-powered entity or causing the mobile charging station to deploy at least one external battery unit to the current position of the mobile battery-powered entity while the battery-powered entity continues to travel through the transportation network, the deployed at least one external battery unit carrying a replenishing supply of charge; and causing transfer of at least a portion of the replenishing supply of electrical charge from the at least one external battery unit to the mobile battery-powered entity. In some embodiments, the mobile charging request further comprises charge network subscriber information associated with an operator of the mobile battery-powered entity. In some embodiments, the method can further comprise: causing transfer of a replenishing supply of electrical charge from the mobile charging station or at least one external battery unit deployed from the mobile charging station to the mobile battery-powered entity; tolling an amount of said replenishing supply of electrical charge transferred to the mobile battery-powered entity; and charging, based at least in part on said charge network subscriber information, said operator for said amount of said replenishing supply of electrical charge transferred to the mobile battery-powered entity. In some embodiments, the mobile charging request further comprises a destination of the mobile battery-powered entity. In some embodiments, the method further comprises: determining a deployment pathway of the mobile charging station deployed in the transportation network or receiving, originating from the mobile charging station, information regarding said deployment pathway; determining a destination and a desired route of the mobile battery-powered entity; and determining, based at least on the destination and the desired route of the mobile battery-powered entity and the deployment pathway of the mobile charging station, whether to modify the desired route of the mobile battery-powered entity. In some embodiments, the method further comprises: in an instance in which said determining whether to modify is determining to modify the desired route of the mobile battery-powered entity, determining a proposed alternative route for the mobile battery-powered entity based at least in part on said destination of the mobile battery-powered entity and the deployment pathway of the mobile charging station; transmitting the proposed alternative route to the mobile battery-powered entity with a request that the mobile battery-powered entity travel through said transportation network according to the proposed alternative route; and receiving, from the mobile battery-powered entity, an indication of whether the mobile battery-powered entity will commence traveling through said transportation network according to the proposed alternative route.

According to a nineteenth embodiment, an apparatus can be provided that comprises means, such as a processor and memory storing program instructions. In some embodiments, the memory and the program instructions can be configured, with the processor, to cause the apparatus at least to: receive, originating from a mobile battery-powered entity in a transportation system, a mobile charging request, the mobile charging request comprising at least a location of the mobile battery-powered entity; determine, based at least in part on the location of the mobile battery-powered entity, a location of each of a plurality of mobile charging stations, and a charge level of each of the plurality of mobile charging stations, a mobile charging station from among said plurality of mobile charging stations to be deployed for mobile charging of the mobile battery-powered entity; and cause deployment of the mobile charging station by sending a deployment request to the mobile charging station, the deployment request comprising at least the location of the mobile battery-powered entity. In some embodiments, the apparatus can further comprise means, such as the memory and the program instructions can be further configured, with the processor, to cause the apparatus at least to: receive, originating from the mobile charging station, an indication regarding whether the mobile charging station has reached a location within a predetermined distance of a current position of the mobile battery-powered entity such that the mobile charging station can establish electrical communication with the mobile battery-powered entity or deploy an external battery unit to be supported by a portion of the mobile battery-powered entity; in an instance in which said indication is an affirmative indication, cause the mobile charging station to establish electrical communication with the mobile battery-powered entity or cause the mobile charging station to deploy at least one external battery unit to the current position of the mobile battery-powered entity while the battery-powered entity continues to travel through the transportation network, the deployed at least one external battery unit carrying a replenishing supply of charge; and cause transfer of at least a portion of the replenishing supply of electrical charge from the at least one external battery unit to the mobile battery-powered entity. In some embodiments, the mobile charging request further comprises charge network subscriber information associated with an operator of the mobile battery-powered entity. In some embodiments, the apparatus can further comprise means, such as the memory and the program instructions can be further configured, with the processor, to cause the apparatus at least to: cause transfer of a replenishing supply of electrical charge from the mobile charging station or at least one external battery unit deployed from the mobile charging station to the mobile battery-powered entity; toll an amount of said replenishing supply of electrical charge transferred to the mobile battery-powered entity; and charge, based at least in part on said charge network subscriber information, said operator for said amount of said replenishing supply of electrical charge transferred to the mobile battery-powered entity. In some embodiments, the mobile charging request further comprises a destination of the mobile battery-powered entity. In some embodiments, the apparatus can further comprise means, such as the memory and the program instructions can be further configured, with the processor, to cause the apparatus at least to: determine a deployment pathway of the mobile charging station deployed in the transportation network or receiving, originating from the mobile charging station, information regarding said deployment pathway; determine a destination and a desired route of the mobile battery-powered entity; and determine, based at least on the destination and the desired route of the mobile battery-powered entity and the deployment pathway of the mobile charging station, whether to modify the desired route of the mobile battery-powered entity. In some embodiments, the apparatus can further comprise means, such as the memory and the program instructions can be further configured, with the processor, to cause the apparatus at least to: in an instance in which said determination about whether to modify the desired route of the mobile battery-powered entity is an affirmative determination, determine a proposed alternative route for the mobile battery-powered entity based at least in part on said destination of the mobile battery-powered entity and the deployment pathway of the mobile charging station; transmit the proposed alternative route to the mobile battery-powered entity with a request that the mobile battery-powered entity travel through said transportation network according to the proposed alternative route; and receive, from the mobile battery-powered entity, an indication of whether the mobile battery-powered entity will commence traveling through said transportation network according to the proposed alternative route.

According to a twentieth embodiment, a computer program product can be provided that comprises a non-transitory computer-readable medium storing program code, wherein the program code comprise instructions for causing a processor at least to: receive, originating from a mobile battery-powered entity in a transportation system, a mobile charging request, the mobile charging request comprising at least a location of the mobile battery-powered entity; determine, based at least in part on the location of the mobile battery-powered entity, a location of each of a plurality of mobile charging stations, and a charge level of each of the plurality of mobile charging stations, a mobile charging station from among said plurality of mobile charging stations to be deployed for mobile charging of the mobile battery-powered entity; and cause deployment of the mobile charging station by sending a deployment request to the mobile charging station, the deployment request comprising at least the location of the mobile battery-powered entity. In some embodiments, the program code further comprise instructions for causing a processor at least to: receive, originating from the mobile charging station, an indication regarding whether the mobile charging station has reached a location within a predetermined distance of a current position of the mobile battery-powered entity such that the mobile charging station can establish electrical communication with the mobile battery-powered entity or deploy an external battery unit to be supported by a portion of the mobile battery-powered entity; in an instance in which said indication is an affirmative indication, cause the mobile charging station to establish electrical communication with the mobile battery-powered entity or cause the mobile charging station to deploy at least one external battery unit to the current position of the mobile battery-powered entity while the battery-powered entity continues to travel through the transportation network, the deployed at least one external battery unit carrying a replenishing supply of charge; and cause transfer of at least a portion of the replenishing supply of electrical charge from the at least one external battery unit to the mobile battery-powered entity. In some embodiments, the mobile charging request further comprises charge network subscriber information associated with an operator of the mobile battery-powered entity. In some embodiments, the program code further comprise instructions for causing a processor at least to: cause transfer of a replenishing supply of electrical charge from the mobile charging station or at least one external battery unit deployed from the mobile charging station to the mobile battery-powered entity; toll an amount of said replenishing supply of electrical charge transferred to the mobile battery-powered entity; and charge, based at least in part on said charge network subscriber information, said operator for said amount of said replenishing supply of electrical charge transferred to the mobile battery-powered entity. In some embodiments, the mobile charging request further comprises a destination of the mobile battery-powered entity, and the program code further comprise instructions for causing a processor at least to: determine a deployment pathway of the mobile charging station deployed in the transportation network or receiving, originating from the mobile charging station, information regarding said deployment pathway; determine a destination and a desired route of the mobile battery-powered entity; and determine, based at least on the destination and the desired route of the mobile battery-powered entity and the deployment pathway of the mobile charging station, whether to modify the desired route of the mobile battery-powered entity. In some embodiments, the program code further comprise instructions for causing a processor at least to: in an instance in which said determination about whether to modify the desired route of the mobile battery-powered entity is an affirmative determination, determine a proposed alternative route for the mobile battery-powered entity based at least in part on said destination of the mobile battery-powered entity and the deployment pathway of the mobile charging station; transmit the proposed alternative route to the mobile battery-powered entity with a request that the mobile battery-powered entity travel through said transportation network according to the proposed alternative route; and receive, from the mobile battery-powered entity, an indication of whether the mobile battery-powered entity will commence traveling through said transportation network according to the proposed alternative route.

According to a twenty first embodiment, a method can be carried out that comprises: determining, at a mobile battery-powered entity, while the mobile battery-powered entity is traveling through a transportation network, a charge level of one or more batteries of the mobile battery-powered entity; transmitting, from the mobile battery-powered entity, to a communications entity of the transportation network, a mobile charging request, the mobile charging request comprising at least an initial location of the mobile battery-powered entity; receiving, from the communications entity or a mobile charging station, a deployment confirmation indicating that the mobile charging station has been deployed towards the initial location of the mobile battery-powered entity and a request for an updated location of the mobile battery-powered entity; and receiving, from the communications entity or the mobile charging station, a charging request comprising instructions for receiving electrical charge from the mobile charging station while continuing to travel through the transportation network or instructions for receiving at least one external battery unit from the mobile charging station. In some embodiments, the method can further comprise: receiving, originating from the mobile charging station, an indication that the mobile charging station has been deployed to within a predetermined distance of the updated location of the mobile battery-powered entity such that the mobile charging station can establish electrical communication with the mobile battery-powered entity or deploy the external battery unit to be supported by a portion of the mobile battery-powered entity; and transmitting, to the mobile charging station or the communication entity in the transportation network, a confirmation that the mobile battery-powered entity will adhere to said instructions for receiving the electrical charge from the mobile charging station or said instructions for receiving the at least one external battery unit. In some embodiments, said charging request may comprise the instructions for receiving electrical charge from the mobile charging station, the method further comprising: in an instance in which said instructions for receiving electrical charge from the mobile charging station comprises instructions to maintain a charge transfer speed that is different from a current speed of the mobile battery-powered entity, adjusting the current speed of the mobile battery-powered entity to be equivalent or substantially equivalent to the charge transfer speed; and receiving, originating from the mobile charging station, while the mobile charging station and the mobile battery-powered entity continue traveling through the transportation network, at least a portion of a replenishing supply of electrical charge stored at the mobile charging station. In some embodiments, the charging request further comprises a request for charge network subscriber information associated with an operator of the mobile battery-powered entity, and wherein the method further comprises: transmitting, to the mobile charging station or the communications entity, said charge network subscriber information, said charge network subscriber information comprising information operable for charging the operator of the mobile battery-powered entity for receiving at least a portion of a replenishing supply of electrical charge from the mobile charging station. In some embodiments, the charging request further comprises a request for the mobile battery-powered entity to provide a destination of the mobile battery-powered entity to the mobile charging station or the communications entity of the transportation network. In some embodiments, the method can further comprise: receiving, from the mobile charging station or the communication entity of the transportation network, a proposed alternative route for the mobile battery-powered entity; and transmitting, from the mobile battery-powered entity, to the mobile charging station or the communications entity of the transportation network, an indication that the mobile battery-powered entity will commence traveling through said transportation network according to the proposed alternative route.

According to a twenty second embodiment, an apparatus for managing mobile charging of a battery-powered entity can be provided, the apparatus comprising: means, such as a processor and a memory storing program instructions, wherein the memory and the program instructions are configured, with the processor, to cause the apparatus at least to: determine, while the mobile battery-powered entity is traveling through a transportation network, a charge level of one or more batteries of the mobile battery-powered entity; transmit, to a communications entity of the transportation network, a mobile charging request, the mobile charging request comprising at least an initial location of the mobile battery-powered entity; receive, from the communications entity or a mobile charging station, a deployment confirmation indicating that the mobile charging station has been deployed towards the initial location of the mobile battery-powered entity and a request for an updated location of the mobile battery-powered entity; and receive, from the communications entity or the mobile charging station, a charging request comprising instructions for receiving electrical charge from the mobile charging station while continuing to travel through the transportation network or instructions for receiving at least one external battery unit from the mobile charging station. In some embodiments, the at least one memory and the program instructions are further configured, with the at least one processor, to cause the apparatus at least to: receive, originating from the mobile charging station, an indication that the mobile charging station has been deployed to within a predetermined distance of the updated location of the mobile battery-powered entity such that the mobile charging station can establish electrical communication with the mobile battery-powered entity or deploy the external battery unit to be supported by a portion of the mobile battery-powered entity; and transmit, to the mobile charging station or the communication entity in the transportation network, a confirmation that the mobile battery-powered entity will adhere to said instructions for receiving the electrical charge from the mobile charging station or said instructions for receiving the at least one external battery unit. In some embodiments, said charging request comprises the instructions for receiving electrical charge from the mobile charging station, wherein the at least one memory and the program instructions are further configured, with the at least one processor, to cause the apparatus at least to: in an instance in which said instructions for receiving electrical charge from the mobile charging station comprises instructions to maintain a charge transfer speed that is different from a current speed of the mobile battery-powered entity, adjust the current speed of the mobile battery-powered entity to be equivalent or substantially equivalent to the charge transfer speed; and receive, originating from the mobile charging station, while the mobile charging station and the mobile battery-powered entity continue traveling through the transportation network, at least a portion of a replenishing supply of electrical charge stored at the mobile charging station. In some embodiments, the charging request further comprises a request for charge network subscriber information associated with an operator of the mobile battery-powered entity, wherein the at least one memory and the program instructions are further configured, with the at least one processor, to cause the apparatus at least to: transmit, to the mobile charging station or the communications entity, said charge network subscriber information, said charge network subscriber information comprising information operable for charging the operator of the mobile battery-powered entity for receiving at least a portion of a replenishing supply of electrical charge from the mobile charging station. In some embodiments, the charging request further comprises a request for the mobile battery-powered entity to provide a destination of the mobile battery-powered entity to the mobile charging station or the communications entity of the transportation network. In some embodiments, the at least one memory and the program instructions are further configured, with the at least one processor, to cause the apparatus at least to: receive, from the mobile charging station or the communication entity of the transportation network, a proposed alternative route for the mobile battery-powered entity; and transmit, to the mobile charging station or the communications entity of the transportation network, an indication that the mobile battery-powered entity will commence traveling through said transportation network according to the proposed alternative route.

According to a twenty third embodiment, a computer program product can be provided that comprises a non-transitory computer-readable medium storing program code, wherein the program code comprise instructions for causing a processor at least to: determine, at a mobile battery-powered entity, while the mobile battery-powered entity is traveling through a transportation network, a charge level of one or more batteries of the mobile battery-powered entity; transmit, from the mobile battery-powered entity, to a communications entity of the transportation network, a mobile charging request, the mobile charging request comprising at least an initial location of the mobile battery-powered entity; receive, from the communications entity or a mobile charging station, a deployment confirmation indicating that the mobile charging station has been deployed towards the initial location of the mobile battery-powered entity and a request for an updated location of the mobile battery-powered entity; and receive, from the communications entity or the mobile charging station, a charging request comprising instructions for receiving electrical charge from the mobile charging station while continuing to travel through the transportation network or instructions for receiving at least one external battery unit from the mobile charging station. In some embodiments, the program code further comprise instructions for causing the processor at least to: receive, originating from the mobile charging station, an indication that the mobile charging station has been deployed to within a predetermined distance of the updated location of the mobile battery-powered entity such that the mobile charging station can establish electrical communication with the mobile battery-powered entity or deploy the external battery unit to be supported by a portion of the mobile battery-powered entity; and transmit, to the mobile charging station or the communication entity in the transportation network, a confirmation that the mobile battery-powered entity will adhere to said instructions for receiving the electrical charge from the mobile charging station or said instructions for receiving the at least one external battery unit. In some embodiments, said charging request comprises the instructions for receiving electrical charge from the mobile charging station, wherein the program code further comprise instructions for causing the processor at least to: in an instance in which said instructions for receiving electrical charge from the mobile charging station comprises instructions to maintain a charge transfer speed that is different from a current speed of the mobile battery-powered entity, adjust the current speed of the mobile battery-powered entity to be equivalent or substantially equivalent to the charge transfer speed; and receive, originating from the mobile charging station, while the mobile charging station and the mobile battery-powered entity continue traveling through the transportation network, at least a portion of a replenishing supply of electrical charge stored at the mobile charging station. In some embodiments, the charging request further comprises a request for charge network subscriber information associated with an operator of the mobile battery-powered entity, wherein the program code further comprise instructions for causing the processor at least to: transmit, to the mobile charging station or the communications entity, said charge network subscriber information, said charge network subscriber information comprising information operable for charging the operator of the mobile battery-powered entity for receiving at least a portion of a replenishing supply of electrical charge from the mobile charging station. In some embodiments, the charging request further comprises a request for the mobile battery-powered entity to provide a destination of the mobile battery-powered entity to the mobile charging station or the communications entity of the transportation network. In some embodiments, the program code further comprise instructions for causing the processor at least to: receive, from the mobile charging station or the communication entity of the transportation network, a proposed alternative route for the mobile battery-powered entity; and transmitting, from the mobile battery-powered entity, to the mobile charging station or the communications entity of the transportation network, an indication that the mobile battery-powered entity will commence traveling through said transportation network according to the proposed alternative route.

To provide an overall understanding, certain illustrative embodiments have been described; however, it will be understood by one of ordinary skill in the art that systems, apparatuses, and methods described herein can be adapted and modified to provide systems, apparatuses, and methods for other suitable applications and that other additions and modifications can be made without departing from the scope of systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

Conventional terms in the field of electrochemical cells have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements or any relative order of operations or organization on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. A method comprising:
    receiving, by one or more processors and originating from a mobile battery-powered entity in a transportation system, a mobile charging request, the mobile charging request comprising at least a location of the mobile battery-powered entity;
    determining, by the one or more processors and based at least in part on the location of the mobile battery-powered entity, a location of each of a plurality of mobile charging stations, and a charge level of each of the plurality of mobile charging stations, a mobile charging station from among said plurality of mobile charging stations to be deployed for mobile charging of the mobile battery-powered entity; and
    causing, by the one or more processors, deployment of the mobile charging station by sending a deployment request to the mobile charging station, the deployment request comprising at least the location of the mobile battery-powered entity.

2. The method of claim 1, further comprising:
    receiving, originating from the mobile charging station, an indication regarding whether the mobile charging station has reached a location within a predetermined distance of a current position of the mobile battery-powered entity such that the mobile charging station can establish electrical communication with the mobile battery-powered entity or deploy an external battery unit to be supported by a portion of the mobile battery-powered entity;
    in an instance in which said indication is an affirmative indication, causing the mobile charging station to establish electrical communication with the mobile battery-powered entity or causing the mobile charging station to deploy at least one external battery unit to the current position of the mobile battery-powered entity while the battery-powered entity continues to travel through the transportation network, the deployed at least one external battery unit carrying a replenishing supply of charge; and
    causing transfer of at least a portion of the replenishing supply of electrical charge from the at least one external battery unit to the mobile battery-powered entity.

3. The method of claim 1, wherein the mobile charging request further comprises charge network subscriber information associated with an operator of the mobile battery-powered entity.

4. The method of claim 3, further comprising:
    causing transfer of a replenishing supply of electrical charge from the mobile charging station or at least one external battery unit deployed from the mobile charging station to the mobile battery-powered entity;
    tolling an amount of said replenishing supply of electrical charge transferred to the mobile battery-powered entity; and
    charging, based at least in part on said charge network subscriber information, said operator for said amount of said replenishing supply of electrical charge transferred to the mobile battery-powered entity.

5. The method of claim 1, wherein the mobile charging request further comprises a destination of the mobile battery-powered entity.

6. The method of claim 5, further comprising:
    determining a deployment pathway of the mobile charging station deployed in the transportation network or receiving, originating from the mobile charging station, information regarding said deployment pathway;
    determining a destination and a desired route of the mobile battery-powered entity; and
    determining, based at least on the destination and the desired route of the mobile battery-powered entity and the deployment pathway of the mobile charging station, whether to modify the desired route of the mobile battery-powered entity.

7. The method of claim 6, further comprising:
    in an instance in which said determining whether to modify is determining to modify the desired route of the mobile battery-powered entity, determining a proposed alternative route for the mobile battery-powered entity based at least in part on said destination of the mobile battery-powered entity and the deployment pathway of the mobile charging station;
    transmitting the proposed alternative route to the mobile battery-powered entity with a request that the mobile battery-powered entity travel through said transportation network according to the proposed alternative route; and receiving, from the mobile battery-powered entity, an indication of whether the mobile battery-powered entity will commence traveling through said transportation network according to the proposed alternative route.

8. An apparatus comprising:
at least one processor; and
at least one memory storing instructions thereon that, when executed by the at least one processor, cause the apparatus to perform at least:
receiving, originating from a mobile battery-powered entity in a transportation system, a mobile charging request, the mobile charging request comprising at least a location of the mobile battery-powered entity;
determining, based at least in part on the location of the mobile battery-powered entity, a location of each of a plurality of mobile charging stations, and a charge level of each of the plurality of mobile charging stations, a mobile charging station from among said plurality of mobile charging stations to be deployed for mobile charging of the mobile battery-powered entity; and
causing deployment of the mobile charging station by sending a deployment request to the mobile charging station, the deployment request comprising at least the location of the mobile battery-powered entity.

9. The apparatus of claim 8, wherein the instructions stored on the at least one memory, when executed by the at least one processor, further cause the apparatus to perform:
receiving, originating from the mobile charging station, an indication regarding whether the mobile charging station has reached a location within a predetermined distance of a current position of the mobile battery-powered entity such that the mobile charging station can establish electrical communication with the mobile battery-powered entity or deploy an external battery unit to be supported by a portion of the mobile battery-powered entity;
in an instance in which said indication is an affirmative indication, causing the mobile charging station to establish electrical communication with the mobile battery-powered entity or cause the mobile charging station to deploy at least one external battery unit to the current position of the mobile battery-powered entity while the battery-powered entity continues to travel through the transportation network, the deployed at least one external battery unit carrying a replenishing supply of charge; and
causing transfer of at least a portion of the replenishing supply of electrical charge from the at least one external battery unit to the mobile battery-powered entity.

10. The apparatus of claim 8, wherein the mobile charging request further comprises charge network subscriber information associated with an operator of the mobile battery-powered entity.

11. The apparatus of claim 10, wherein the instructions stored on the at least one memory, when executed by the at least one processor, further cause the apparatus at least to perform:
causing transfer of a replenishing supply of electrical charge from the mobile charging station or at least one external battery unit deployed from the mobile charging station to the mobile battery-powered entity;
tolling an amount of said replenishing supply of electrical charge transferred to the mobile battery-powered entity; and
charging, based at least in part on said charge network subscriber information, said operator for said amount of said replenishing supply of electrical charge transferred to the mobile battery-powered entity.

12. The apparatus of claim 8, wherein the mobile charging request further comprises a destination of the mobile battery-powered entity.

13. The apparatus of claim 12, wherein the instructions stored on the at least one memory, when executed by the at least one processor, further cause the apparatus to perform:
determining a deployment pathway of the mobile charging station deployed in the transportation network or receiving, originating from the mobile charging station, information regarding said deployment pathway;
determining a destination and a desired route of the mobile battery-powered entity; and
determine, based at least on the destination and the desired route of the mobile battery-powered entity and the deployment pathway of the mobile charging station, whether to modify the desired route of the mobile battery-powered entity.

14. The apparatus of claim 13, wherein the instructions stored on the at least one memory, when executed by the at least one processor, further cause the apparatus to perform:
in an instance in which said determination about whether to modify the desired route of the mobile battery-powered entity is an affirmative determination, determining a proposed alternative route for the mobile battery-powered entity based at least in part on said destination of the mobile battery-powered entity and the deployment pathway of the mobile charging station;
transmitting the proposed alternative route to the mobile battery-powered entity with a request that the mobile battery-powered entity travel through said transportation network according to the proposed alternative route; and
receiving, from the mobile battery-powered entity, an indication of whether the mobile battery-powered entity will commence traveling through said transportation network according to the proposed alternative route.

15. An apparatus comprising:
at least one processor; and
at least one memory storing instructions thereon that, when executed by the at least one processor, cause the apparatus to perform at least:
receiving a mobile charging request, the mobile charging request comprising at least a location of a mobile battery-powered entity in a transportation system;
comparing the location of the mobile battery-powered entity to a location of respective mobile charging stations of a plurality of mobile charging stations; and
initiating deployment, based on at least a current charge level of one or more of the plurality of mobile charging stations and the comparing the location of the mobile battery-powered entity to the location of respective of the plurality of mobile charging stations, a particular mobile charging station from among the plurality of mobile charging stations to be deployed for mobile charging of the mobile battery-powered entity.

16. The apparatus of claim 15, wherein the instructions stored on the at least one memory, when executed by the at least one processor, further cause the apparatus to perform:
sending a deployment request to the particular mobile charging station to initiating said deployment of the particular mobile charging station for mobile charging of the mobile battery-powered entity, the deployment request comprising at least the current location of the mobile battery-powered entity.

17. The apparatus of claim 15, wherein the instruction stored on the at least one memory, when executed by the at least one processor, further cause the apparatus to perform:
receiving an indication regarding whether the particular mobile charging station has reached a location within a predetermined distance of the current position of the mobile battery-powered entity or an updated current position of the mobile battery-powered entity such that the particular mobile charging station can establish electrical communication with the mobile battery-powered entity or deploy an external battery unit to be supported by a portion of the mobile battery-powered entity;
in an instance in which said indication is an affirmative indication, causing the particular mobile charging station to establish electrical communication with the mobile battery-powered entity or cause the particular mobile charging station to deploy at least one external battery unit to the current position or the updated current position of the mobile battery-powered entity while the mobile battery-powered entity continues to travel through the transportation network, the deployed at least one external battery unit carrying a replenishing supply of charge; and
causing transfer of at least a portion of the replenishing supply of electrical charge from the at least one external battery unit to the mobile battery-powered entity.

18. The apparatus of claim 15, wherein the mobile charging request further comprises charge network subscriber information associated with an operator of the mobile battery-powered entity.

19. The apparatus of claim 18, wherein the instruction stored on the at least one memory, when executed by the at least one processor, further cause the apparatus to perform:
causing transfer of a replenishing supply of electrical charge from the mobile charging station or at least one external battery unit deployed from the mobile charging station to the mobile battery-powered entity;
tolling an amount of said replenishing supply of electrical charge transferred to the mobile battery-powered entity; and
charging, based at least in part on said charge network subscriber information, said operator for said amount of said replenishing supply of electrical charge transferred to the mobile battery-powered entity.

20. The apparatus of claim 15, wherein the mobile charging request further comprises a destination of the mobile battery-powered entity.

21. The apparatus of claim 20, wherein the instruction stored on the at least one memory, when executed by the at least one processor, further cause the apparatus to perform:
determining a deployment pathway of the particular mobile charging station deployed in the transportation network or receiving, from the particular mobile charging station, information regarding said deployment pathway;
determining a destination and a desired route of the mobile battery-powered entity based at least upon said deployment pathway of the particular mobile charging station; and
determining, based at least on the destination and the desired route of the mobile battery-powered entity and the deployment pathway of the particular mobile charging station, whether the desired route of the mobile battery-powered entity should be modified to accommodate the mobile charging of the mobile battery-powered entity by the particular mobile charging station.

22. The apparatus of claim 21, wherein the instruction stored on the at least one memory, when executed by the at least one processor, further cause the apparatus to perform:
in an instance in which said determination about whether to modify the desired route of the mobile battery-powered entity is an affirmative determination, determining a proposed alternative route for the mobile battery-powered entity based at least in part on said destination of the mobile battery-powered entity and the deployment pathway of the mobile charging station;
transmitting the proposed alternative route to the mobile battery-powered entity with a request that the mobile battery-powered entity travel through said transportation network according to the proposed alternative route; and
receiving, from the mobile battery-powered entity, an indication of whether the mobile battery-powered entity will commence traveling through said transportation network according to the proposed alternative route.

* * * * *

UNITED STATES PATENT AND TRADEMARK OFFICE
CERTIFICATE OF CORRECTION

| | |
|---|---|
| PATENT NO. | : 11,890,957 B2 |
| APPLICATION NO. | : 17/306553 |
| DATED | : February 6, 2024 |
| INVENTOR(S) | : Chakraborty et al. |

It is certified that error appears in the above-identified patent and that said Letters Patent is hereby corrected as shown below:

In the Claims

Column 75,
Line 62, in Claim 11, "the apparatus at least to" should read --the apparatus to--.

Column 76,
Line 21, in Claim 13, "determine," should read --determining,--.

Signed and Sealed this
Sixteenth Day of April, 2024

Katherine Kelly Vidal
Director of the United States Patent and Trademark Office